(12) United States Patent
Yoscovich et al.

(10) Patent No.: US 10,153,685 B2
(45) Date of Patent: Dec. 11, 2018

(54) POWER RIPPLE COMPENSATION

(71) Applicant: Solaredge Technologies Ltd., Herzeliya (IL)

(72) Inventors: Ilan Yoscovich, Ramat-Gan (IL); Tzachi Glovinsky, Petah Tikva (IL); Guy Sella, Bitan Aharon (IL); Yoav Galin, Raanana (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 15/482,037

(22) Filed: Apr. 7, 2017

(65) Prior Publication Data

US 2017/0214309 A1 Jul. 27, 2017

Related U.S. Application Data

(63) Continuation of application No. 15/054,647, filed on Feb. 26, 2016, which is a continuation of application No. 14/485,682, filed on Sep. 13, 2014, now Pat. No. 9,318,974.

(60) Provisional application No. 61/970,788, filed on Mar. 26, 2014.

(51) Int. Cl.
| | |
|---|---|
| *H02M 1/08* | (2006.01) |
| *H02M 7/537* | (2006.01) |
| *H02M 1/12* | (2006.01) |
| *H02M 7/483* | (2007.01) |
| *H02M 1/14* | (2006.01) |
| *H02M 1/00* | (2006.01) |

(52) U.S. Cl.
CPC ............ *H02M 1/08* (2013.01); *H02M 1/126* (2013.01); *H02M 1/143* (2013.01); *H02M 7/483* (2013.01); *H02M 7/537* (2013.01); *H02M 2001/0054* (2013.01); *H02M 2007/4835* (2013.01)

(58) Field of Classification Search
CPC ......... H02M 2007/4835; H02M 7/487; H02M 7/483; H02M 1/088
See application file for complete search history.

(56) References Cited

U.S. PATENT DOCUMENTS

| | | | |
|---|---|---|---|
| 3,581,212 A | 5/1971 | McMurray | |
| 3,867,643 A | 2/1975 | Baker et al. | |
| 4,270,163 A | 5/1981 | Baker | |

(Continued)

FOREIGN PATENT DOCUMENTS

| | | |
|---|---|---|
| CN | 1625037 A | 6/2005 |
| CN | 101291129 A | 10/2008 |

(Continued)

OTHER PUBLICATIONS

Zhang et al., "Capacitor voltage balancing in multilevel flying capacitor inverters by rule-based switching pattern election", May 2007, p. 339-347.

(Continued)

*Primary Examiner* — Jue Zhang
*Assistant Examiner* — Lakaisha Jackson
(74) *Attorney, Agent, or Firm* — Banner & Witcoff, Ltd.

(57) ABSTRACT

A multi-level inverter having one or more banks, each bank containing a plurality of low voltage MOSFET transistors. A processor configured to switch the plurality of low voltage MOSFET transistors in each bank to switch at multiple times during each cycle.

30 Claims, 46 Drawing Sheets

(56) References Cited

U.S. PATENT DOCUMENTS

| | | |
|---|---|---|
| 4,336,613 A | 6/1982 | Hewes |
| 4,564,895 A | 1/1986 | Glennon |
| 4,670,828 A | 6/1987 | Shekhawat et al. |
| 4,816,736 A | 3/1989 | Dougherty et al. |
| 4,947,100 A | 8/1990 | Dhyanchand et al. |
| 5,172,309 A | 12/1992 | DeDoncker et al. |
| 5,233,509 A | 8/1993 | Ghotbi |
| 5,361,196 A | 11/1994 | Tanamachi et al. |
| 5,508,658 A | 4/1996 | Nishioka et al. |
| 5,598,326 A | 1/1997 | Liu et al. |
| 5,642,275 A | 6/1997 | Peng et al. |
| 5,644,483 A | 7/1997 | Peng et al. |
| 5,751,138 A | 5/1998 | Venkata et al. |
| 5,790,396 A | 8/1998 | Miyazaki et al. |
| 5,892,677 A | 4/1999 | Chang |
| 5,910,892 A | 6/1999 | Lyons et al. |
| 5,933,339 A | 8/1999 | Duba et al. |
| 5,936,856 A | 8/1999 | Xiang |
| 5,943,229 A | 8/1999 | Sudhoff |
| 5,973,368 A | 10/1999 | Pearce et al. |
| 5,982,646 A | 11/1999 | Lyons et al. |
| 6,005,788 A | 12/1999 | Lipo et al. |
| 6,031,738 A | 2/2000 | Lipo et al. |
| 6,058,031 A | 5/2000 | Lyons et al. |
| 6,060,859 A | 5/2000 | Jonokuchi |
| 6,075,350 A | 6/2000 | Peng |
| 6,160,722 A | 12/2000 | Thommes et al. |
| 6,205,012 B1 | 3/2001 | Lear |
| RE37,126 E | 4/2001 | Peng et al. |
| 6,236,580 B1 | 5/2001 | Aiello et al. |
| 6,262,555 B1 | 7/2001 | Hammond et al. |
| 6,301,130 B1 | 10/2001 | Aiello et al. |
| 6,340,851 B1 | 1/2002 | Rinaldi et al. |
| 6,404,655 B1 | 6/2002 | Welches |
| 6,417,644 B2 | 7/2002 | Hammond et al. |
| 6,459,596 B1 | 10/2002 | Corzine |
| 6,480,403 B1 | 11/2002 | Bijlenga |
| 6,519,169 B1 | 2/2003 | Asplund et al. |
| 6,556,461 B1 | 4/2003 | Khersonsky et al. |
| 6,577,087 B2 | 6/2003 | Su |
| 6,621,719 B2 | 9/2003 | Steimer et al. |
| 6,697,271 B2 | 2/2004 | Corzine |
| 6,757,185 B2 | 6/2004 | Rojas Romero |
| 6,850,424 B2 | 2/2005 | Baudelot et al. |
| 6,897,784 B2 | 5/2005 | Goehlich |
| 6,930,899 B2 | 8/2005 | Bakran et al. |
| 6,954,366 B2 | 10/2005 | Lai et al. |
| 6,969,967 B2 | 11/2005 | Su |
| 7,050,311 B2 | 5/2006 | Lai et al. |
| 7,190,143 B2 | 3/2007 | Wei et al. |
| 7,219,673 B2 | 5/2007 | Lemak |
| 7,230,837 B1 | 6/2007 | Huang et al. |
| 7,319,763 B2 | 1/2008 | Bank et al. |
| 7,372,709 B2 | 5/2008 | Mazumder et al. |
| 7,471,532 B1 | 12/2008 | Salama et al. |
| 7,495,938 B2 | 2/2009 | Wu et al. |
| 7,499,291 B2 | 3/2009 | Han |
| 7,558,087 B2 | 7/2009 | Meysenc et al. |
| 7,573,732 B2 | 8/2009 | Teichmann et al. |
| 7,598,714 B2 | 10/2009 | Stanley |
| 7,663,268 B2 | 2/2010 | Wen et al. |
| 7,667,342 B2 | 2/2010 | Matsumoto et al. |
| 7,679,941 B2 | 3/2010 | Raju et al. |
| 7,710,082 B2 | 5/2010 | Escobar Valderrama et al. |
| 7,719,864 B2 | 5/2010 | Kemahan et al. |
| 7,768,350 B2 | 8/2010 | Srinivasan et al. |
| 7,787,270 B2 | 8/2010 | NadimpalliRaju et al. |
| 7,830,681 B2 | 11/2010 | Abolhassani et al. |
| 7,834,579 B2 | 11/2010 | Nojima |
| 7,839,023 B2 | 11/2010 | Jacobson et al. |
| 7,920,393 B2 | 4/2011 | Bendre et al. |
| 7,932,693 B2 | 4/2011 | Lee et al. |
| 7,940,537 B2 | 5/2011 | Abolhassani et al. |
| 7,969,126 B2 | 6/2011 | Stanley |
| 7,986,535 B2 | 7/2011 | Jacobson et al. |
| 8,018,331 B2 | 9/2011 | Jang |
| 8,026,639 B1 | 9/2011 | Sachdeva et al. |
| 8,031,495 B2 | 10/2011 | Sachdeva et al. |
| 8,045,346 B2 | 10/2011 | Abolhassani et al. |
| 8,144,490 B2 | 3/2012 | El-Barbari et al. |
| 8,144,491 B2 | 3/2012 | Bendre et al. |
| 8,169,108 B2 | 5/2012 | Dupuis et al. |
| 8,279,640 B2 | 10/2012 | Abolhassani et al. |
| 8,294,306 B2 | 10/2012 | Kumar et al. |
| 8,314,602 B2 | 11/2012 | Hosini et al. |
| 8,344,551 B2 | 1/2013 | Nielsen |
| 8,374,009 B2 | 2/2013 | Feng et al. |
| 8,385,091 B2 | 2/2013 | Nielsen |
| 8,400,796 B2 | 3/2013 | Dofnas et al. |
| 8,411,474 B2 | 4/2013 | Roesner et al. |
| 8,427,010 B2 | 4/2013 | Bose et al. |
| 8,441,820 B2 | 5/2013 | Shen et al. |
| 8,471,514 B2 | 6/2013 | Zargari et al. |
| 8,471,604 B2 | 6/2013 | Permuy et al. |
| 8,472,221 B1 | 6/2013 | Lee |
| 8,482,156 B2 | 7/2013 | Spanoche et al. |
| 8,498,137 B2 | 7/2013 | Joseph |
| 8,547,717 B2 | 10/2013 | Kshirsagar |
| 8,559,193 B2 | 10/2013 | Mazumder |
| 8,570,776 B2 | 10/2013 | Kolar et al. |
| 8,587,141 B2 | 11/2013 | Bjerknes et al. |
| 8,599,588 B2 | 12/2013 | Adest et al. |
| 8,619,446 B2 | 12/2013 | Liu et al. |
| 8,664,796 B2 | 3/2014 | Nielsen |
| 8,670,255 B2 | 3/2014 | Gong et al. |
| 8,854,019 B1 * | 10/2014 | Levesque ............... H02M 3/07 323/266 |
| 2003/0043611 A1 | 3/2003 | Bockle et al. |
| 2004/0022081 A1 | 2/2004 | Erickson et al. |
| 2004/0024937 A1 | 2/2004 | Duncan et al. |
| 2005/0127853 A1 | 6/2005 | Su |
| 2005/0139259 A1 | 6/2005 | Steigerwald et al. |
| 2005/0141248 A1 | 6/2005 | Mazumder et al. |
| 2006/0044857 A1 | 3/2006 | Lemak |
| 2006/0197112 A1 * | 9/2006 | Uchihara ............... H01L 31/12 257/213 |
| 2007/0296383 A1 * | 12/2007 | Xu ............... H02M 1/14 323/282 |
| 2009/0196764 A1 | 8/2009 | Fogarty et al. |
| 2010/0060235 A1 | 3/2010 | Dommaschk et al. |
| 2010/0266875 A1 | 10/2010 | Somogye et al. |
| 2011/0013438 A1 | 1/2011 | Frisch et al. |
| 2011/0061705 A1 | 3/2011 | Croft et al. |
| 2011/0065161 A1 | 3/2011 | Kwasinski et al. |
| 2011/0280052 A1 | 11/2011 | Al-Haddad et al. |
| 2012/0068555 A1 | 3/2012 | Aiello et al. |
| 2012/0106210 A1 | 5/2012 | Xu et al. |
| 2012/0112545 A1 | 5/2012 | Aiello et al. |
| 2012/0161858 A1 | 6/2012 | Permuy et al. |
| 2012/0163057 A1 | 6/2012 | Permuy et al. |
| 2012/0218785 A1 | 8/2012 | Li et al. |
| 2012/0218795 A1 | 8/2012 | Mihalache |
| 2012/0223583 A1 | 9/2012 | Cooley et al. |
| 2013/0002215 A1 | 1/2013 | Ikeda et al. |
| 2013/0014384 A1 | 1/2013 | Xue et al. |
| 2013/0033907 A1 | 2/2013 | Zhou et al. |
| 2013/0044527 A1 | 2/2013 | Vracar et al. |
| 2013/0051094 A1 | 2/2013 | Bendre et al. |
| 2013/0128629 A1 | 5/2013 | Clare et al. |
| 2013/0128636 A1 | 5/2013 | Trainer et al. |
| 2013/0154716 A1 * | 6/2013 | Degener ............... H02M 7/487 327/424 |
| 2013/0188406 A1 | 7/2013 | Pouliquen et al. |
| 2013/0208514 A1 | 8/2013 | Trainer et al. |
| 2013/0208521 A1 | 8/2013 | Trainer et al. |
| 2013/0221678 A1 | 8/2013 | Zhang et al. |
| 2013/0235626 A1 | 9/2013 | Jang et al. |
| 2013/0249242 A1 | 9/2013 | Zhang et al. |
| 2013/0264876 A1 | 10/2013 | Paakkinen |
| 2013/0272045 A1 | 10/2013 | Soeiro et al. |
| 2013/0279211 A1 | 10/2013 | Green et al. |
| 2013/0314957 A1 | 11/2013 | Gupta et al. |
| 2013/0322142 A1 | 12/2013 | Raju |
| 2014/0003101 A1 | 1/2014 | Tang et al. |

(56) References Cited

U.S. PATENT DOCUMENTS

| | | | |
|---|---|---|---|
| 2014/0022738 A1 | 1/2014 | Hiller et al. | |
| 2014/0046500 A1 | 2/2014 | Varma | |
| 2014/0049230 A1 | 2/2014 | Weyh | |
| 2014/0097808 A1 | 4/2014 | Clark et al. | |
| 2014/0118158 A1 | 5/2014 | Parra et al. | |
| 2014/0125241 A1* | 5/2014 | Elferich | H05B 33/0815 315/200 R |
| 2014/0167715 A1 | 6/2014 | Wu et al. | |
| 2014/0198542 A1* | 7/2014 | Swamy | H02M 1/4225 363/37 |
| 2014/0198547 A1 | 7/2014 | Heo et al. | |
| 2014/0198548 A1 | 7/2014 | Zhang et al. | |
| 2014/0232364 A1* | 8/2014 | Thomas | H02M 7/483 323/271 |
| 2014/0293667 A1* | 10/2014 | Schroeder | H02M 7/483 363/60 |
| 2014/0300413 A1* | 10/2014 | Hoyerby | H02M 1/08 330/251 |
| 2015/0009734 A1 | 1/2015 | Stahl et al. | |
| 2015/0280608 A1 | 10/2015 | Yoscovich et al. | |

FOREIGN PATENT DOCUMENTS

| | | |
|---|---|---|
| CN | 100431253 C | 11/2008 |
| CN | 101527504 A | 9/2009 |
| CN | 101546964 A | 9/2009 |
| CN | 101692579 A | 4/2010 |
| CN | 101795057 A | 8/2010 |
| CN | 101917016 A | 12/2010 |
| CN | 102013691 A | 4/2011 |
| CN | 102223099 A | 10/2011 |
| CN | 102545681 A | 7/2012 |
| CN | 102594192 A | 7/2012 |
| CN | 102684204 A | 9/2012 |
| CN | 202444420 U | 9/2012 |
| CN | 102709941 A | 10/2012 |
| CN | 102723734 A | 10/2012 |
| CN | 102739080 A | 10/2012 |
| CN | 102868290 A | 1/2013 |
| CN | 103001519 A | 3/2013 |
| CN | 202798507 U | 3/2013 |
| CN | 103066573 A | 4/2013 |
| CN | 103066878 A | 4/2013 |
| CN | 103107720 A | 5/2013 |
| CN | 103116665 A | 5/2013 |
| CN | 103123664 A | 5/2013 |
| CN | 103176470 A | 6/2013 |
| CN | 202997660 U | 6/2013 |
| CN | 103199681 A | 7/2013 |
| CN | 103208929 A | 7/2013 |
| CN | 103219738 A | 7/2013 |
| CN | 103219896 A | 7/2013 |
| CN | 103236800 A | 8/2013 |
| CN | 103248112 A | 8/2013 |
| CN | 103311947 A | 9/2013 |
| CN | 103312209 A | 9/2013 |
| CN | 103312246 A | 9/2013 |
| CN | 103441512 A | 12/2013 |
| CN | 103457501 A | 12/2013 |
| CN | 203398807 U | 1/2014 |
| CN | 203399000 U | 1/2014 |
| CN | 103595284 A | 2/2014 |
| CN | 103633870 A | 3/2014 |
| CN | 103701145 A | 4/2014 |
| CN | 103701350 A | 4/2014 |
| CN | 103731035 A | 4/2014 |
| CN | 103762873 A | 4/2014 |
| CN | 103762881 A | 4/2014 |
| DE | 10103031 A1 | 7/2002 |
| DE | 112010002784 T5 | 8/2012 |
| DE | 102012202173 A1 | 8/2013 |
| DE | 102012202187 A1 | 8/2013 |
| DE | 102012005974 A1 | 9/2013 |
| EP | 0010811 A1 | 5/1980 |
| EP | 0913918 A2 | 5/1999 |
| EP | 1113570 A1 | 7/2001 |
| EP | 1420976 A1 | 5/2004 |
| EP | 1657809 A1 | 5/2006 |
| EP | 1713168 A2 | 10/2006 |
| EP | 1051799 B1 | 7/2008 |
| EP | 2110939 A1 | 10/2009 |
| EP | 2160828 A1 | 3/2010 |
| EP | 2178200 A1 | 4/2010 |
| EP | 2256579 A1 | 12/2010 |
| EP | 2312739 A1 | 4/2011 |
| EP | 2372893 A1 | 10/2011 |
| EP | 2408081 A1 | 1/2012 |
| EP | 2495858 A1 | 9/2012 |
| EP | 2533412 A2 | 12/2012 |
| EP | 2560276 A1 | 2/2013 |
| EP | 2568589 A1 | 3/2013 |
| EP | 2568591 A1 | 3/2013 |
| EP | 2590312 A1 | 5/2013 |
| EP | 2596980 A2 | 5/2013 |
| EP | 2621076 A1 | 7/2013 |
| EP | 2650999 A2 | 10/2013 |
| EP | 2654201 A2 | 10/2013 |
| EP | 2677653 A1 | 12/2013 |
| EP | 2779410 A2 | 9/2014 |
| WO | 2006027744 A2 | 3/2006 |
| WO | 2009012008 A2 | 1/2009 |
| WO | 2010051645 A1 | 5/2010 |
| WO | 2011114816 A1 | 9/2011 |
| WO | 2012010053 A1 | 1/2012 |
| WO | 2012010054 A1 | 1/2012 |
| WO | 2012024984 A1 | 3/2012 |
| WO | 2012099176 A1 | 7/2012 |
| WO | 2012118654 A2 | 9/2012 |
| WO | 2012126160 A1 | 9/2012 |
| WO | 2012140008 A2 | 10/2012 |
| WO | 2012144662 A1 | 10/2012 |
| WO | 2013017353 A1 | 2/2013 |
| WO | 2013086445 A1 | 6/2013 |
| WO | 2013089425 A1 | 6/2013 |
| WO | 2013091675 A1 | 6/2013 |
| WO | 2013110371 A2 | 8/2013 |
| WO | 2013120664 A1 | 8/2013 |
| WO | 2013126660 A2 | 8/2013 |
| WO | 2013136377 A1 | 9/2013 |
| WO | 2013137749 A1 | 9/2013 |
| WO | 2013143037 A1 | 10/2013 |
| WO | 2013167189 A1 | 11/2013 |
| WO | 2013177303 A2 | 11/2013 |
| WO | 2013185825 A1 | 12/2013 |
| WO | 2014004065 A1 | 1/2014 |
| WO | 2014006200 A1 | 1/2014 |
| WO | 2014007432 A1 | 1/2014 |
| WO | 2014024185 A1 | 2/2014 |
| WO | 2014030202 A1 | 2/2014 |
| WO | 2014047733 A1 | 4/2014 |
| WO | 2014082221 A1 | 6/2014 |
| WO | 2014082655 A1 | 6/2014 |
| WO | 2014082657 A1 | 6/2014 |
| WO | 2014104839 A1 | 7/2014 |

OTHER PUBLICATIONS

Alonso, et al., "Cascaded H-Bridge Multilevel Converter for Grid Connected Photovoltaic Generators with Independent Maximum Power Point Tracking of Each Solor Array", 2003 IEEE 34th, Annual Power Electronics Specialists Conference, Acapulco, Mexico, Jun. 15-19, 2003, pp. 731-735, vol. 2.

Walker, "Cascaded DC-DC Converter Connection of Photovoltaic Modules", 33rd Annual IEEE Power Electronics Specialists Conference. PESC 2002. Conference Proceedings. CAIRNS, Queensland, Australia, Jun. 23-27, 2002; [Annual Power Electronics Specialists Conference], New York, NY: IEEE US, vol. 1, Jun. 23, 2002, pp. 24-29, XP010596060 ISBN: 978-0-7803-7262-7, figure 1.

Duarte, "A Family of ZVX-PWM Active-Clamping DC-to-DC Converters: Synthesis, Analysis and Experimentation", Telecommunications Energy Conference, 1995, INTELEC '95, 17th Inter-

(56) References Cited

OTHER PUBLICATIONS national The Hague, Netherlands, Oct. 29-Nov. 1, 1995, New York, NY, US, IEEE, US, Oct. 29, 1995, pp. 502-509, XP010161283 ISBN: 978-0-7803-2750-4 p. 503-504.
Iyomori H et al: "Three-phase bridge power block module type auxiliary resonant AC link snubber-assisted soft switching inverter for distributed AC power supply", INTELEC 2003. 25th. International Telecommunications Energy Conference. Yokohama, Japan, Oct. 19-23, 2003; Tokyo, IEICE, JP, Oct. 23, 2003 (Oct. 23, 2003), pp. 650-656, XP031895550, ISBN: 978-4-88552-196-6.
Yuqing Tang: "High Power Inverter EMI characterization and Improvement Using Auxiliary Resonant Snubber Inverter", Dec. 17, 1998 (Dec. 17, 1998), XP055055241, Blacksburg, Virginia Retrieved from the Internet: URL:http:jscholar.lib.vt.edu/theses/available/etd-012299-165108/unrestricted/THESIS. PDF, [retrieved on Mar. 5, 2013].
Yoshida M et al: "Actual efficiency and electromagnetic noises evaluations of a single inductor resonant AC link snubber-assisted three-phase soft-switching inverter", INTELEC 2003. 25th. International Telecommunications Energy Conference. Yokohama, Japan, Oct. 19-23, 2003; Tokyo, IEICE, JP, Oct. 23, 2003 (Oct. 23, 2003), pp. 721-726, XP031895560, ISBN: 978-4-88552-196-6.
Third party observation—EP07874025.5—Mailing date: Aug. 6, 2011.
Meynard, T. A., and Henry Foch. "Multi-level conversion: high voltage choppers and voltage-source inverters." Power Electronics Specialists Conference, 1992. PESC'92 Record., 23rd Annual IEEE. IEEE, 1992.
Gow Ja A et al: "A Modular DC-DC Converter and Maximum Power Tracking Controller Formedium to Large Scale Photovoltaic Generating Plant"8th European Conference on Power Electronics and Applications. Lausaane, CH, Sep. 7-9, 1999, EPE. European Conference on Power Electronics and Applications, Brussls: EPE Association, BE, vol. Conf. 8, Sep. 7, 1999, pp. 1-8, XP000883026.
Matsuo H et al: "Novel Solar Cell Power Supply System Using the Miltiple-input DC-DC Converter" 20th International telecommunications Energy Conference. Intelec '98 San Francisco, CA, Oct. 4-8, 1998, Intelec International Telecommunications Energy Conference, New York, NY: IEEE, US, Oct. 4, 1998, pp. 797-802, XP000896384.
Xiaofeng Sun, Weiyang Wu, Xin Li, Qinglin Zhao: A Research on Photovoltaic Energy Controlling System with Maximum Power Point Tracking:; Proceedings of the Power Conversion Conference-Osaka 2002 (Cat. No. 02TH8579) IEEE—Piscataway, NJ, USA, ISBN 0-7803-7156-9, vol. 2, p. 822-826, XP010590259: the whole document.
Meinhardt, Mike, et al., "Multi-String-Converter with Reduced Specific Costs and Enhanced Functionality," Solar Energy, May 21, 2001, pp. 217-227, vol. 69, Elsevier Science Ltd.
Martins, et al.: "Interconnection of a Photovoltaic Panels Array to a Single-Phase Utility Line From a Static Conversion System"; Power Electronics Specialists Conference, 2000. PESC 00. 2000 IEEE 31st Annual; Jun. 18, 2000-Jun. 23, 2000; ISSN: 0275-9306; pp. 1207-1211, vol. 3.

Shimizu, Toshihisa, et al., "A Flyback-type Single Phase Utility Interactive Inverter with Low-frequency Ripple Current Reduction on the DC Input for an AC Photovoltaic Module System," IEEE 33rd Annual Power Electronics Specialist Conference, Month Unknown, 2002, pp. 1483-1488, vol. 3, IEEE.
Zhang et al., "Capacitor voltage balancing in multilevel flying capacitor inverters by rule-based switching pattern selection", May 2007, p. 339-347.
Partial European Search Report—EP Appl. 14159869—dated Sep. 14, 2015.
Liu et al. "A Compact Power Converter for High Current and Low Voltage Applications", Industrial Electronics Society, 39th Annual Conference of the IEE, Nov. 2013, pp. 140-144.
European Search Report—EP Appl. 15160896.5—dated Oct. 23, 2015.
European Extended Search Report—EP Appl. 14159869.8—dated Jan. 12, 2016.
Su, Gui-Jia: "Multilevel DC-Link Inverter", IEEE Transactions on Industry Applications, IEEE Service Center, Piscataway, NJ, US, vol. 41, No. 3, May 2, 2005, pp. 848-854, XP11132530.
Jun. 26, 2017—CN Office Action—CN 201410094169.8.
2008—"Simulink Model of Flying Capacitor Multilevel Inverter"—Adrian Schiop, et al.—11th International Conference on Optimization of Electrical and Electronic Equipment.
Jul. 14, 2017—Chinese Office Action—CN 201510133812.8.
Feb. 13, 2017—EP Search Report EP App 17203127.
2012—Konstantinou et al., "The Seven-level Flying Capacitor based ANPC Converter for Grid Intergration of Utility-Scale PV Systems" 3rd IEEE International Symposium on Power Electronics for Distributed Generation Systems (PEDG) pp. 592-597.
Oct. 2012—Pulikanti et. al, "DC-Link Voltage Ripple Compensation for Multilevel Active-Neutral-Point-Clamped Coverters Operated with SHE-PWM" IEEE Transactions on Power Deliver, vol. 27, No. 4 pp.2176-2184.
2008—Winkelnkemper et. al, "Control of a 6MVA Hybrid Converter for a Permanent Magnet Synchronous Generator for Windpower" Proceedings of the 2008 International Conference on Electrical Machines pp.2-6.
Dec. 5-8, 2011—Muneshima et. al, "A New Time-Sharing Charge 5L Inverter" IEEE PEDS 2011 pp. 115-120.
Sep. 20-24, 2009—Li et. al, "An Optimum PWM Strategy for 5-Level Active NPC (ANPC) Converter Based on Real-time Solution for THD Minimization" pp. 1976-1982.
Mar. 14-17, 2010—Kieferndorft, et. al, "A New Medium Voltage Drive System Based on ANPC-5L Technology" pp. 543-649.
2012—Pulikanti et. al, "Generalisation of flying capacitor-based active-neutral-point-clamped multilevel converter using voltage-level modulation" IET Power Electron, 2012, vol. 5, Issue 4, pp. 456-466.
Sep. 15-19, 2013—Wang et. al, "Capacitor Voltage Balancing of Five-Level ANPC Converter based on Zero-Sequence Voltage Injection Using PS-PWM" pp. 4035-4040.
Sep. 13, 2013—Notice of Opposition, EP App No.: 15160896.5.

* cited by examiner

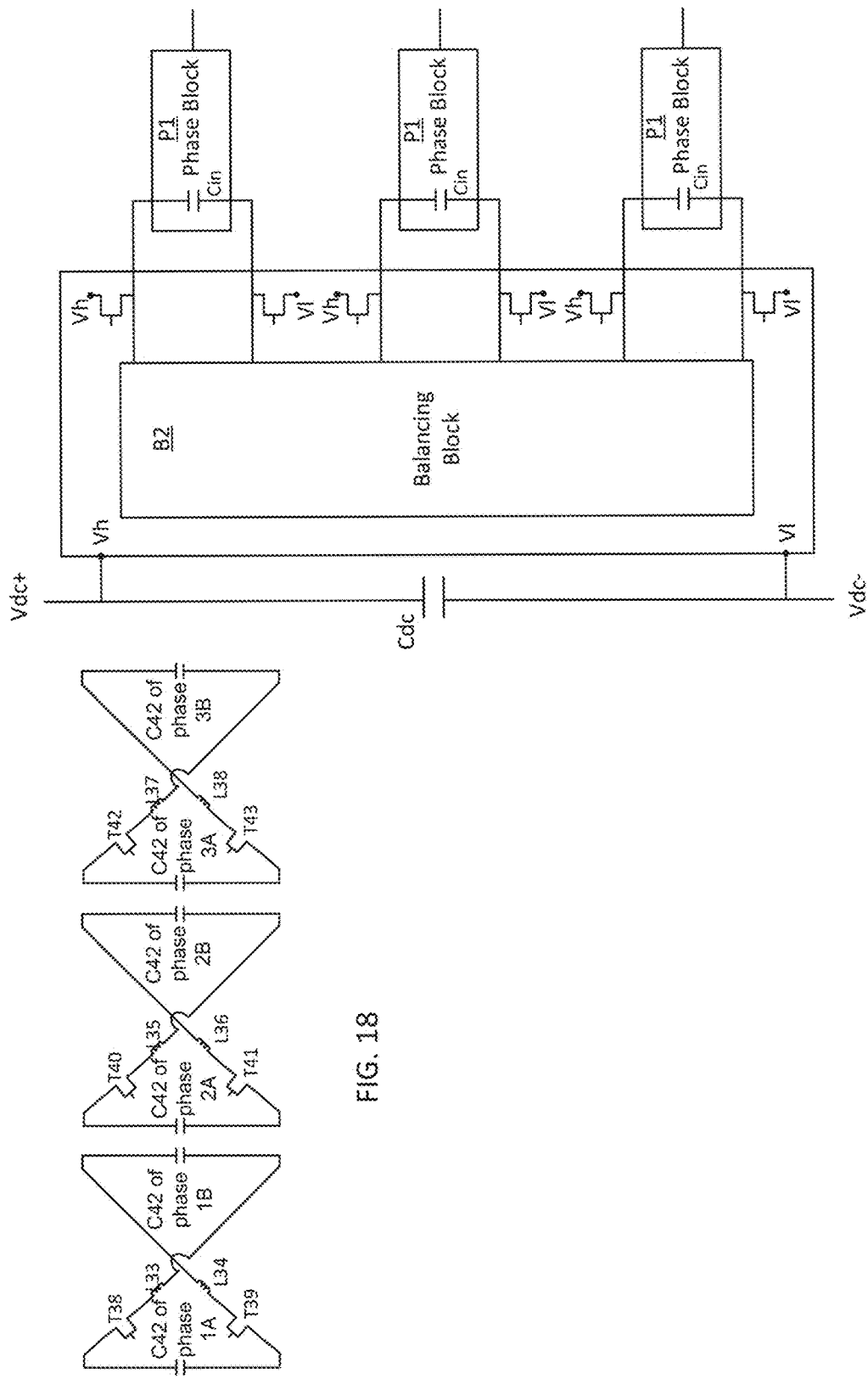

POWER RIPPLE COMPENSATION

RELATED APPLICATIONS

The present application is a continuation of U.S. patent application Ser. No. 15/054,647, filed Feb. 26, 2016, entitled "MULTI-LEVEL INVERTER WITH FLYING CAPACITOR TOPOLOGY," which is a continuation of U.S. patent application Ser. No. 14/485,682, filed Sep. 13, 2014 entitled "MULTI-LEVEL INVERTER WITH FLYING CAPACITOR TOPOLOGY," which claims priority benefit to U.S. Provisional Application No. 61/970,788 entitled "MULTI-LEVEL INVERTER" and filed on Mar. 26, 2014. The above referenced applications are hereby incorporated by reference in their entireties. The present application is related to U.S. patent application Ser. No. 13/826,556, entitled "Multi-level Inverter," filed Mar. 14, 2013, which is hereby incorporated by reference in its entirety.

BACKGROUND

Despite many years of research, the search for a more cost-effective inverter implementation (either single phase or three phases) has thus far has been elusive. Some attempts utilize high voltage switches (e.g. 600V IGBTs) in a topology that is aimed at reducing switching losses and/or the size of passive components (mainly magnetics). See, for example, "Multilevel inverters: A survey of Topologies, Control and Applications". These inverters, which are aimed at reducing switching losses typically include high voltage switches (e.g. 600V IGBTs) that switch at a frequency around ×10 of the line frequency (50 Hz) or up to 16 kHz. The IGBT switching losses are considerable at this range of frequencies and even at the low end of these frequencies. Further, the low frequency switching causes the choke to approach or exceed 20% of the overall cost of the inverter. Alternative research has sought to use even more advanced switch technology (e.g., Silcon Carbide and/or Galium Nitride) in order to increase frequency and reduce the size of passive components. This research can reduce switching losses to some extent as well but only at the high cost of the advanced switch technology. Despite extensive research, these inverter topologies offer only limited improvements and cannot achieve the cost reduction and efficiencies needed for efficient inverter technologies.

There remains a need for a low cost, high efficiency inverter technology.

SUMMARY

The following summary is for illustrative purposes only, and is not intended to limit or constrain the detailed description.

Embodiments herein may employ a multi-level inverter (e.g., a single phase and/or three phase inverters) with a specialized control system which enables low cost inverters with a high efficiency. In some embodiments discussed herein, a multi-level inverter may be utilized where the output of the inverter (before filtering) has several voltage steps thereby reducing the stress on the magnetics of the inverter and improving the output voltage shaping which allows further reduction in switching frequency.

In exemplary multi-level inverters (either single phase or three phase) described herein, the control system allows the use of low-voltage MOSFETs (e.g. 80V) in order to form an equivalent switch of higher voltage (e.g. using six 80V MOSFETs resulting in an equivalent 480V switch). The conduction and switching characteristics of the low voltage switching multi-level inverter are substantially and unexpectedly improved over other multi-level inverter implementations. In these embodiments, by staggering the turning on and off of the low voltage MOSFETs, a lower frequency modulation may be utilized for each of the multi-level switches, e.g., each of the MOSFETs may be switched at a moderate frequency (e.g. 200 kHz) while maintaining low switching losses compared to other switch technologies and gaining the benefits of an effective frequency of 200 kHz*N where N is the number of switches in series that are staggered in time, thereby reducing the size requirements of the passive parts according to the effective extended frequency. In some embodiments, the MOSFETs may be switched in at staggered times according to a duty cycle ratio (which may or may not change according to the sine-wave), where each MOSFET is shifted by, for example, ⅙ of the switching period (for examples with 6 MOSFETs in a series).

In accordance with embodiments discussed herein, in addition to the advantages with respect to conduction and switching losses discussed herein, these examples offer other major benefits such as the reduction of passive components (e.g., in the main choke magnetics and/or output filter). For example, due to the multi-level voltages and low cost MOSFET switches, a reduction in size and/or cost by a factor of N (e.g. 6 in the example) can be achieved. In addition, exemplary embodiments discussed herein can achieve an effective frequency within the main choke which may be N times the switching frequency (e.g. 6*200 kHz in this example). As a result, in these embodiments, the main choke can be smaller by a factor of N^2 (e.g. 36) relative to a standard design. In embodiments described herein, the overall gain factor in the main choke size relative to a standard IGBT-based inverter system utilizing 16 kHz switching frequency may be, for example, 200 kHz/16 kHz*36=450, rendering the cost of the choke to be so small that it becomes almost negligible in multi-level inverter examples described herein. A similar calculation can be made for the output filter showing even greater advantage in reduction in cost and increases in efficiencies.

As noted above, this summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIG. 18 illustrates an example of a six phase balancing block in accordance with embodiments described herein.

FIG. 19 illustrates another embodiment of a multi-level inverter in accordance with embodiments described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1A:
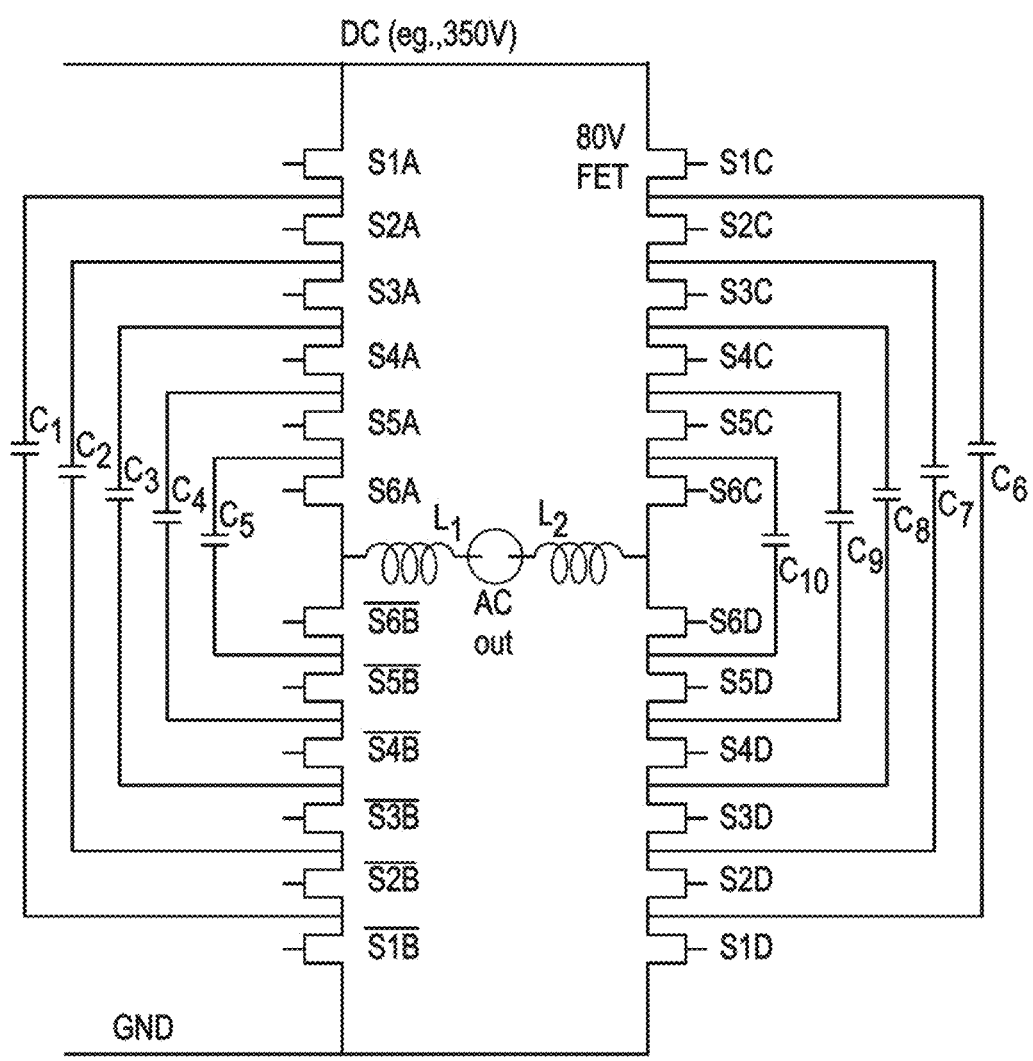
FIG. 1A-1I illustrate various examples multi-level inverter circuits in accordance with embodiments herein.

Referring to FIG. 1A, an exemplary multi-level inverter includes one, two, or more parallel connections each comprising a plurality of different switches disposed across a DC voltage. The switches may be coupled to a number of capacitors and/or inductors which may be utilized to smooth a sine-wave of an AC output of the inverter. For example, a plurality of switch banks S1A-S6A, S6B-S1B, S1C-S6C, and/or S6D-S1D may be disposed in any suitable configuration such as that shown in FIG. 1A. Each of the banks of MOSFET transistors may be variously configured to include two, three, four, five, six, seven, eight, nine, ten, eleven, twelve or more transistors.

Figure 1B:
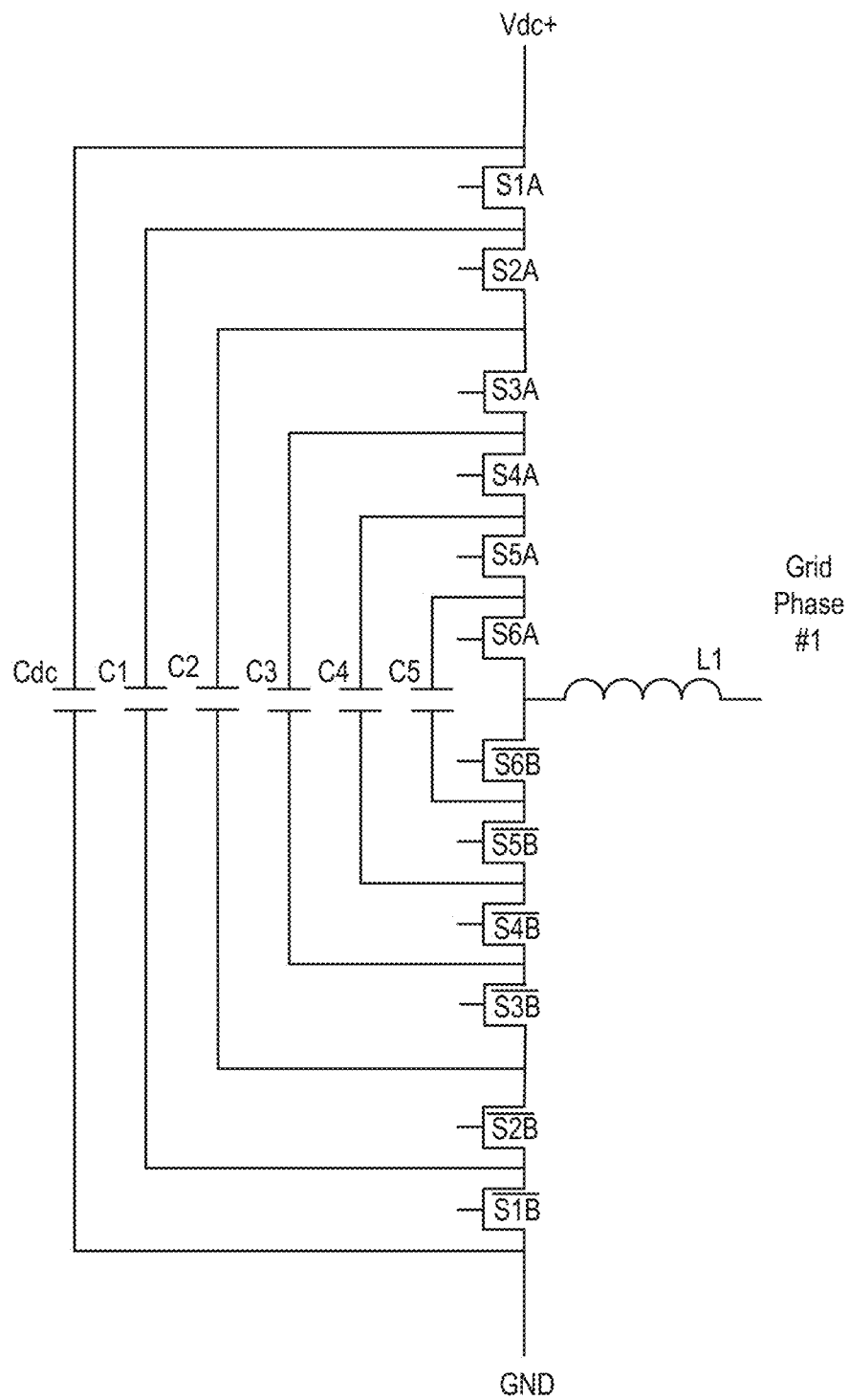

FIG. 1B illustrates half of the circuit illustrated in FIG. 1A. In various embodiments, during steady-state operation the capacitor voltages (C1, C2, C3, C4, and C5) average at $5/6*Vdc$, $4/6*Vdc$, $3/6*Vdc$, $2/6*Vdc$, $1/6*Vdc$ respectively (e.g. multiples of 1/N, where N is the number capacitors or the number switches in a bank, assuming the capacitors are of equal value). For embodiments where the capacitors are not of the same value, steady-state average voltage across each capacitor will scale accordingly.

During periods when the inverter is not operating at steady-state, such as during start-up of the inverter or during standby of the inverter, some embodiments may pre-charge the capacitors to their steady-state operating voltages.

Figure 1C:
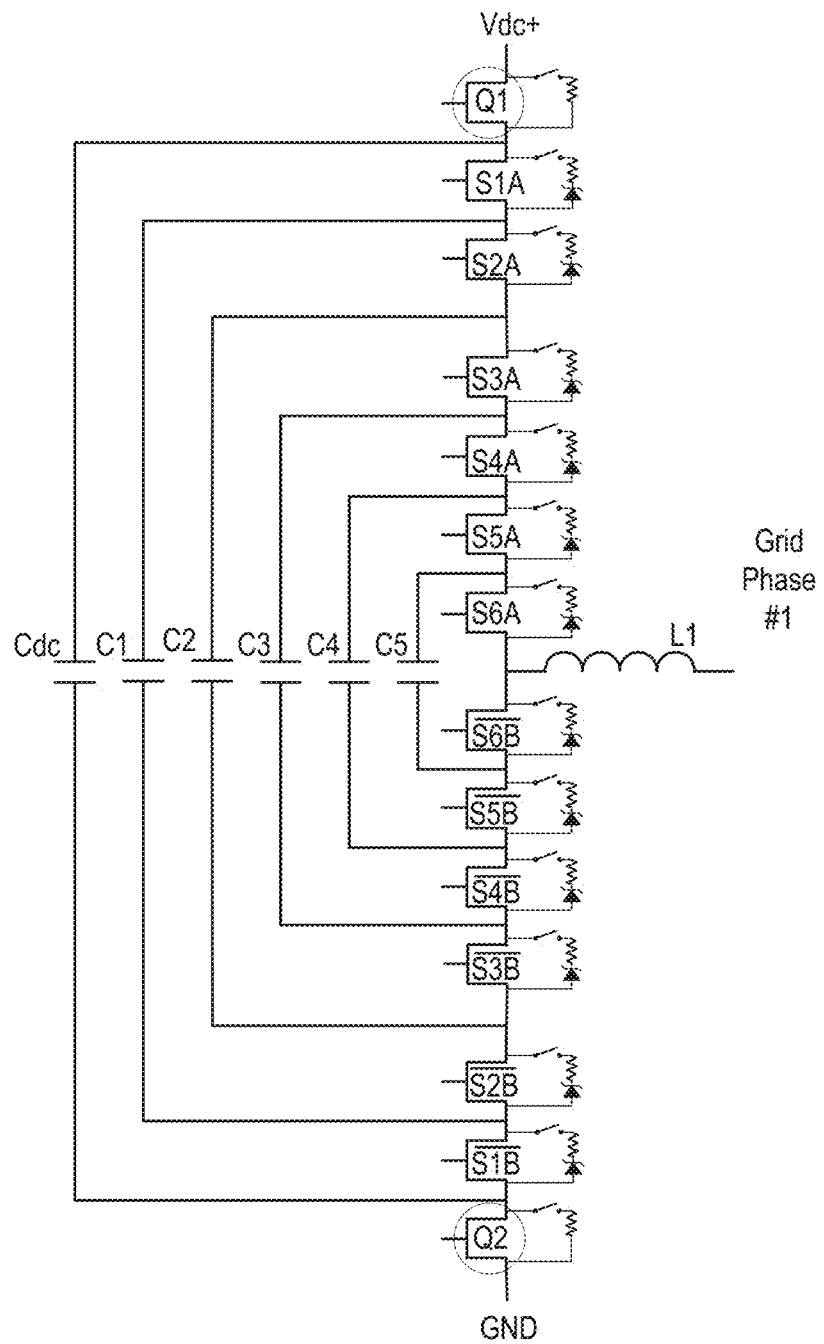

One embodiment for pre-charging capacitor voltage during non-steady-state operation of the inverter includes switching series zener diodes and resistors in parallel to each of the MOSFETs as shown in FIG. 1C. The capacitors are charged according to these resistor dividers, with the zener diodes protecting the MOSFETs from over-voltage. The zener diodes and resistors can be switched off once the capacitors are charged to their voltages for steady state operation of the inverter. In some embodiments, switches Q1 and Q2 may be added, each with a parallel bypass resistor path that can be optionally switched. During charging, Q1 and Q2 can be switched OFF and the parallel bypass switched ON (if a switch is present), such that the resistors in the parallel bypass path to Q1 and Q2 can limit the charging current from Vdc. Once charged, Q1 and Q2 can be switched ON, for normal operation of the inverter. When this option of Q1/Q2 is used, the parallel path to Q1 and Q2 may optionally include series zener diodes.

Figure 1D:
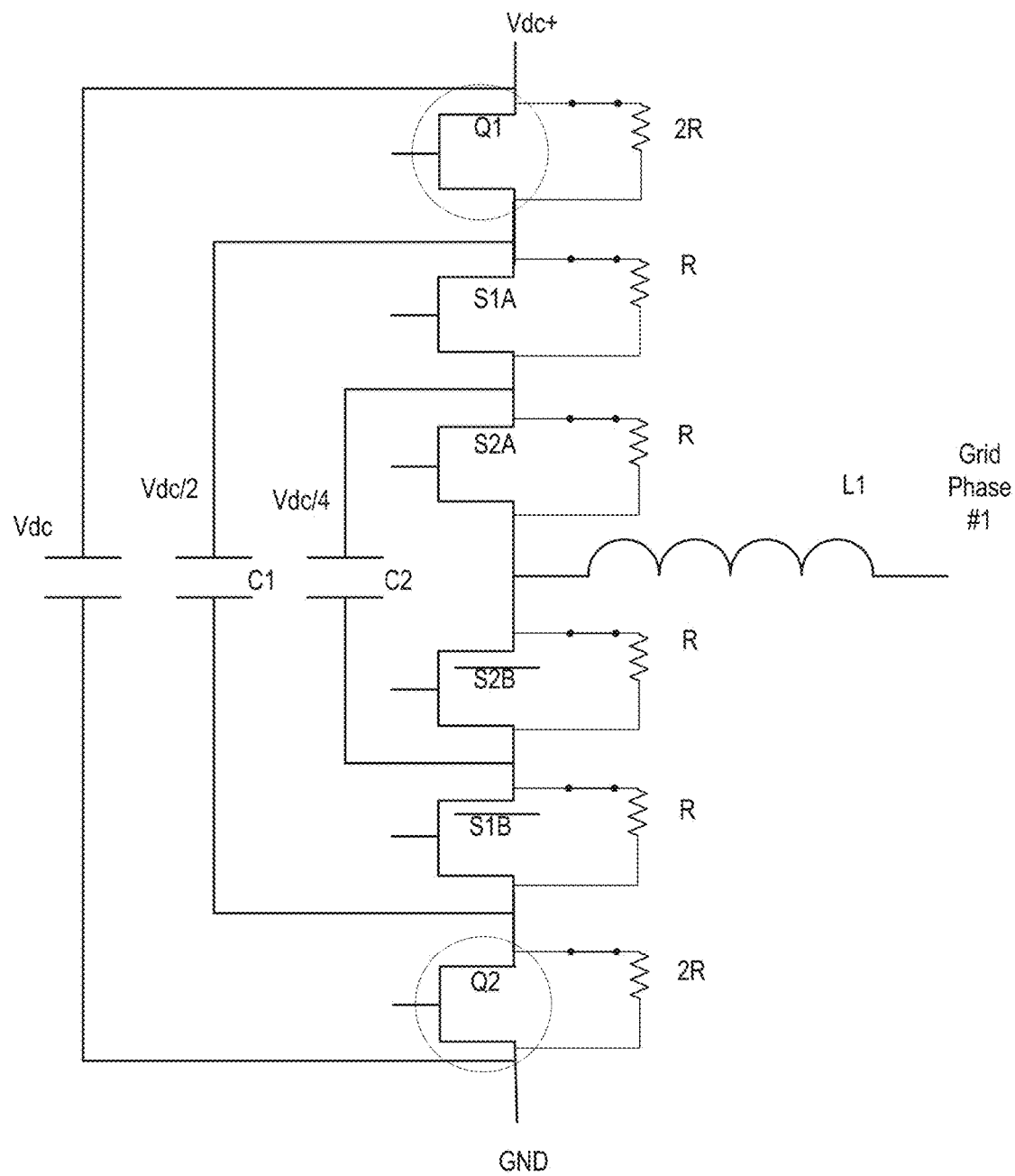

FIG. 1D illustrates another embodiment where N=2 (e.g., two MOSFETs in series). Q1 and Q2 are added in this implementation for operation in the pre-charge process as described with respect to FIG. 1C. In this embodiment, the zener diodes are eliminated from each parallel resistor path. In one example, with the resistance across Q1 and Q2 equaling 2R and the resistance across each inverter switch S1A, S2A, S1B, and S2B equaling R, voltages of Vdc/2 and Vdc/4 are generated with no current draw from the output (as is the case prior to steady-state operation).

Figure 2A:
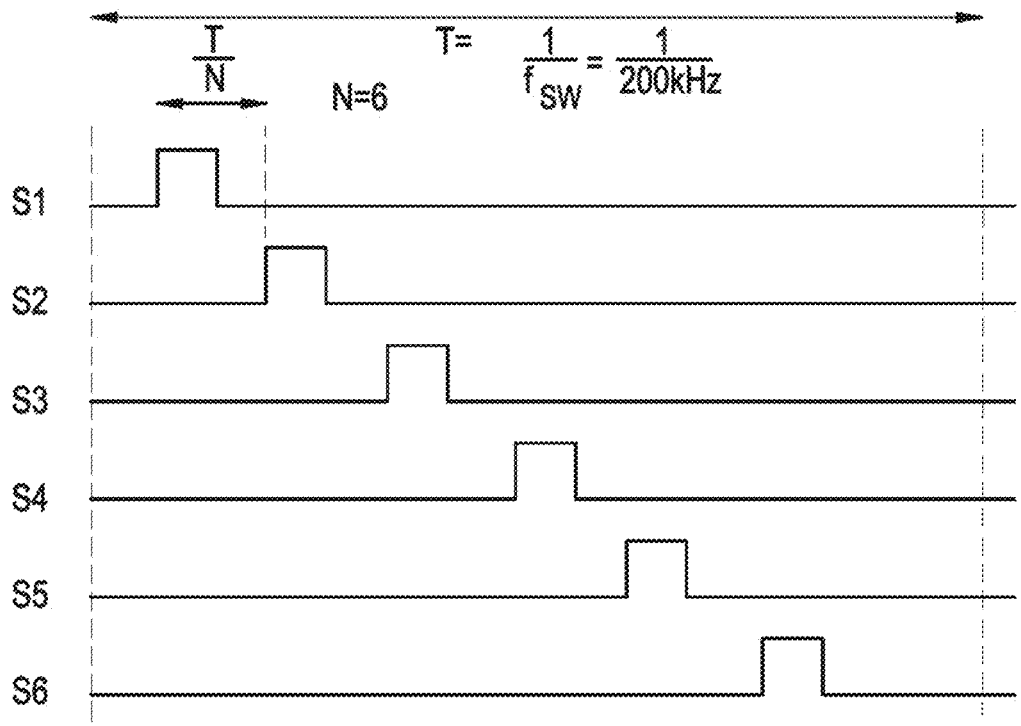
FIGS. 2A-2F illustrate algorithms for controlling multi-level inverter in accordance with embodiments herein.
Figure 3:
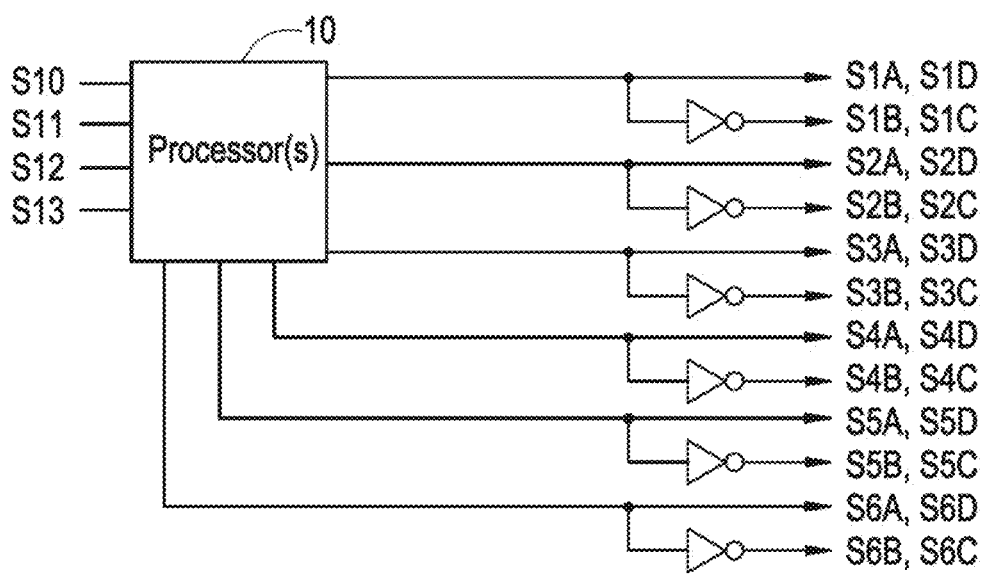
FIG. 3 illustrates an exemplary control for embodiments herein.

Once the capacitors are pre-charged, the inverter may operate in steady-state with the timing shown in FIG. 2A, for example, or with other various timings. Referring to FIG. 3, each of the switches may be controlled by an output from a processor 10 (e.g., logic, one or more processor(s), controls, state machine, controller, microprocessor, software driven control, gate array, and/or other controller). In this embodiment, switch bank A comprises a series of FET transistors S1A-S6A (e.g., 20 v, 40 v, 60 v, 80 v, 100 v, 120 v MOSFET transistors) connected together in, for example, a source to drain configuration to form a first switching bank; switch bank B comprises a series of FET transistors S1B-S6B (e.g., 20 v, 40 v, 60 v, 80 v, 100 v, 120 v MOSFET transistors) connected together in, for example, a source to drain configuration to form a second switching bank; switch bank C comprises a series of FET transistors S1C-S6C (e.g., 20 v, 40 v, 60 v, 80 v, 100 v, 120 v MOSFET transistors) connected together in, for example, a source to drain configuration to form a third switching bank; switch bank D comprises a series of FET transistors S1D-S6D (e.g., 20 v, 40 v, 60 v, 80 v, 100 v, 120 v MOSFET transistors) connected together in, for example, a source to drain configuration to form a fourth switching bank. While six 80 volt FET transistors are used for each switch bank in this example, either more and/or less transistors can be utilized with different voltages e.g., 20 v, 40 v, 60 v, 80 v, 100 v, 120 v. For example, where 12 transistors are utilized in each switching bank, the voltages across those transistors may be adjusted to a suitable voltage such as 40 volts and the switching frequency of the transistors within one cycle may be increased from the example where only 6 transistors are utilized (e.g., switching each transistor at twice the rate).

Referring to FIG. 2A, each of the MOSFETs may be controlled to switch using a high frequency (e.g. around 200 kHz in this example) while still having low switching losses compared to other switch technologies. As shown in FIG. 2A, for this example, the MOSFETs are switched according to the duty cycle ratio (which changes according to the sine-wave) in the following simple manner (shown for six MOSFETs in series), where each MOSFET in series is shifted sequentially by ⅙ of the switching period. The specific timing shown in FIG. 2A is an example of the required duty cycles and a variety of different timings may be used that may have similar or different switching performance.

The duty cycle of the control signals may be varied according to required conversion ratio of the inverter, which may include a full range of duty cycles starting from 0 and ending up at 1 throughout, for example, a 50/60 Hz sine wave. When the required duty cycle D is smaller than T/N, the switch timing does not have any overlap as shown in FIG. 2A. When the required duty cycle is higher than T/N, the control signals start to overlap up to point where there is a full overlap between all control signals at the duty cycle of 1 (all switches are ON constantly).

Figure 2B:
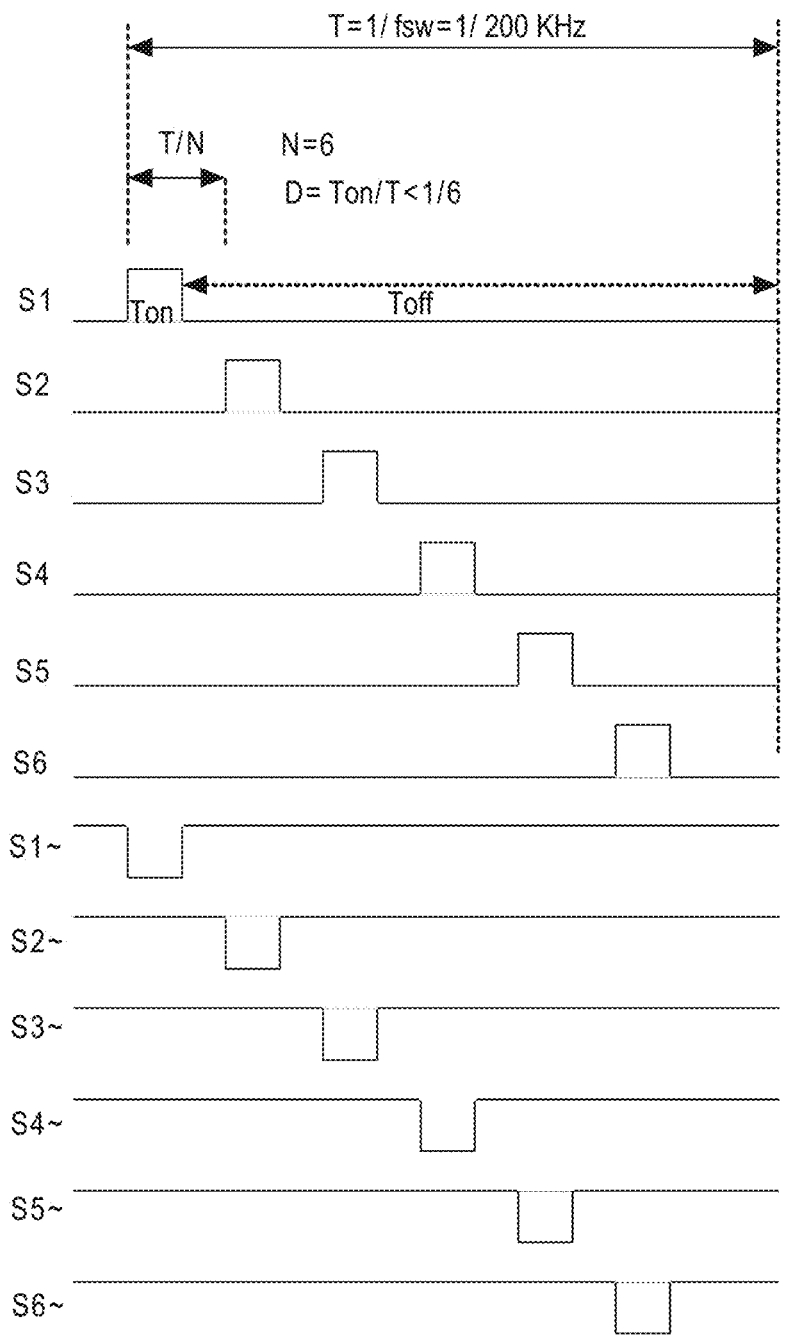

FIG. 2B illustrates a more detailed diagram of low duty cycles where there is no overlap. The figure includes both control signals S1 through S6 respectively for switches S1A-S6A and signals S1~ through S6~ respectively for switches S1B-S6B.

Figure 1E:
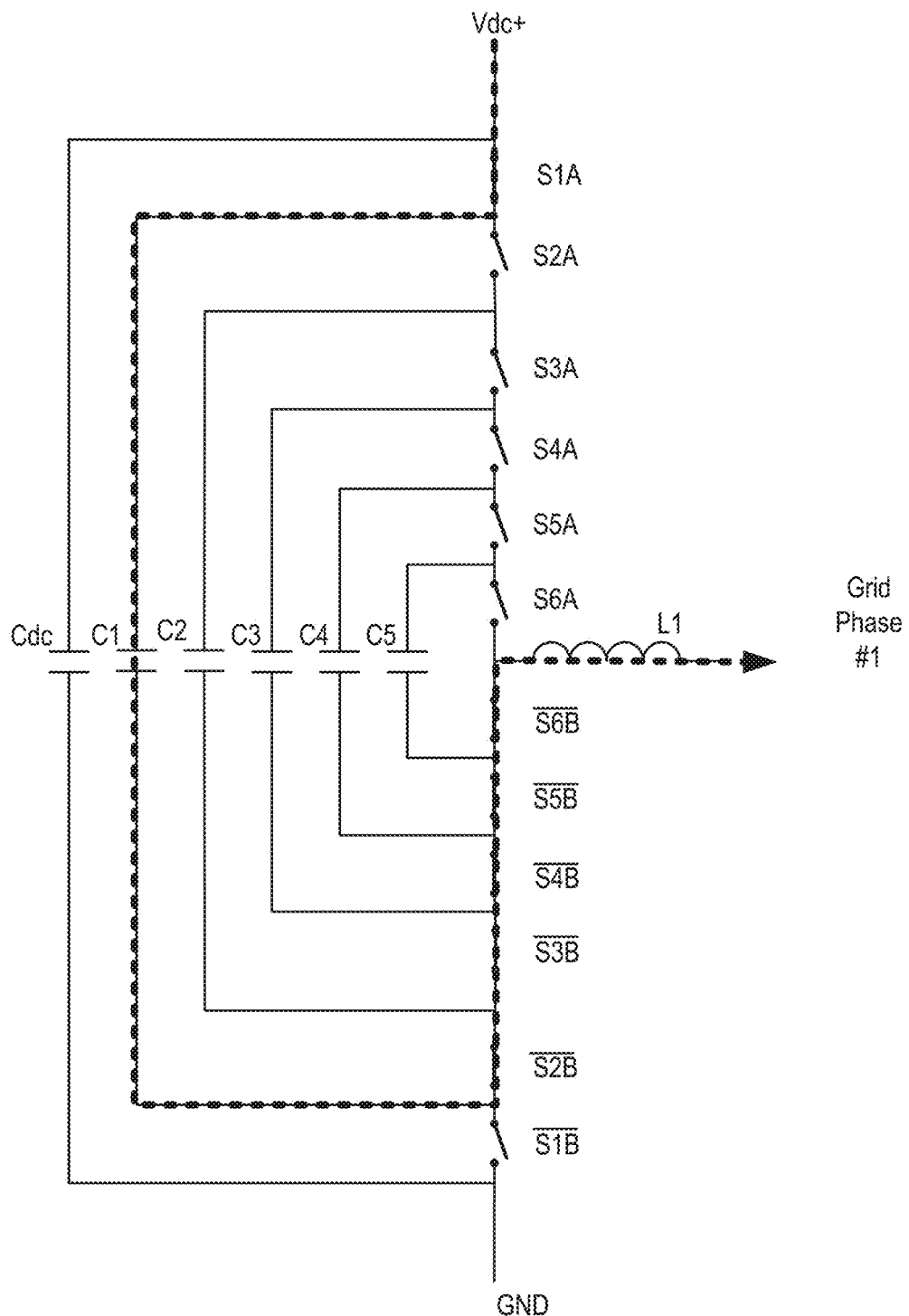

When there is no overlap of the control signals, only one out of six MOSFET is ON (i.e., closed) on the high-side while only one out of six MOSFETS is OFF (i.e., open) on the low side as shown in FIG. 1E. FIG. 1E is illustrated with the MOSFETS represented as switches, with switch states corresponding to signal S1 On in FIG. 2B. As shown by the dotted line, the current flow is from Vdc+ towards the output (Grid phase #1) while passing through the MOSFETs that are ON and passing through capacitor C1, resulting in C1 charging with some ripple current. Since C1 is charged with ⅚*Vdc the total output voltage in this case, the output voltage is Vdc−⅚*Vdc=⅙*Vdc. When S1 goes off in FIG. 2B, S1=S2=S3=S4=S5=S6=0 which yields an output voltage of 0. Subsequently S2 will be on resulting in an output being the voltage difference between C1 and C2 (⅚*Vdc−⁴⁄₆*Vdc=⅙*Vdc). The pattern continues with ⅙*Vdc at the output occurring when each switch is turned on. Therefore, during the multiplexing between the on state of one switch and the off states, any voltage between 0 to ⅙*Vdc can be generated with PWM. This occurs for any case where the duty cycles are below ⅙, resulting in no overlap in ON signals between the MOSFETs.

Figure 2C:
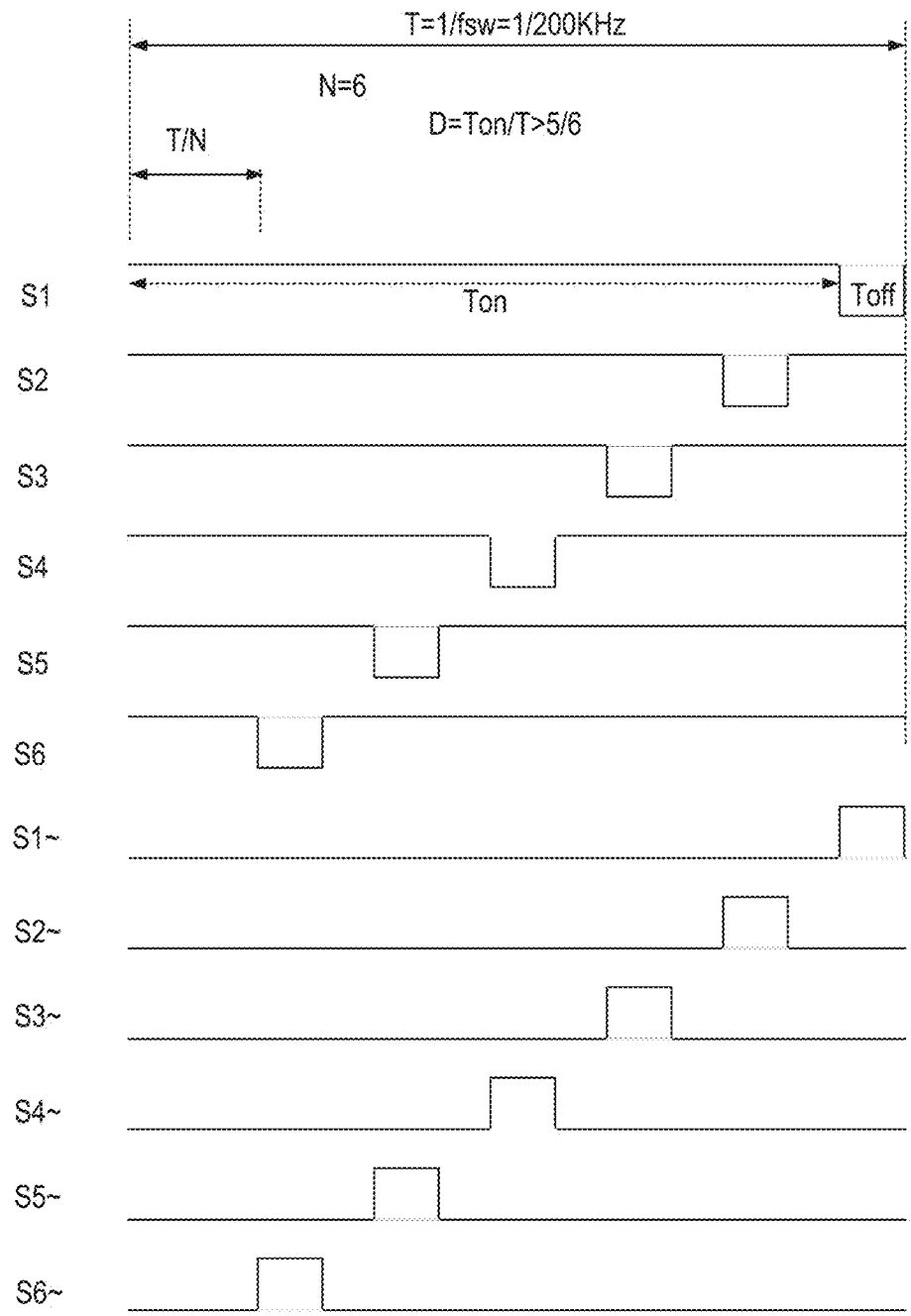

FIG. 2C illustrates another example of a timing diagram with a high duty cycle where there is an overlap between all the MOSFETs besides one (when the duty cycle is higher than ⅚).

Figure 1F:
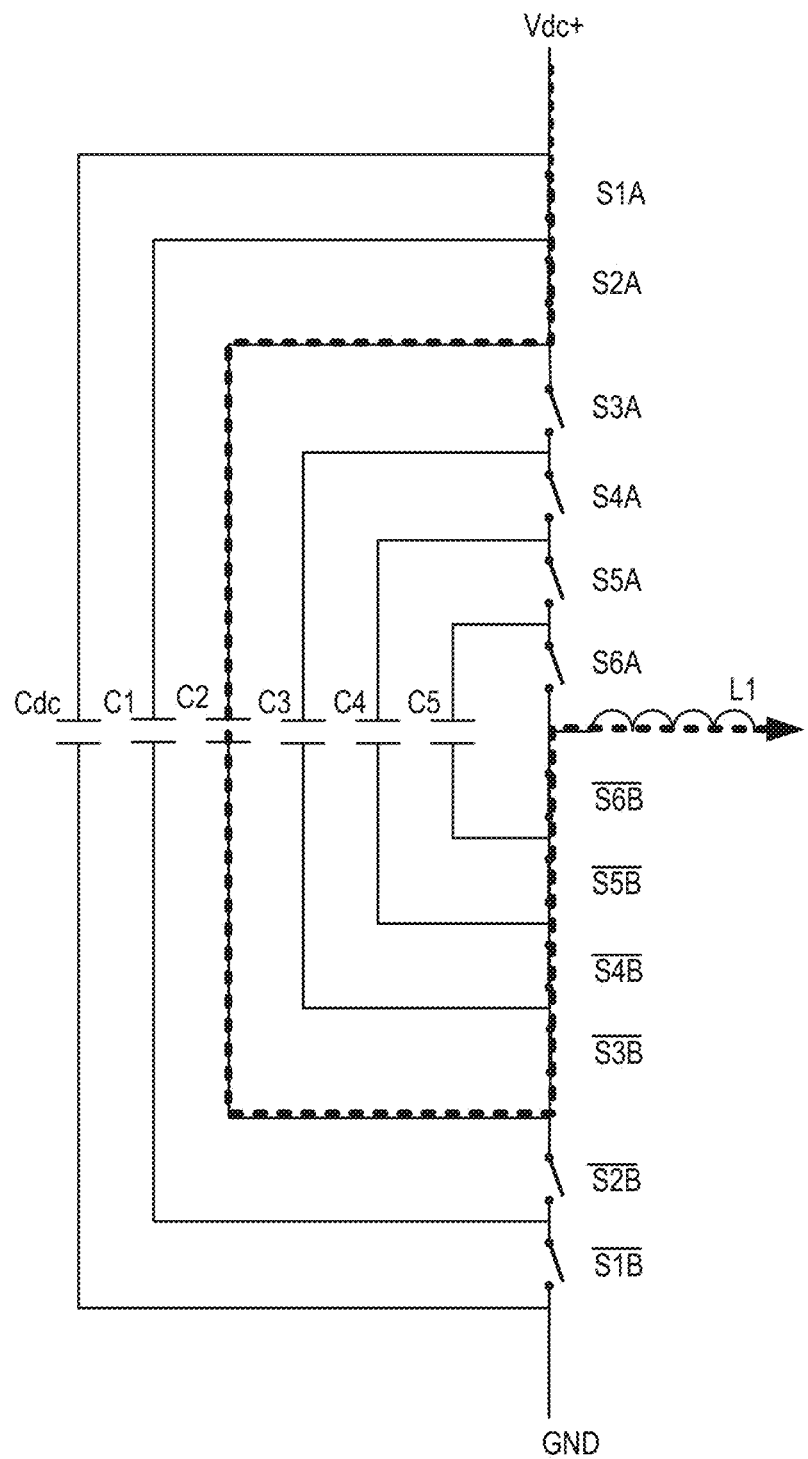

As another example, FIG. 1F shows the switch states and current flow when there is an overlap between S1 and S2 (due to a duty cycle between ⅙ and ⅖ in this specific example. The dotted line again shows the path from Vdc towards the output, and in this case capacitor C2 is used. C2 is charged to a voltage of ⁴⁄₆*Vdc, and therefore the output is Vdc−⁴⁄₆*Vdc=²⁄₆*Vdc. In this specific case the PWM multiplexing will be between ⅙*Vdc (as in the previous case of a single MOSFET in the ON state) and ²⁄₆*Vdc, corresponding to a duty cycle that is between ⅙ and ⅖.

Figure 1G:
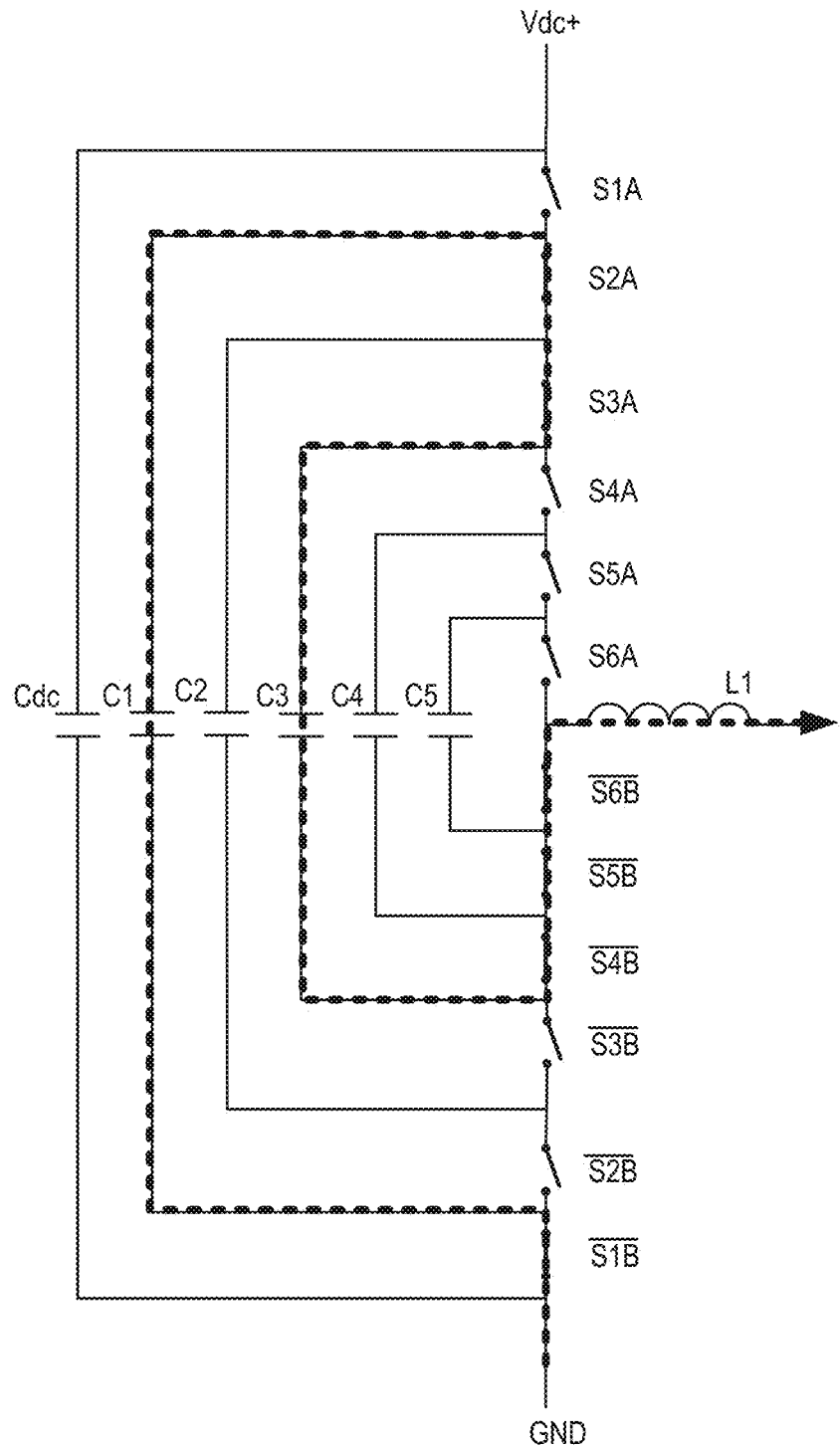

Another example of a duty cycle between ⅙ and ⅖ is shown in FIG. 1G where two capacitors are used in the same path towards the output. This is a case of overlap between S2 and S3, again for duty cycles between ⅙ and ⅖. The path goes through capacitor C1 (Vdc*⅚) and capacitor C3 (Vdc*⅜) but in different directions, such that the output voltage is Vdc*⅚−Vdc*⅜=Vdc*²⁄₆, which is the same as the previous case. Now, however, capacitor C3 gets charged with ripple current and capacitor C1 gets discharged with ripple current. It is noted that capacitor C1 was charged in the previous case now gets discharged and eventually can ripple about the same value (⅝Vdc).

In various embodiments, the basic timing diagram that was presented is built such that the same duty cycle is used for all six MOSFETs and there is a phase delay of T/N between these MOSFETs which will eventually yield the required voltages according to the duty cycles while keeping all of the capacitors charged and discharged to the same average value.

Figure 2D:
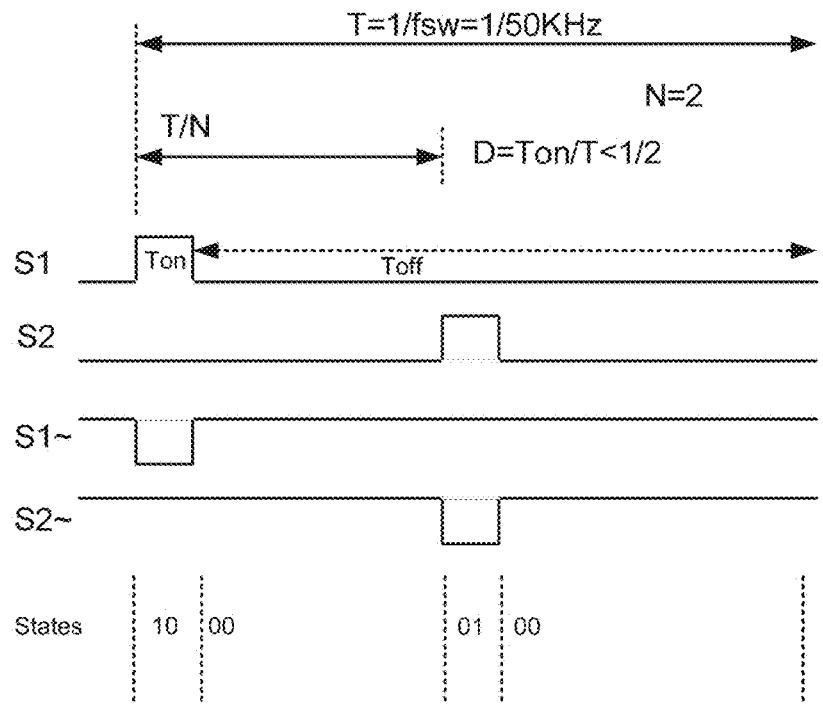
Figure 2E:
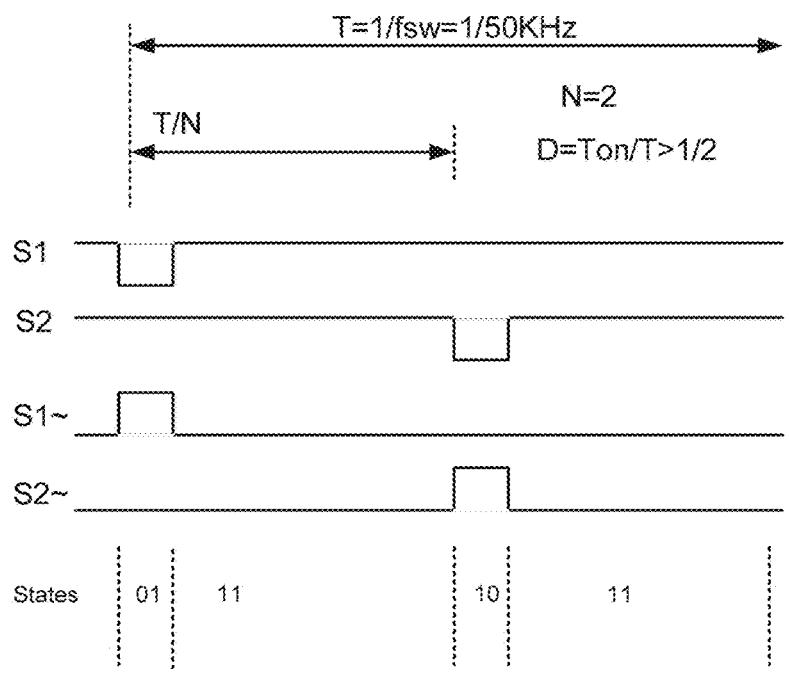

As further examples, FIGS. 2D and 2E illustrate timing diagrams for low duty cycles and high duty cycles, respectively for the circuit implementation of FIG. 1D based on N=2 (two MOSFETs in series). For each of these cases (low duty cycle, high duty cycle), there are several states (00, 01, 10, 11) where 0 and 1 denote which of the switches [S1,S2] are ON or OFF (and S1~ and S2~ follow them as complementary signals).

Figure 1H:
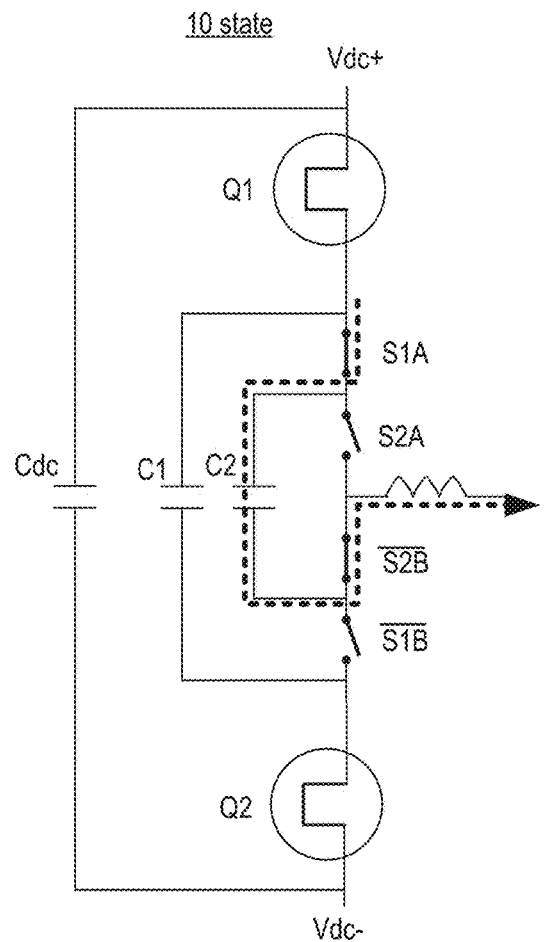
Figure 1I:
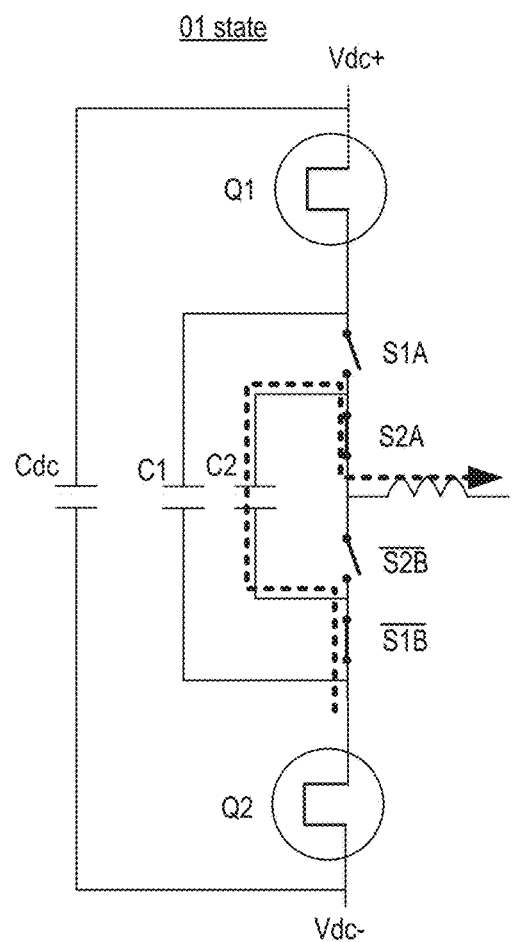

For states 00 (S1 and S2 OFF) and 11 (S1 and S2 ON), current flows directly from Vdc or GND, without going through the capacitor C2 (also identified as the flying capacitor). However, states 01 and 10 flow current into the capacitor where each of these states is opposite in the current direction as shown in FIGS. 1H and 1I. In the timing diagrams shown FIGS. 2D and 2E, the dwell time in state 01 and state 10 is the same and therefore the capacitor C2 gets charged and discharged by the same portion and eventually stays balanced. However, due to possible mismatches and drifts there is a need to actively tune the capacitor voltage.

Figure 2F:
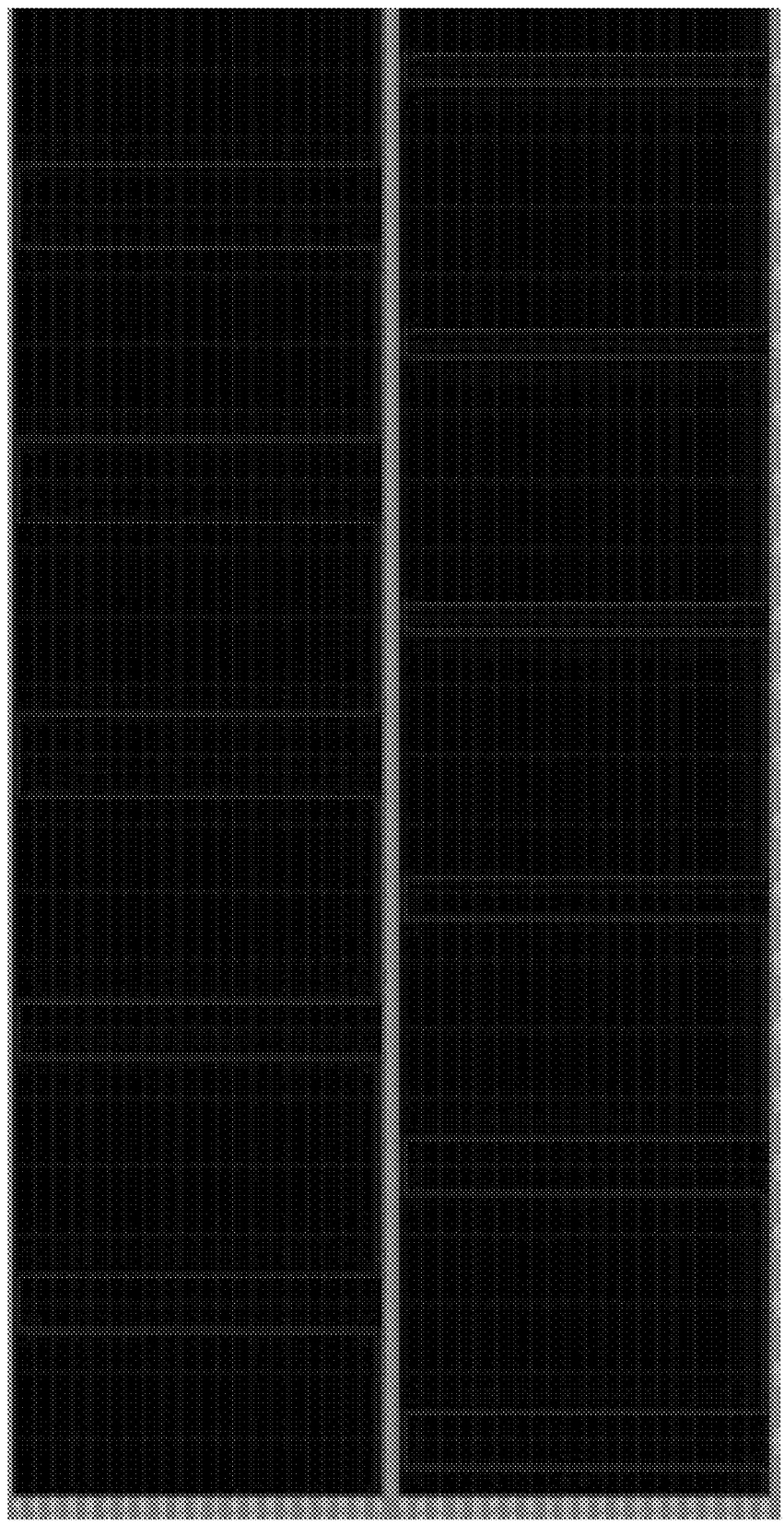

One method for balancing the flying capacitor drifts is by changing the dwell time of each of the states 01 and 10 such that in average we will have the required dwell time which fixes the required duty cycle but the dwell time difference will allow more charge than discharge or the opposite. FIG. 2D illustrates a timing diagram that has a 20% duty cycle for each S1 and S2 signals. In FIG. 2F, the timing of S1 and S2 are illustrated, with the timing of S1 being changed to a 30% duty cycle and the timing of S2 being changed to 10% such that the average is 20% as required but a drift of the capacitor C2 voltage is towards its required steady state value.

Another method for balancing capacitors is to change the timing diagram such that the state 01 is switched to more times than state 10. This type of balancing solution is more generic and can be used more easily in cases of more than two states (e.g., in the case of more MOSFETs in series) where a particular state is chosen in any time in order to drift the flying capacitors to their pre-charged steady-state value.

In addition to the conduction and switching losses advantages discussed above, another major benefit of the embodiment shown herein is the reduction of passive components (e.g., main choke and output filter sizes). Due to the multi-level voltages, a factor of N (e.g. 6 in the example) can be reduced in size/cost. In addition, the effective frequency within the main choke is N times the switching frequency (e.g. 6*200 kHz in this case). The result of embodiments in accordance with this example is that the main choke can be smaller by a factor of N^2 (e.g. 36) relative to a standard design using 200 kHz. Since usual inverters use much smaller switching frequencies (e.g. 16 kHz) due to limitations of the 600V switches, the overall gain in the main choke size is 200 kHz/16 kHz*36=450 which makes it negligible while in a standard inverter it is about 20% of the size and cost of the inverter. A similar calculation can be made for the output filter showing even greater advantage.

Embodiments of the present invention switch at a higher frequency such as 16 KHz or 33 KHz or preferably 50 kHz, 100 kHz, 150 kHz, 200 kHz, 250 kHz, 300 kHz or even higher), and the manner in which the switches are modified in accordance with, for example, FIGS. 2A-2F. The gain in accordance with inverters of the present examples gain a factor of n squared. This unusual result is achieved in part by switching only one component at a time instead of switching all of them in one cycle. Using low voltage MOSFETs, it is possible to switch all of the switches in the same output voltage cycle while still achieving comparatively low switching losses which allows further gains and efficiencies.

Usually about 20% of both size and cost of an inverter are related to the main choke. In embodiments described herein, increasing the frequency to, for example, 6*16 kHz and increasing the number of switches to 6 can result in an additional gain factor of 36 relative to the original 16 KHz because of the multi-level components. In these embodiments, the cost of the main choke can be as little as one percent or even less than that of the overall inverter cost. In addition, because of switching method described herein, the inverter will be much more efficient and also the production of the output voltage will be much better which gains substantial efficiency. It means that the enclosure and the inverter can be dimensionally much lower and therefore a much smaller and cheaper enclosure can be used. The size and cost of the enclosure is reduced both because of reduction of the main choke, reduction in the filter, and because of improved efficiency, which provides a smaller and more compact enclosure.

The control shown in FIGS. 2A-2F has been demonstrated to have substantial efficiencies over conventional control circuits. For example, the control illustrated in FIG. 2A allows the switches S1A-S6A, S6B-S1B, S1C-S6C, and S6D-S1D to be switched all within one period, in this embodiment with the switching of switches in one bank to be offset as shown in FIG. 2A. In these embodiments, the switches operate six times higher than other control mechanisms.

Referring again to FIG. 1A, an inverter is may comprise two halves with symmetry on each side of the inverter. In the embodiment of FIG. 1A, there are 4 banks of six switches each for 24 switches which operate at a lower voltage (e.g., 80V) and a higher frequency (e.g., 200 kHz). The higher frequency switching allows staggered switching of each switch in each bank (e.g., all six switches) in one cycle, which is six times faster than conventional modulators.

For voltage, where the absolute voltage is around 350V (which may be a voltage received from a DC source such as a bank of solar panels), this voltage may be utilized to produce an AC voltage of, for example, 230V. The switching elements in each bank when coupled with the capacitors C1-C5 and C6-C10 may be switched such that the voltages across switching banks A and B and switching banks C and D may sum to a voltage of approximately 350V in this example. Because the voltage across any one switch can be much lower than 350V because the voltage is spread over each of the switch/capacitor combinations, the voltage of the switches can be much smaller (e.g., 350 divided by 6 which or around 60V). This voltage can be made lower and/or higher depending upon the number of switches in each bank.

Referring to FIG. 2A-2F, the switches may be configured to switch all during the same cycle. For example, the switches may each be switched at, for example, 200 kHz. This allows each switch to turn "on" for a predetermined period such as ½₀₀ kHz or around 5 microseconds, during which time each switch turns on and off. In a conventional multi-level inverter, only one switch will switch at one cycle of one of the 16 kHz. However, in embodiments described herein, the low voltage MOSFETs may be switched at a much higher rate (e.g., 200 kHz) and additionally all of the switches in one bank may be switched during the same period. This example effectively increases the speed to 6 times the switching period, without actually increasing the switching frequency. Further, the design is scalable in that it can be increased more and more by adding more transistors to the switching banks; the multi-level switching in each bank allows the switching to increase in frequency without driving the MOSFET faster (e.g., six times faster).

This is an advantage of multi-level inverters in the examples herein in that you can switch six, eight, ten, twelve, or more times faster depending on the number MOSFETs in a series in each switching bank. One advantage associated with certain embodiments, is that it is possible to switch 6, 8, 10, 12, or more times faster by switching all of the MOSFETs during the same period, without actually switching any one of the MOSFETs faster than the original speed. This is a structural advantage cannot be achieved in inverters today because the switching ability of conventional designs cannot achieve this result. By controlling the control switches to operate in accordance with FIGS. 2A-2F, for example, it is possible to super charge a multi-level inverter to switch all the switches during the same cycle time and thus achieve an effective frequency of, for example, six times higher without actually switching any of the switches (e.g., MOSFETs) at a higher frequency.

Because of the higher switching frequency in accordance with the present embodiments, in addition to a smaller choke, the capacitors between the switches will be smaller. This is part of the size and cost reduction. Additionally, the inductors L1 and L2 are also made smaller. In general, there are many components that shrink by going to a higher frequency, which is being increased, also by the factor of 36.

Again referring to FIGS. 2A and 3, the control into S1A-S6A is inverted from the control input into switches S1B-S6B (e.g., when S1A is closed, S1B is open). With respect to switches S1C-S6C, the control inputs to these switches are inverted from the control inputs to switches S1A-S6A (e.g., when S1A is closed, S1C is open). With respect to switches S1D-S6D, these switches have the same control input as those of switches S1A-S6A (e.g., when S1A is closed, S1D is closed). While the processor needs to control 24 switches, because banks A and D receive the same six control signals and banks B and C receive the opposite six control signals, it is possible to have only six output control signals input respectively to each of S1A-S6A and S1D-S6D and the inverse of these six control signals sent to S1B-S6B and S1C-S6C.

In these embodiments, S1C-S6C are inverted and S1D-S6D are not inverted with respect to the control input signal. Further, S1A-S6A are not inverted and S1B-S6B are inverted. Thus, 24 switches may be controlled with only six different control outputs from the processor. See, for example, the exemplary control structure shown in FIG. 3.

Various alternate embodiments may also be employed. For example, referring to FIG. 4, an alternate embodiment is shown which includes a single leg of multi-level MOSFETs that may be configured to generate a rectified sine-wave by performing DC/DC operation (buck) during a sine-wave cycle. In this embodiment, the output of the leg may be inverted by a low-frequency full-bridge operated at AC line frequency (e.g., 50 Hz).

With this variation, the switching losses at the high-frequency are reduced by a factor of two relative to a full-bridge implementation and the conduction losses are a combination of the single multi-level leg and the slow-switching full-bridge. It is possible to reduce the conduction losses of the slow-switching full-bridge by using improved components (e.g Super-junction MOSFETs or a series-stack of low-voltage MOSFETs) while not increasing switching losses due to low switching frequency.

Another benefit of this variation is that the component cost may be further reduced since there is only one multi-level leg with all the drivers and balancing capacitors and the full-bridge components can be made much cheaper than the cost of another multi-level leg.

Again referring to FIG. 4, the output of the high frequency stage is a rectified sine-wave (e.g., whenever the sine-wave is positive, it is the same, whenever the sine-wave is negative, it's still positive). The high frequency stage may be configured to generate a sine-wave but it is always positive. The low frequency stage inverts the rectified sine-wave to positive and negative, to create a true sine-wave. The low-frequency stage may be configured to invert the signal whenever it is needed. In this embodiment, the low frequency stage has a number of switches such as four switches S10, S11, S12, S13. In this example, the positive cycle of the sine-wave can be achieved by having the top-left S10 and bottom right S11, switching to on. When the other half of the signal is processed, the control can switch on the other diagonal, e.g., the upper right switch S12 and the bottom left switch S13 to invert the signal completing a sine-wave. These switches may be controlled via a processor such as processor 10 shown in FIG. 3.

The use of MOSFETs for the first high frequency stage controlled as discussed herein in order to shape the rectified sine-wave is another example of the invention. The advantages discussed above with respect to FIGS. 1A-1I, 2A-2F, and 3 can be achieved in the embodiment of FIG. 4 with only 16 switches as opposed to the 24 switches of FIG. 1A. Thus, substantial advantages can be achieved and further reduced costs and components.

Figure 5:
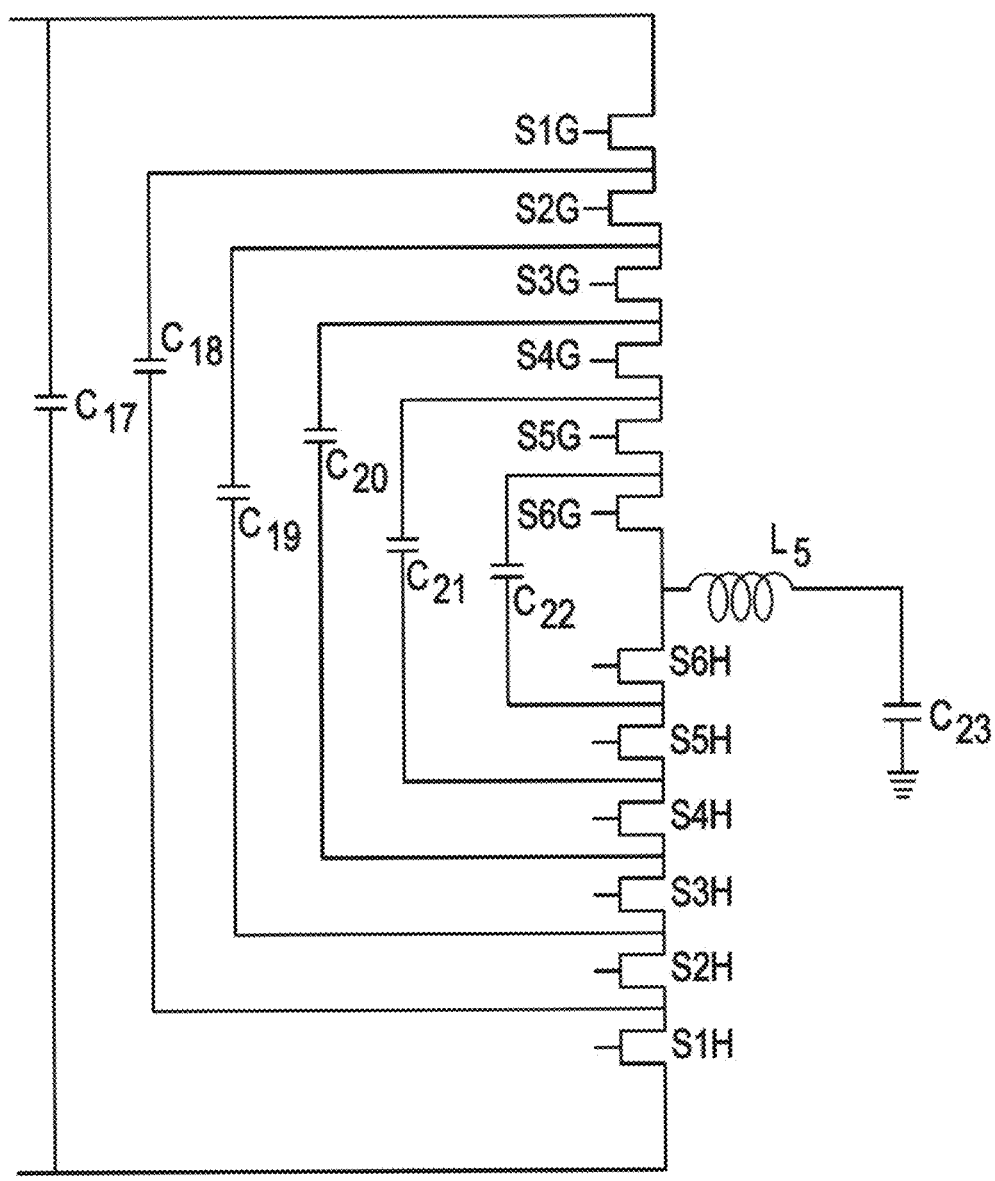
FIG. 5 illustrates aspects of the multi-level inverter in accordance with embodiments herein.

Still another embodiment is shown in FIG. 5. In the embodiment of FIG. 5, S1G-S6G and S6H-S1H and C17-C22 operate above as discussed with respect to FIGS. 1A-1I, 2A-2F, and any of the other embodiments discussed below. In this embodiment, a single phase inverter adds an additional multi-level leg at the input of the inverter. In other words, the circuit of FIG. 5 may in FIG. 1A (or any of the other embodiments) be connected across the Vdc (e.g., 350 v) input (e.g., C17 of FIG. 5 is connected across the 350 v input bus). As further discussed herein, this architecture may be referred to as the active capacitor concept. The additional leg may be configured to act to transfer capacitive charge between the DC link capacitor (C17) and the storage capacitor (C23) in order to compensate for the low frequency pulsation, such as a low frequency pulse of around 100 Hz. Since the storage capacitor C23 may be configured to fluctuate with full voltage swing, its size can be reduced considerably relative to the original size of the input bus capacitance. The size of C17 can be very small.

This type of solution for reducing the DC link capacitor C17 when implemented using multi-level topology with low-voltage MOSFETs as shown can be very efficient (0.2% losses) and therefore reduce both size and cost without a high impact on the performance.

In FIG. 5, the capacitor C17 on the input takes the difference between the output power and the input power. The input power is DC and the output power is AC. The output power is fluctuating and the DC power does not fluctuate because it is DC. Some capacitors absorb over/ under power in view of sine-wave fluctuations. Usually, the input capacitor, on such an inverter is very big and can be 10 percent of the cost of the inverter. With respect to the embodiment shown in FIG. 5, instead of having a very big capacitor which is C17, using this embodiment, C17 can be very small and actually performing DC to DC conversion between C17 and C23 due to the low power MOSFETs and control switching topology discussed herein. For example, whenever there is too much power on the AC side, then C17 needs to provide more power, then it takes it from C23 and whenever there is too much power on the DC side, then C17 gives that redundant power to C23. So, everything is going back and forth between C17 and C23. But eventually it compensates for the difference between the DC power and the AC power. By using the techniques described herein of low-voltage multi-level component with the associated control, embodiments gain the ability to reduce the capacitances of the input of the inverter.

Figure 4:
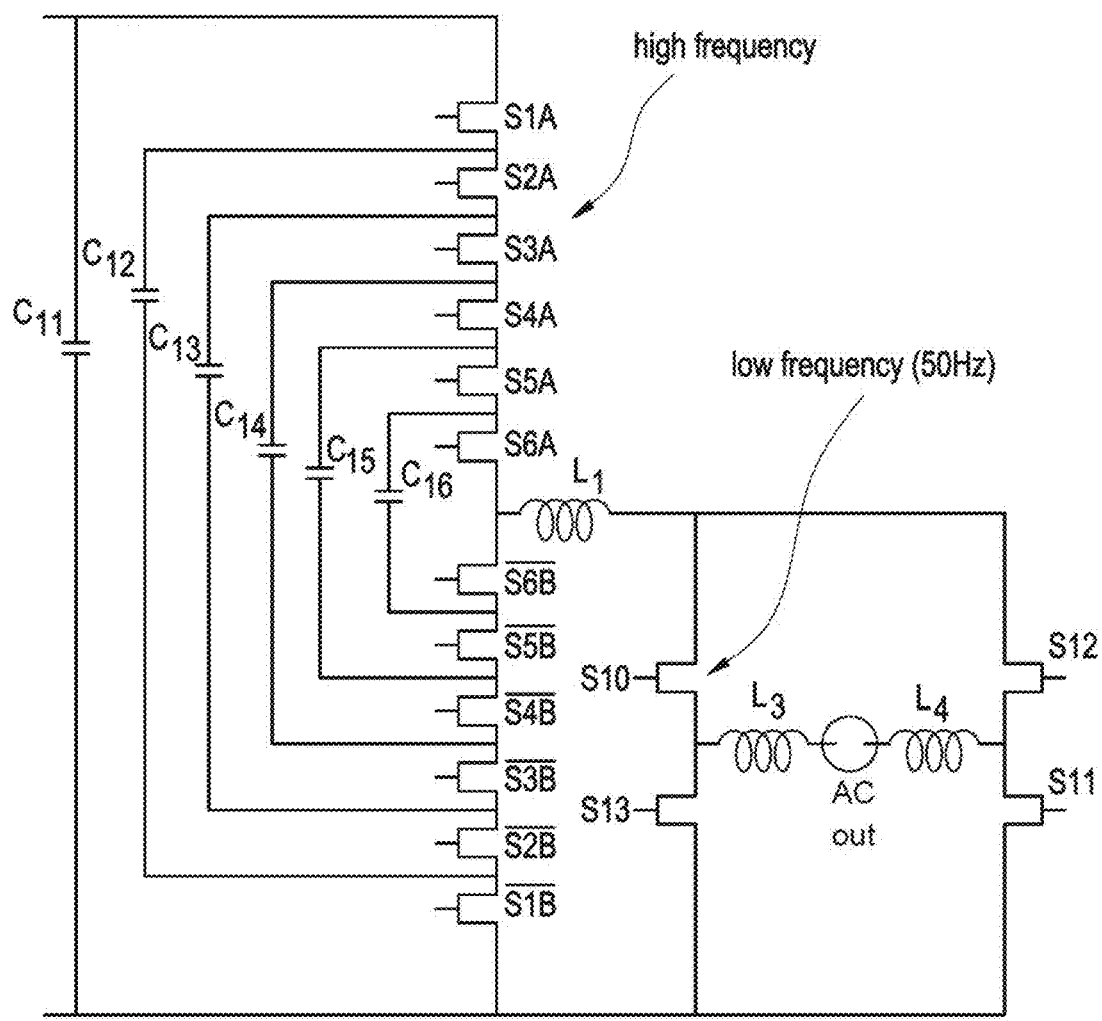
FIG. 4 illustrates another example of a multi-level inverter in accordance with embodiments herein.

In still further embodiments, the capacitor C11 of FIG. 4 can be replaced with the circuit shown in FIG. 5 (e.g., e.g., connected to C17 of FIG. 5). With these examples, the modified FIG. 1A would now have 36 MOSFETs as opposed to 24 MOSFETs. Similarly, for the example where FIG. 4 is modified, the circuit would have 24 MOSFETs as opposed to 12 MOSFETs, but the large capacitor C11 is no longer present. Thus, the circuit shown in FIG. 5 can serve as replacement for the capacitor on the left-hand side of FIG. 1A (not shown) and/or for a replacement for the capacitor shown on the left-hand side of FIG. 4 (C11).

In still further embodiments, such as three phase embodiments, there may be more banks of MOSFET transistors. For example, referring to FIG. 1A, there may be additional banks of MOSFET transistors S1E-56E and S1F-S6F and associated capacitors. These MOSFET transistors would be controlled in the same manner as the other legs and transistor banks discussed herein. In this example, instead of just two legs shown in FIG. 1A, one on the left and one leg on the right, you may have three legs similarly configured.

Figure 6:
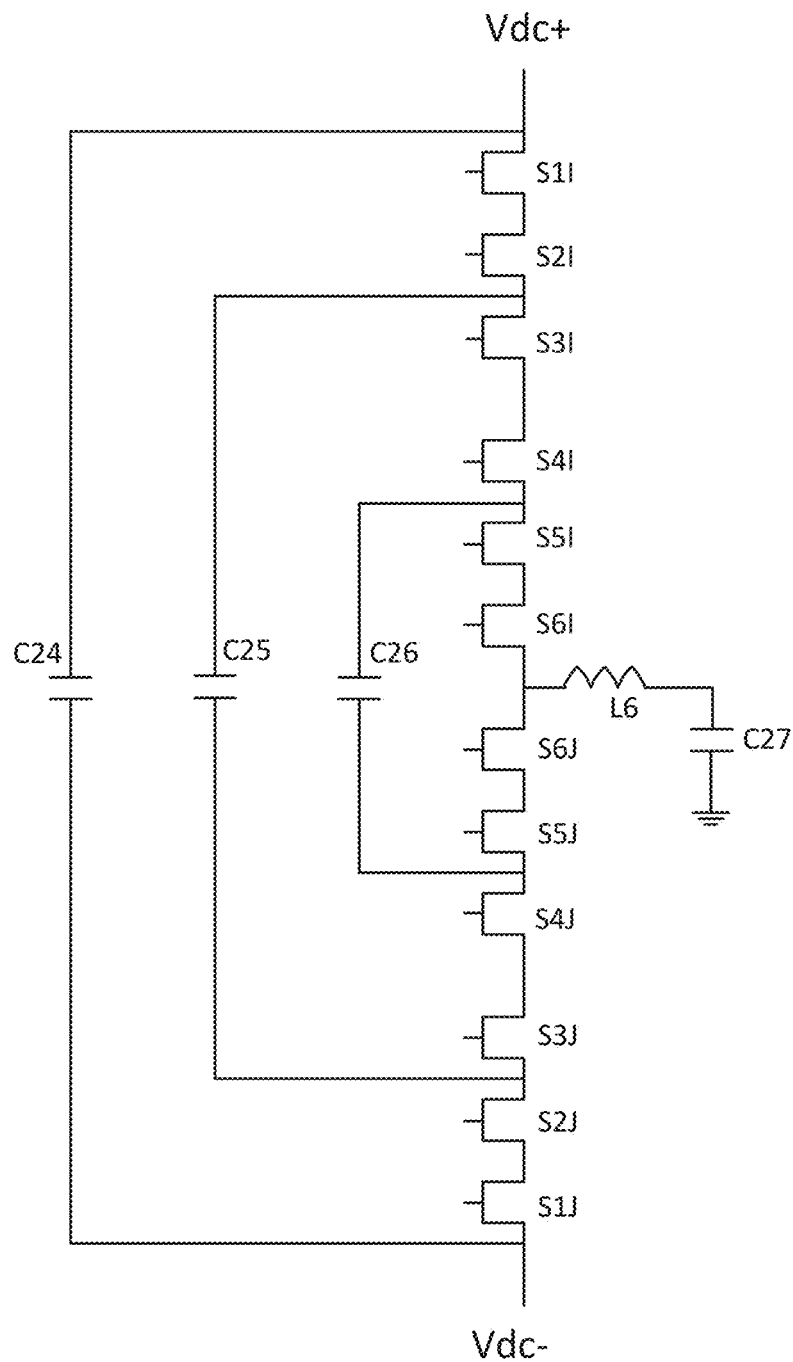
FIG. 6 illustrates aspects of the multi-level inverter in accordance with embodiments described herein.

FIG. 6 shows another embodiment similar to the flying capacitor topology or the capacitor-clamped multi-level inverter topology shown in, for example, FIG. 1B or 5. In the configuration shown in FIG. 5, two banks G, H of series connected switches are connected to each other between a high voltage and a low voltage and capacitors C17-C22 are nested within each other between the two banks. The capacitors are nested within each other by connecting the ends between corresponding switches in each bank. For example, capacitor C18 is connected at a first end between S1G and S2G and at a second end between S1H and S2H. Similarly, capacitor C19 is connected at a first end between S2G and S3G and at a second end between S2H and S3H.

The circuit shown in FIG. 6 reduces the number of capacitors used in the circuit compared to the embodiment shown in FIG. 5. For example, capacitors C18, C20, and C22 from the circuit of FIG. 5 are absent in the circuit shown in FIG. 6. Each two MOSFET transistors in series may be considered as one switch with only one mutual PWM control signal. For example, switches S1I and S2I may be considered as one switch and be controlled by a single PWM control signal. Similarly, switches S3I and S4I, S5I and S6I, 56J and S5J, S4J and S3J, and S2J and S1J may be paired. Capacitor C25 is connected at a first end between S2I and S3I and at a second end between S2J and S3J. The series connection of these two MOSFET transistors allows spreading of the voltage stress between the two MOSFET transistors assuming they are balanced at OFF state and transition times. This balancing may be accomplished with either by biasing the drives of any two adjacent MOSFETs or by still keeping C18, C20, and C22 from FIG. 5 with small capacitance and driving the two adjacent MOSFETs (e.g., S1I and S2I, S3I and S4I, S5I and S6I, 56J and S5J, S4J and S3J, S2J and S1J) at similar timing such that C18, C20, and C22 will be kept balanced for the transition period only. The implementation of FIG. 6 may be applied to any of the embodiments herein.

Figure 7:
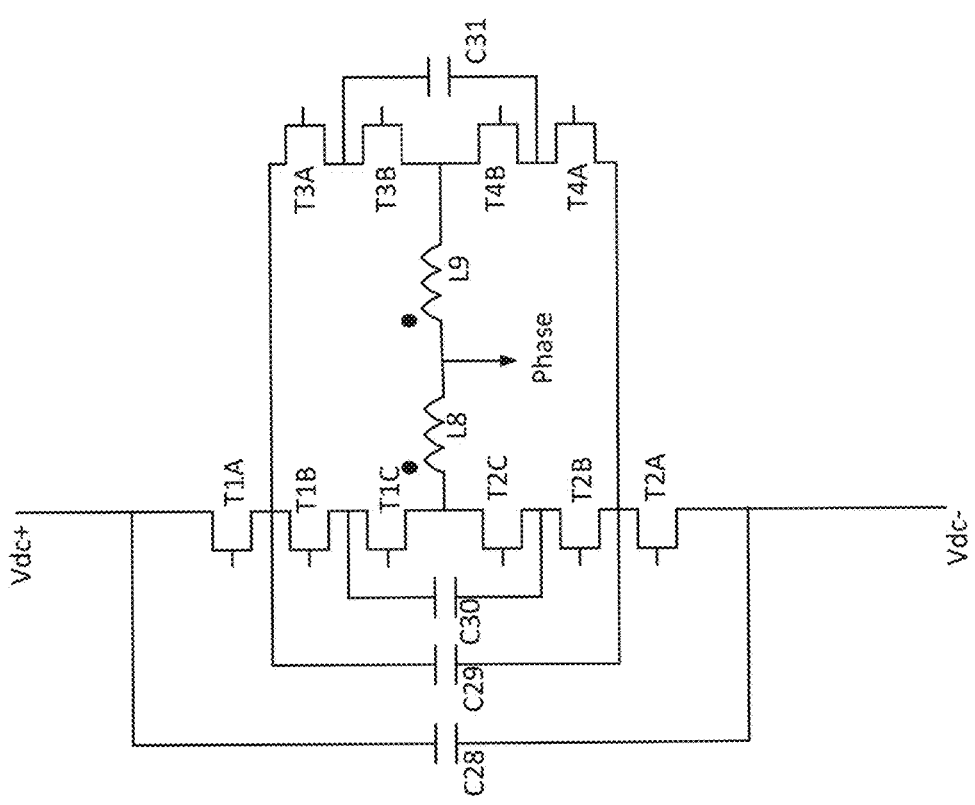
FIG. 7 illustrates aspects of the multi-level inverter in accordance with embodiments described herein.

FIG. 7 shows another embodiment that is able to reduce the capacitance of one of the flying capacitors. In this embodiment, standard multi-phase techniques are used by having parallel switches in the middle of the phase leg such that each parallel switch leg is switched in a time-shifted manner versus the other switch leg in order to provide multi-phasing (e.g. 180° in the shown case of two parallel phase legs). In FIG. 7, the parallel switch legs may be a first leg of switches T1B, T1C, T2B, T2C and a second leg of switches T3A, T3B, T4A, T4B. Multi-phasing enables reduction of the ripple voltage in the flying capacitor C29 by a factor of four, which allows the reduction of the capacitance of the flying capacitor C29 by the same factor. Additionally, the phase inductor L6 as shown in FIG. 6 can be split into two inductors L8, L9 where mutual coupling eventually allows the reduction of the inductors' size below the original required inductor L6 in the case where multi-phasing is not used.

Multi-phasing may be used between parallel phase legs in order to achieve benefits in the input capacitance and output inductance. In the embodiment shown in FIG. 7, the multi-phase technique is employed on a sub-set of the phase leg in order to reduce the flying capacitors and not just the main capacitance of the whole phase leg.

More generally, multi-phasing can be applied to each of the flying capacitors separately and then also applied to the whole leg thereby achieving a hierarchical structure of multi-phasing.

Figure 8:
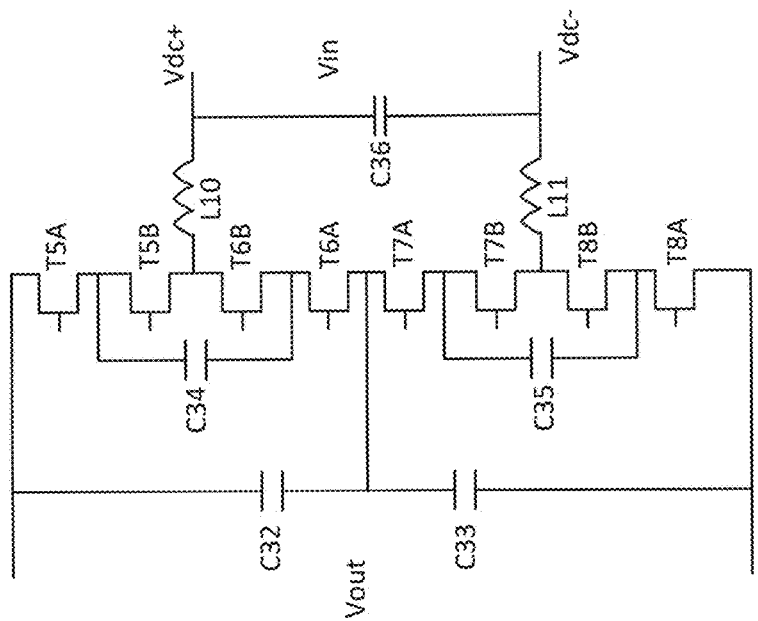
FIG. 8 illustrates aspects of the multi-level inverter in accordance with embodiments described herein.

FIG. 8 shows another embodiment that may be applied on a high voltage boost converter (e.g. as a front-end sub-system of a photovoltaic panel inverter or not necessarily related to an inverter) utilizing the multi-level inverter topology and using low-voltage MOSFET transistors at high switching speeds with staggered timing in the same manner as described herein.

This structure is split into two halves where each half of the structure handles half of the input voltage by using multi-level techniques (in the case of FIG. 8, three-level). It can be of course extended to higher numbers of switches in series thereby increasing the number of levels in each half. For example, in FIG. 8, the switches T5A, T5B, T6A, T6B may form the first half, and the switches T7A, T7B, T8A, T8B may form the second half. The control signals to switches T6A-B may an inverted version of the control signal to switches T5A-B, respectively. For example, the control signal to switch T6A may be inverted from the control signal to switch T5A, and the control signal to switch T6B may be the inverted version of the control signal to switch T5B. The timing of the control signals to the A switches (T5A, T6A) may be the delayed version or the same as the controls signals to the B switches (T5B, T6B). Control signals similar to the first half may be applied to the second half. For example, the control signals to the A switches (T7A, T8A) may be inverted versions of each other, and the control signals to the B switches (T7B, T8B) may be inverted versions of each other. The control signals to the T7 switches may be the same or different than the control signals to the T5 switches. Similarly, the control signals to the T8 switches may be the same or different than the T6 switches.

Figure 9:
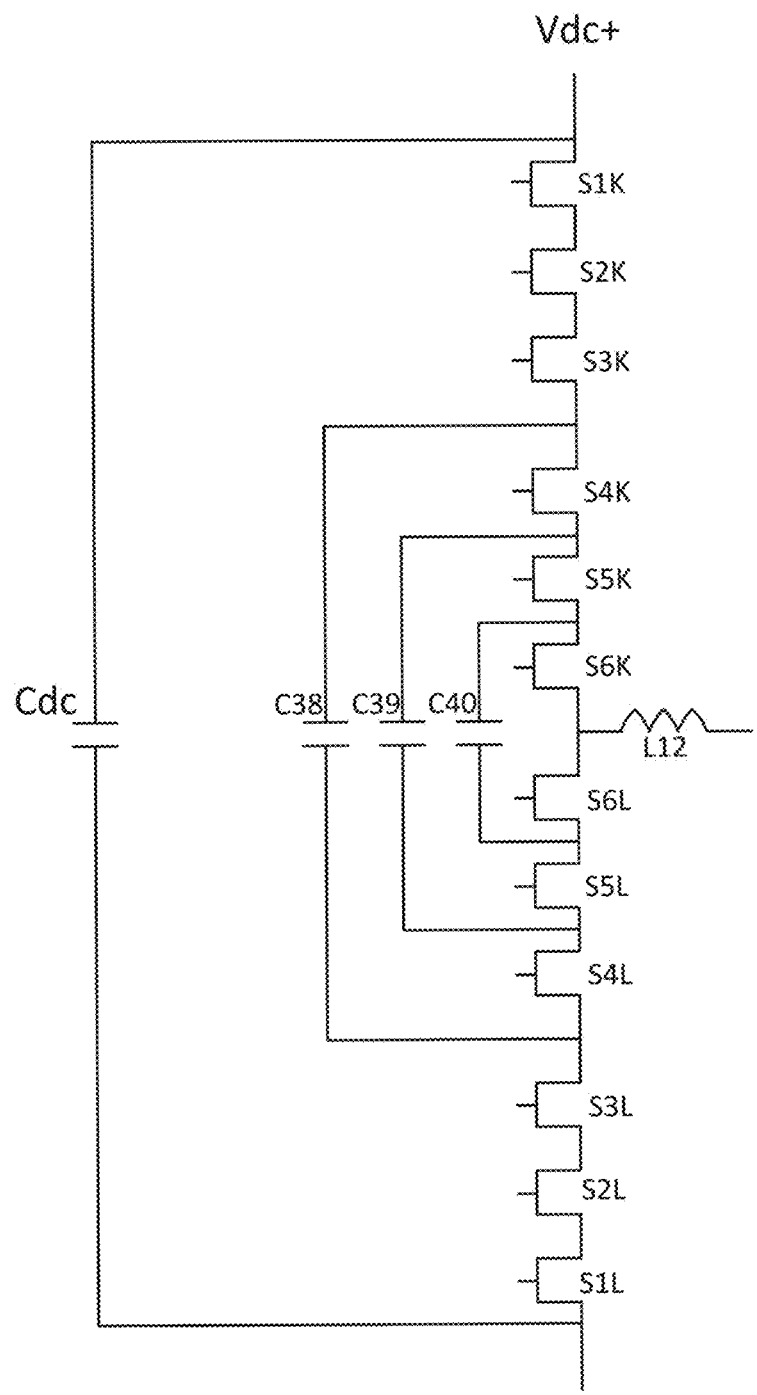
FIG. 9 illustrates aspects of the multi-level inverter in accordance with embodiments described herein.

FIG. 9 shows another embodiment reducing the number of capacitors used in the circuit. For example, capacitors C18 and C19 from FIG. 5 or C1 and C2 from FIG. 1B may be removed or used as a small capacitance for balancing purposes such that the three switches S1K-S3K above capacitor C38 in FIG. 9 and the three switches S1L-S3L below capacitor C38 become low frequency switches that can operate at, for example, 50 Hz complementarily while the other 6 switches S4K-S6K, S4L-S6L connected to capacitors C38-40 act as fast switches (e.g., high frequency switches) using a flying capacitor control method as described herein where the control signals to the switches S4L-S6L are inverted versions of the control signals to the switches S4K-S6K.

Figure 10:
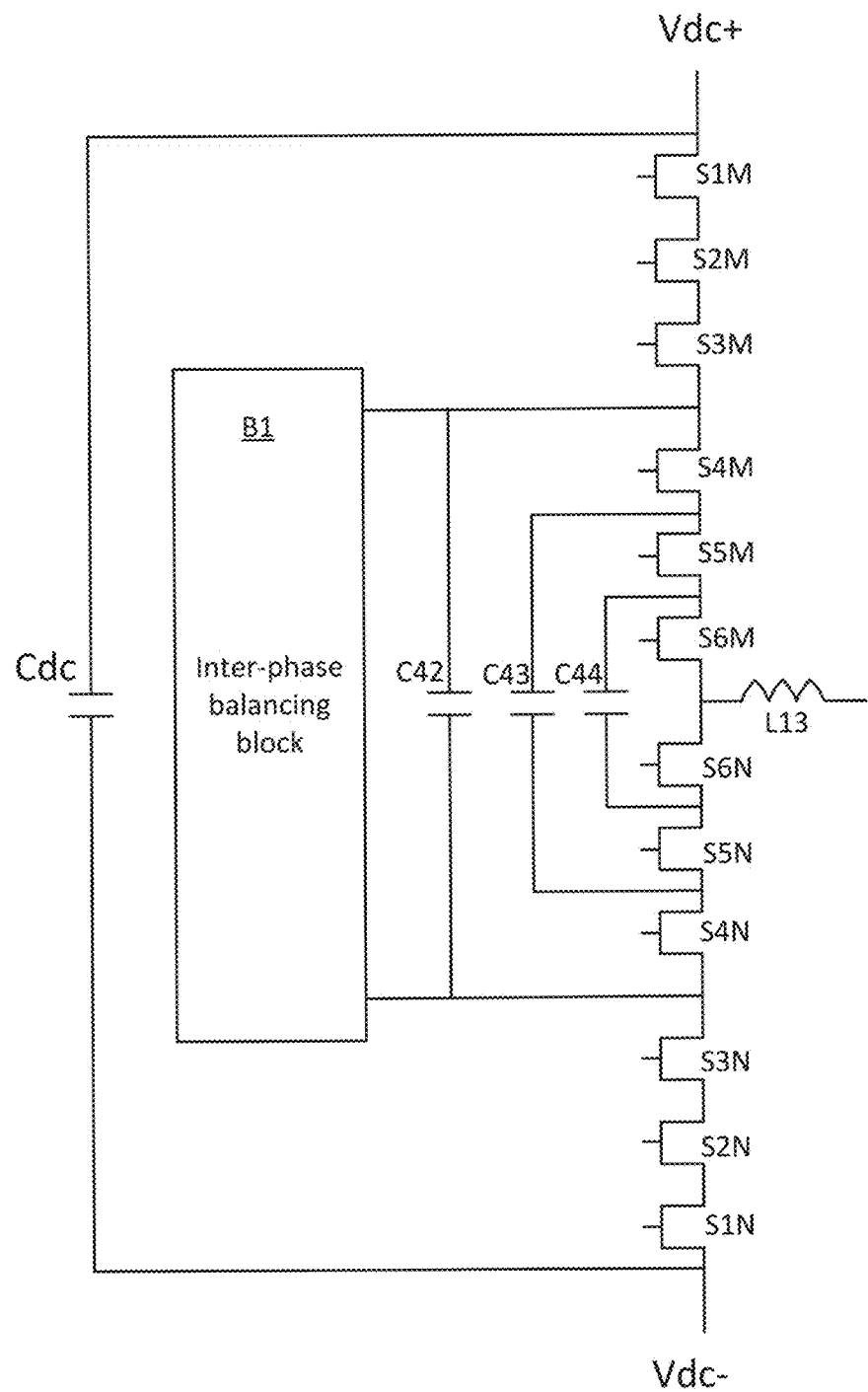
FIG. 10 illustrates aspects of the multi-level inverter including an interphase balancing block in accordance with embodiments described herein.

FIG. 10 shows another version of a multi-level inverter circuit including an inter-phase balancing block. The circuit of FIG. 10 is similar to the circuit of FIG. 9 with the addition of the inter-phase balancing block B1. Similar to FIG. 9, the three switches S1M-S3M above capacitor C42 and the three switches S1N-S3N below capacitor C42 may be low frequency switches. Switches S4M-S6M, S4N-S6N may be fast switches using a flying capacitor control method described herein. The inter-phase balancing block B1 may be connected in parallel to capacitor C42 which is connected at each end between a low frequency switch S3M, S3N and a high frequency switch S4M, S4N. The inter-phase balancing block can share current over capacitor C42 to remove a low frequency (e.g., 50 Hz) ripple over capacitor C42 from the switches S1M-S3M and S1N-S3N being switched at 50 Hz. The circuit shown in FIG. 10 maintains seven levels since, in each 50 Hz half cycle, the circuit shown in FIG. 10 provides three different levels resulting in six levels in addition to the zero level.

The circuit shown in FIG. 10 may comprise a leg of an inverter. An inverter may contain several legs. For example, a single phase inverter may have two legs with the legs connected via the interphase balancing block B1. Specifically, capacitor C42 of each phase may be connected in parallel to the same interphase balancing block B1 or an inter-phase balancing block B1 shared with another phase. As another example, a three phase inverter may include three legs connected to each other via inter-phase balancing block B1. The addition of the interphase balancing block mechanism connected to capacitor C42 of each phase and sharing the currents can remove the 50 Hz ripple over capacitors C42 of each phase. The addition of the interphase balancing block allows a topology that uses only capacitors C42-C44 while maintaining the original seven levels.

Figures 11, 12:
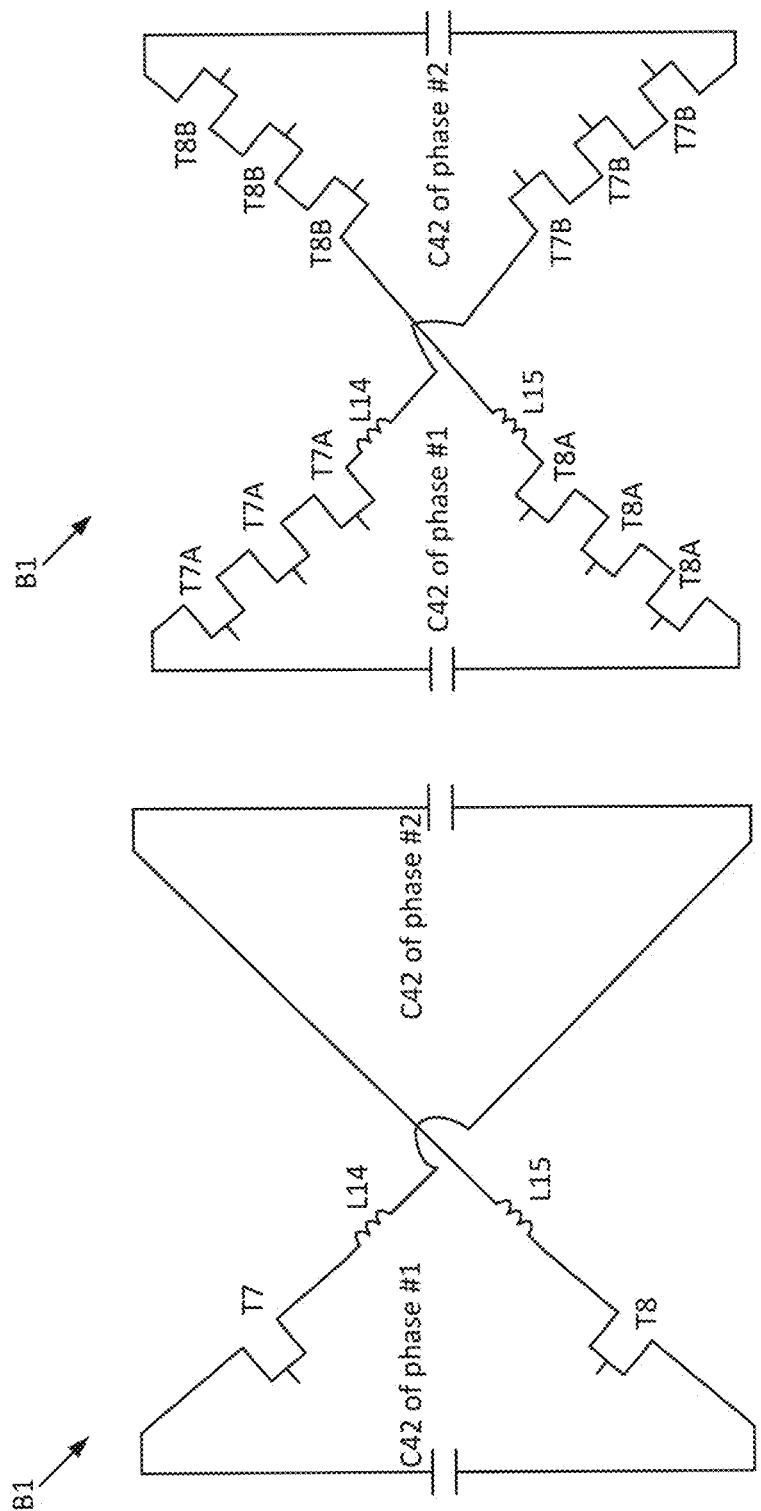
FIG. 11 illustrates an example of an inter-phase balancing block in accordance with embodiments described herein.
FIG. 12 illustrates another example of an inter-phase balancing block in accordance with embodiments described herein.

FIG. 11 shows an example of an interphase balancing block B1 for a single phase inverter circuit which can have two legs. The interphase balancing block B1 shown in FIG. 11 allows the current that was supposed to flow downwards through capacitor C42 and the current that was supposed to flow upwards through capacitor C42 to cancel one another such that no current will flow through these capacitors. This block B1 enables the 50 Hz ripple to be negated when switch T7 is ON and switch T8 is OFF. Switches T7 and T8 are complementary (e.g., receive inverted control signals of each other) and follow the same polarity as the low frequency switches S1M-S3M, S1N-S3N in FIG. 10. For example, switch T7 may follow switches S1N-S3N, and switch T8 may follow switches S1M-S3M. Switches T7 and T8 may represent any number of switches in series that support the voltage of 6 switches (e.g., MOSFET transistors). The inductors L14 and L15 may be included in the circuit to slow the transition between the two legs or to filter high frequency PWM currents flowing between the legs.

FIG. 12 shows another example of an inter-phase balancing block B1 for a single phase inverter. In the circuit shown in FIG. 12, two control signals with mutual dead-time may be used. One control signal may be used for the switches of T7A and T7B and another control signal can be used for the switches of T8A and T8B.

Figure 13:
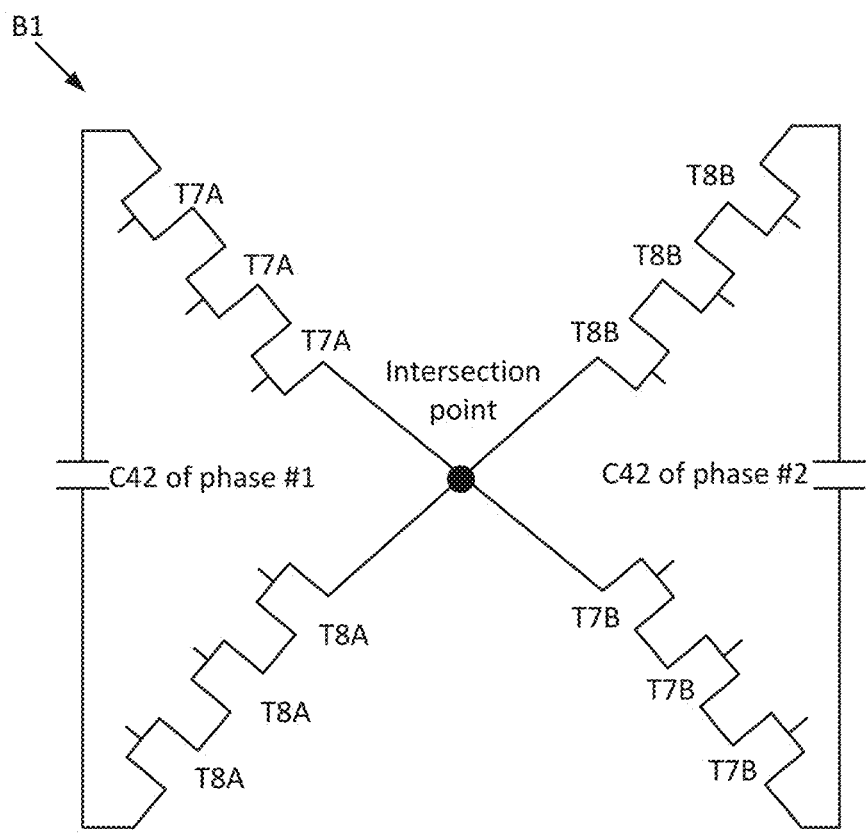
FIG. 13 illustrates an example of an inter-phase balancing block in accordance with embodiments described herein.

FIG. 13 shows another example of an inter-phase balancing block B1 which may be used with different PWM control signals. An even number of switches between the capacitors may be used. Control signals with dead time between the switches of T7A and T8A, the switches of T7A and T7B, and the switches of T7A and T8B may be used.

Figure 14:
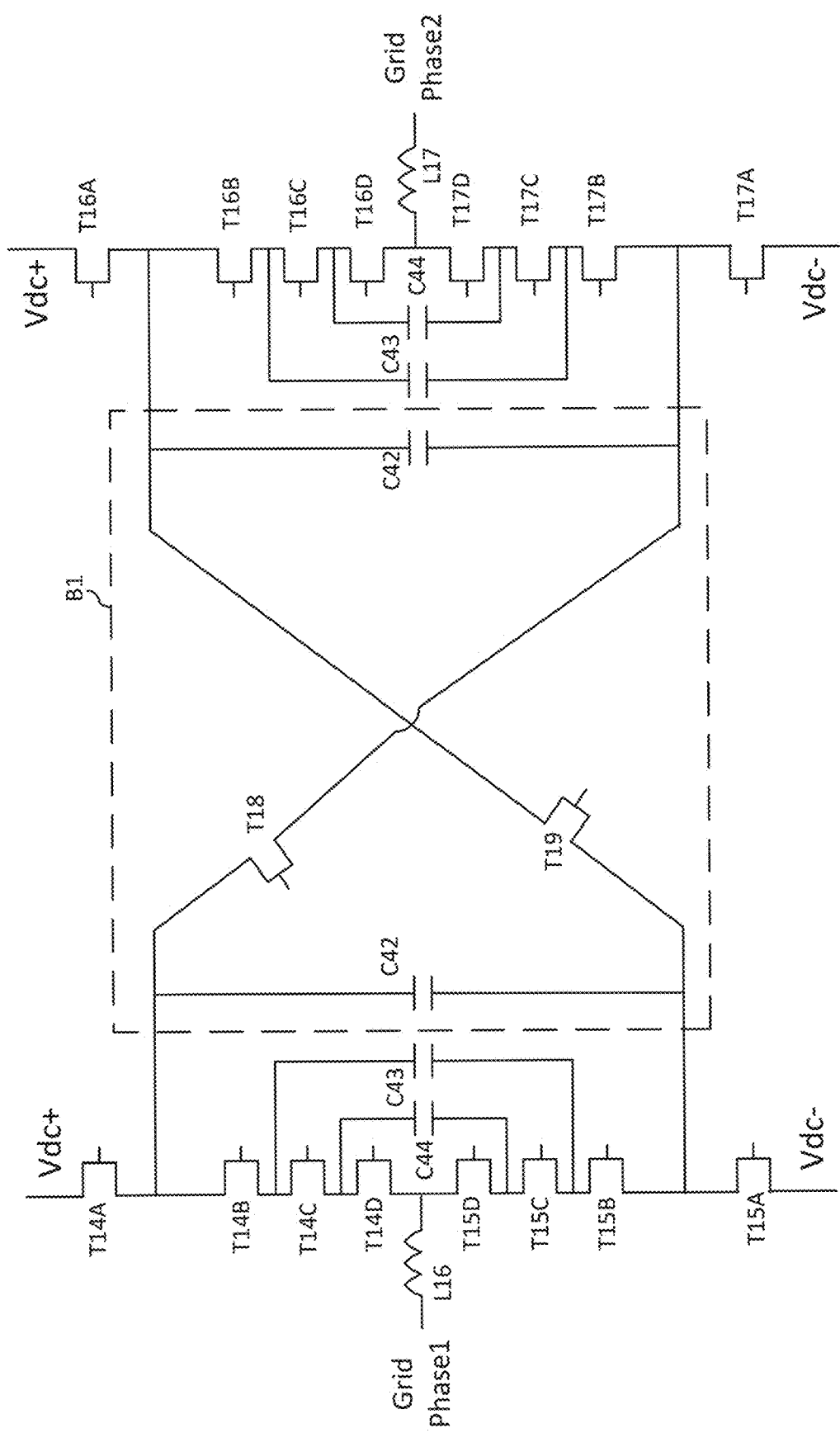
FIG. 14 illustrates an example inverter incorporating an inter-phase balancing block with embodiments described herein.

FIG. 14 shows an exemplary circuit incorporating an inter-phase balancing block B1 in a single phase inverter between the two legs of the single phase inverter. A single switch T14A as shown in FIG. 14 may be used in place of multiple slow switching (e.g., low frequency) series-connected switches (e.g., MOSFET transistors) such as switches S1M-S3M as shown in FIG. 10.

Figure 15:
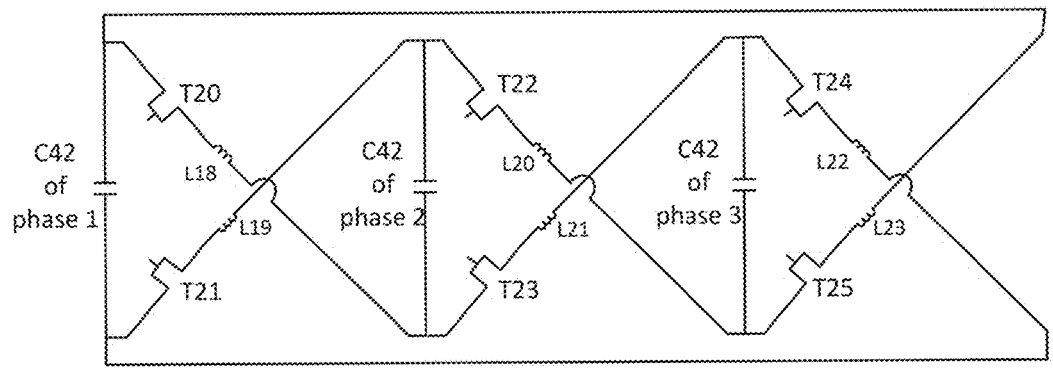
FIG. 15 illustrates an example of an inter-phase balancing block for a three phase inverter in accordance with embodiments described herein.

FIG. 15 shows an exemplary balancing block B1 for a three phase inverter similar to the balancing block B1 shown in FIG. 12 for the single phase inverter. Each capacitor C42 may be connected to the next capacitor C42 or the capacitor C42 of another phase by two switches to cancel out the three ripple currents through the capacitor C42 of each of the three phases such that current does not flow through any of the capacitors C42.

Figure 16:
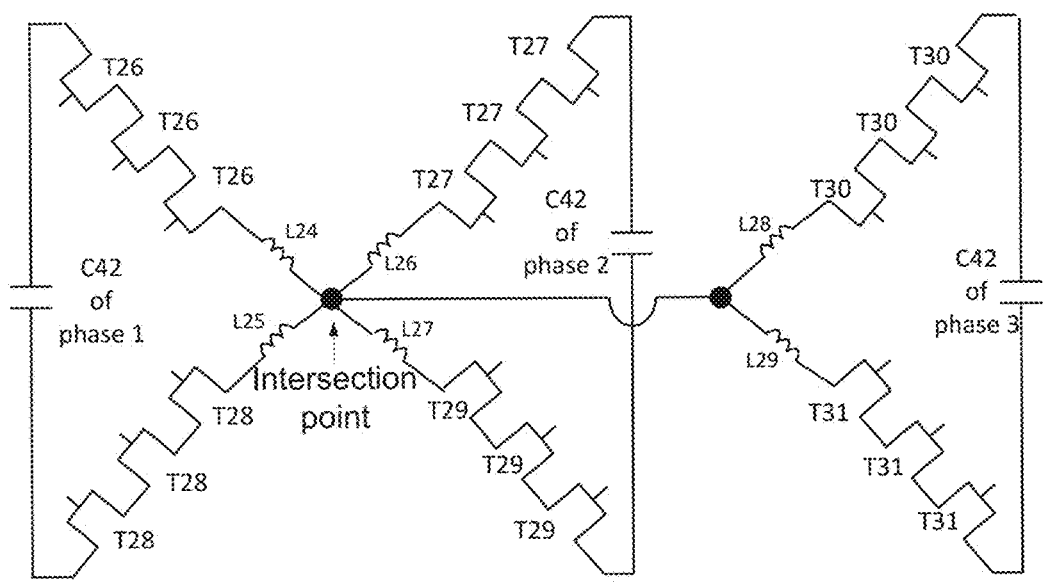
FIG. 16 illustrates an example of an inter-phase balancing block for a three phase inverter in accordance with embodiments described herein.

FIG. 16 shows a variation of a balancing block B1 for a three phase inverter. The balancing block shown in FIG. 16 includes an intersection point. This variation of the balancing block may be used with an even number of switches in series with dead time controlled signals.

Figure 17:
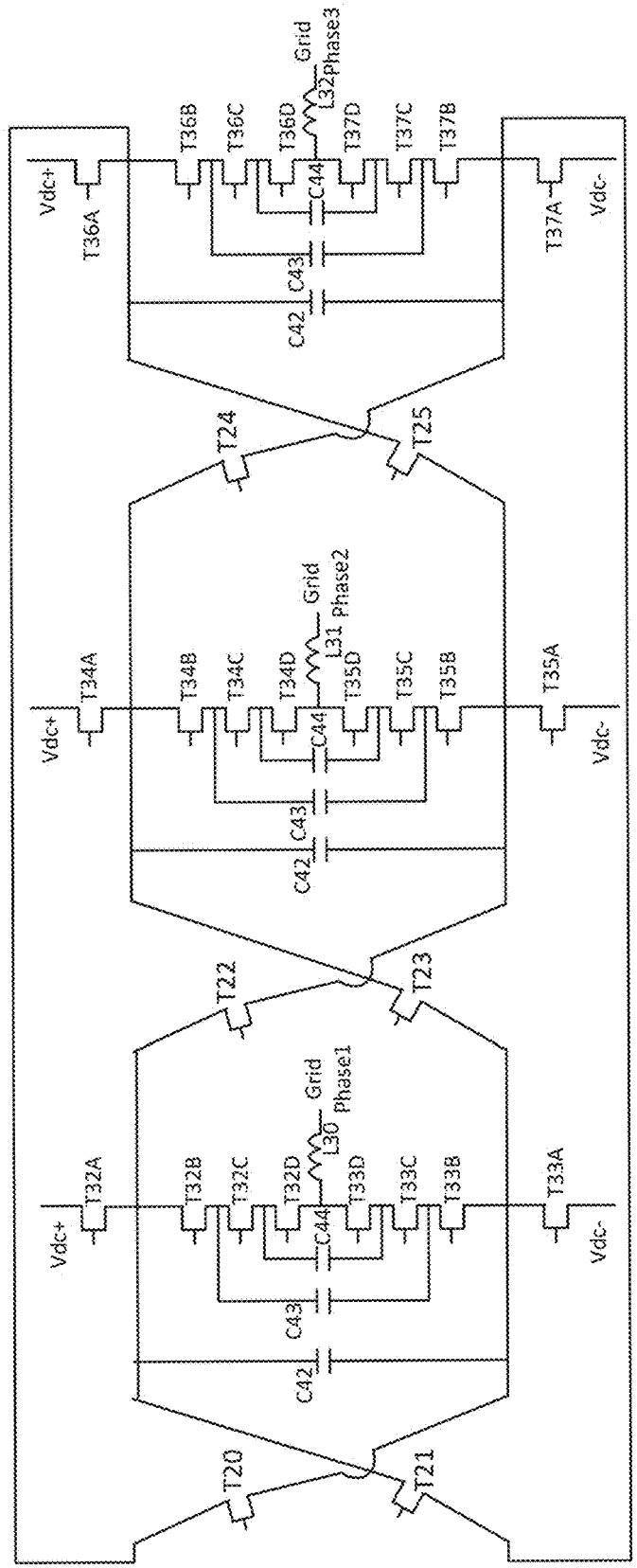
FIG. 17 illustrates an example of a three phase inverter including the balancing block of FIG. 15 in accordance with embodiments described herein.

FIG. 17 shows an example of a three phase inverter including the balancing block shown in FIG. 15. A single switch may be used in place of several slow switching (e.g., low frequency) switches (e.g., MOSFET transistors) in series.

Although the previous examples were directed mainly to either single phase or three phase inverters, the interphase balancing block B1 can be extended to any number of phases such that the balancing blocks in each phase are connected together by a balancing block in each of the phases. In order to maintain balance, the phases should complement to 360 degrees.

FIG. 18 shows an example of a six phase balancing block which may include three phases in a first position and three phases in a position opposite of the first position, where each two phases pair is 180 degrees apart. Instead of having a balancing block per phase and connecting all six balancing blocks together in a similar manner to the three phase case, it is possible to connect each two phases together via their balancing blocks regardless of the other four phases. Each structure contains two phases (having one capacitor C42 for each phase).

As a more generic case, any even number of phases can be used such that each pair of phases are 180 degrees shifted such that they can be balanced one against the other without relation to other phases. For examples, twelve phases can be used such that there are six phases spaced at 60 degrees apart at the AC line frequency and each pair is spaced at 180 degrees apart at the AC line frequency to allow balancing within each pair.

FIG. 19 shows an overall structure of another embodiment of the multi-level inverter. The example structure of FIG. 19 includes three phases having three phase blocks P1 and a balancing block B2 connected to all three phase blocks P1 via the capacitor Cin of each phase block P1. While FIG. 19 shows three phase blocks P1, any number of phase blocks may be used. For example, a single phase having two phase blocks or a six phase having six phase blocks may be used. A phase block may be formed of a half-bridge structure or a flying capacitor structure.

Figure 20:
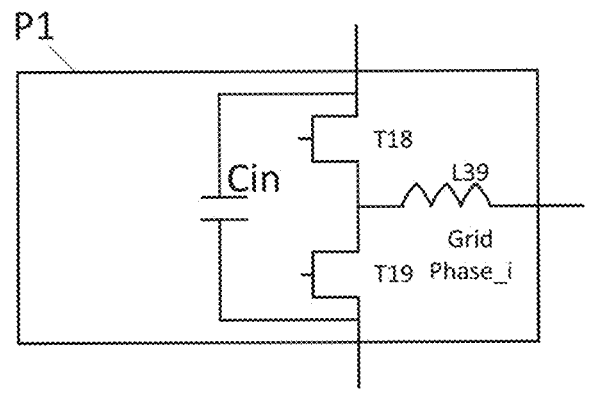
FIG. 20 illustrates an example of a phase block in accordance with embodiments described herein.
Figure 21:
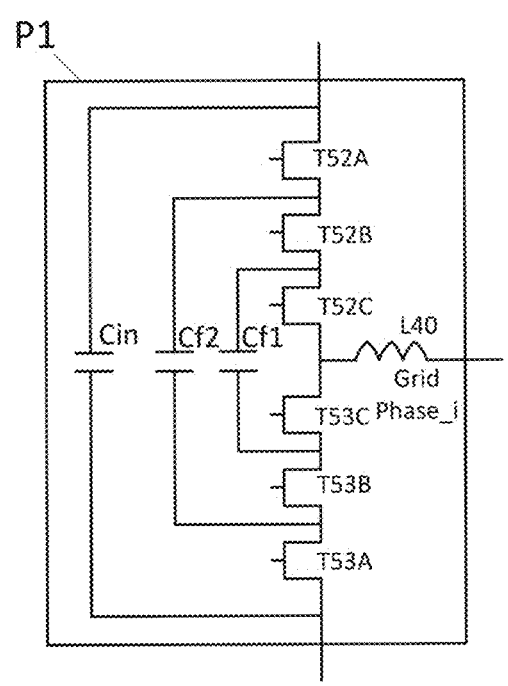
FIG. 21 illustrates another example of a phase block in accordance with embodiments described herein.

Examples of phase blocks P1 are shown in FIGS. 20 and 21. A phase block may be a half-bridge structure as shown in FIG. 20 or a flying capacitor structure as shown in FIG. 21. The half-bridge structure shown in FIG. 20 includes two series connected switches T18, T19 in parallel with capacitor Cin.

In general, each phase block can be a DC/DC converter that is able to output a smoothed PWM output between a high voltage Vh and a low voltage Vl. The DC/DC converter can use the half voltage capacitor to provide the output voltage relative to the half voltage in order to be able to use half of the switches relative to a DC/DC converter spanning the full voltage from Vh to Vl.

The input capacitor Cin of each phase block can provide the half voltage since the switches to Vh and Vl may slowly switch according to the polarity of the 50 Hz sine-wave of each phase. Each phase may transition polarity at a different time. Since the input capacitors Cin will be charged and discharged at a slow rate, a high capacitance may be needed.

The multi-phase system described herein is advantageous in that a sum of currents in all phase blocks is zero such that by using the balancing blocks as described herein the currents in the capacitors can be balanced without the need for capacitance to compensate for low frequencies.

Figure 22:
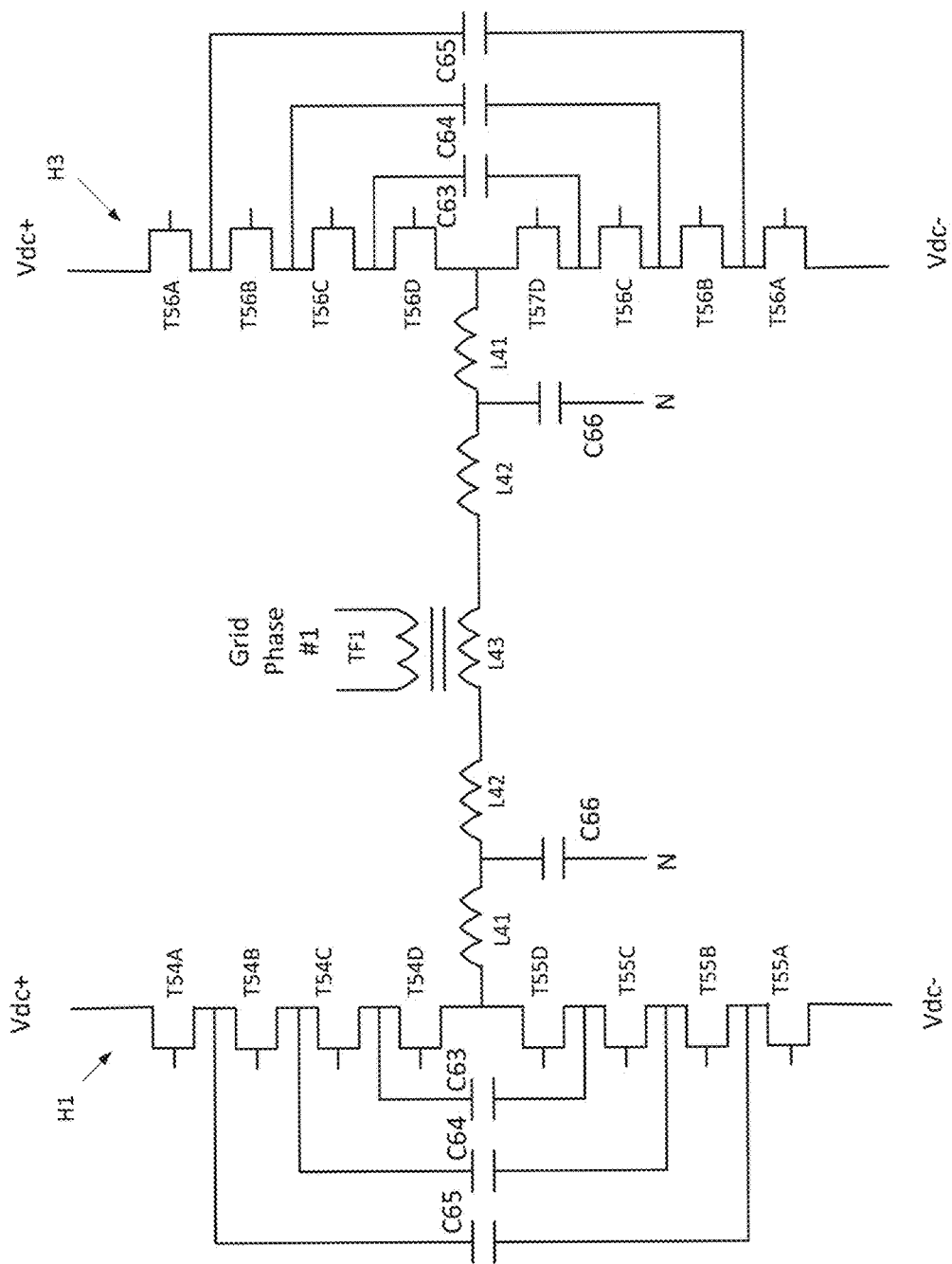
FIG. 22 illustrates another embodiment of a multi-phase multi-level inverter in accordance with embodiments described herein.

FIG. 22 shows another aspect of the multi-phase inverters. FIG. 22 shows an example of an inverter including a transformer TF1 that transforms six legs or phases into a three phase system. Each phase of the three phase system may include the dual-legs or full-bridges as shown in FIG. 22. Each leg H1, H3 of the multi-level, multi-phase inverter may include switches or transistors (e.g., MOSFET transistors) with capacitors (e.g., capacitors C63, C64, C65) in a flying capacitor configuration. An output AC voltage is produced at the input of the transformer TF1 which is part of circuit of a first grid phase.

Figure 23:
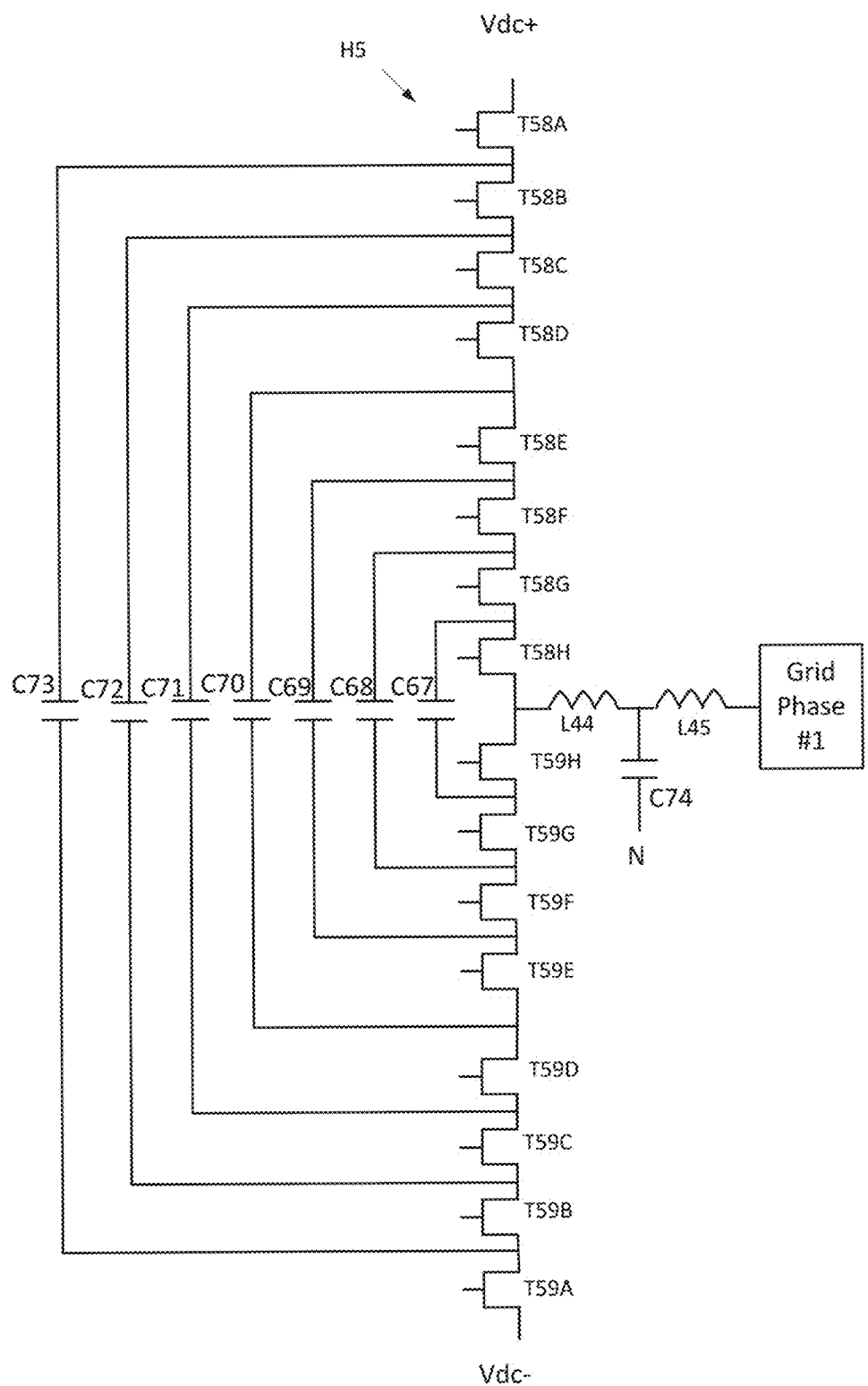
FIG. 23 illustrates another embodiment of a multi-phase multi-level inverter in accordance with embodiments described herein

FIG. 23 shows another embodiment of the three phase system in the form of a circuit of a half-bridge leg H5 without a transformer. The leg H5 includes two banks of switches T57A-H, T58A-H with capacitors C67-C73 in a flying capacitor arrangement. The output of the leg H5 is located at the node between the two banks of switches, specifically, the node between switch T57H and switch T58H. The AC output of the H5 may be connected to a grid phase. The circuit shown in FIG. 22 produces an AC output voltage at the input of the transformer that is the same as the AC output voltage generated by the half-bridge leg H5 shown in FIG. 23. The circuit of FIG. 22 can use half the input DC voltage of the circuit of FIG. 23 and use the same number of MOSFETs as that of FIG. 23.

Figure 24:
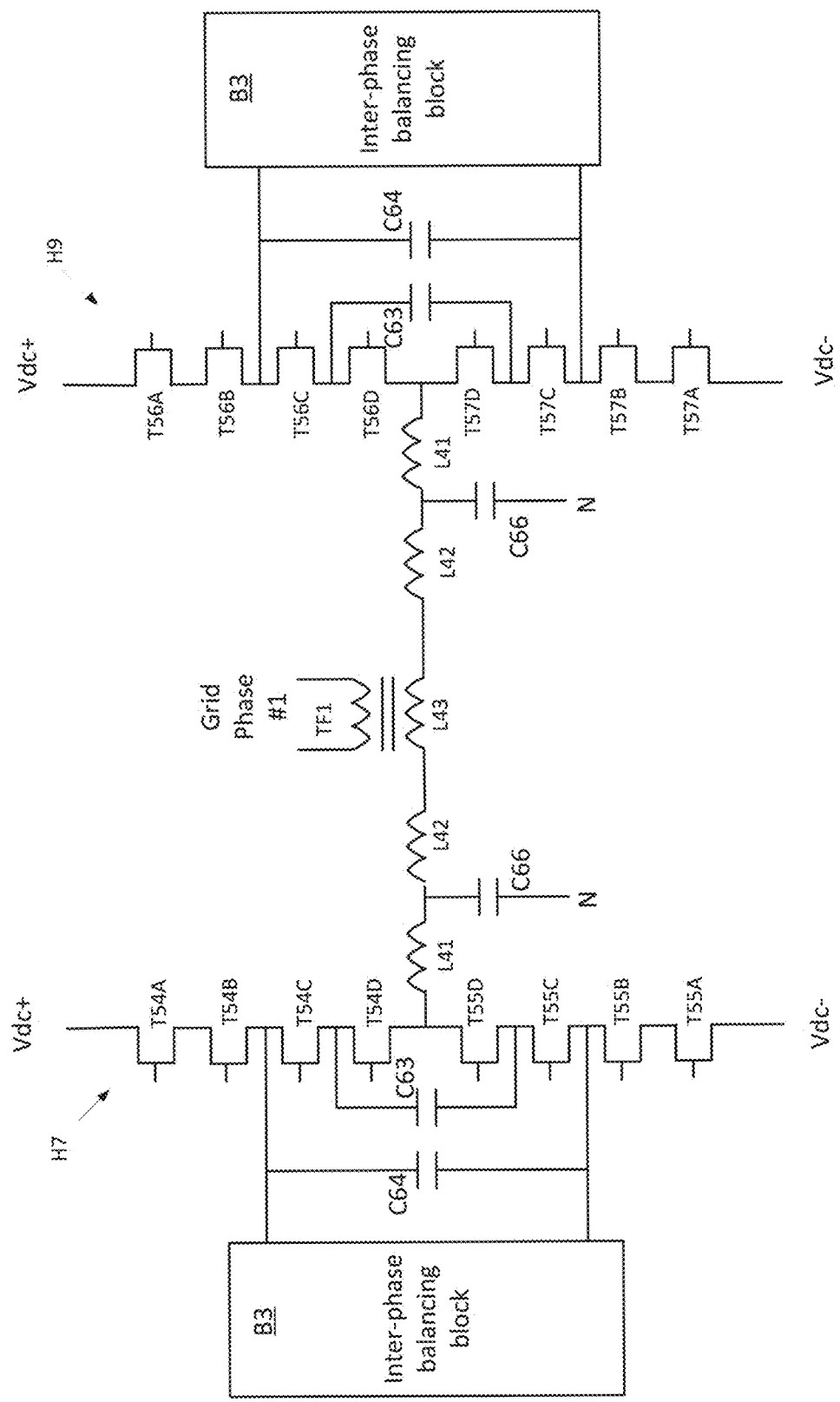
FIG. 24 illustrates an embodiment of a phase of an inverter in accordance with embodiments described herein.

FIG. 24 shows another variation of the multi-phase inverter including six phases. The inverter of FIG. 24 is similar to the embodiment shown in FIG. 22 and uses three dual-leg or full bridge configurations including inter-phase balancing blocks B3. In this case, the inter-phase balancing blocks B3 are located between and connect pairs of phases. The inter-phase balancing block B3 advantageously avoids triple AC line frequency harmonics (e.g. 3*50 Hz) on the middle voltage capacitors (e.g., capacitors C64) that are usually present when balancing these capacitors between three phases (e.g. like in standard Neutral Point Clamped (NPC) topologies) instead of balancing these capacitors between each leg of a phase pair as in the case of the six phase topology. It can be of course generalized to more phases such that the middle voltage capacitor (e.g., capacitor C64) is balanced internally within each pair regardless of the number of pairs in the circuit, which can be standard the three phases (each phase has a pair and therefore a total of 6 phases), six phases (where each phase has a pair and therefore a total of 12 phases), or a higher number of phases. In general, the multi-phase inverter can be extended to any 2*N number of phases, where N=3 is one preferable implementation.

Figure 25:
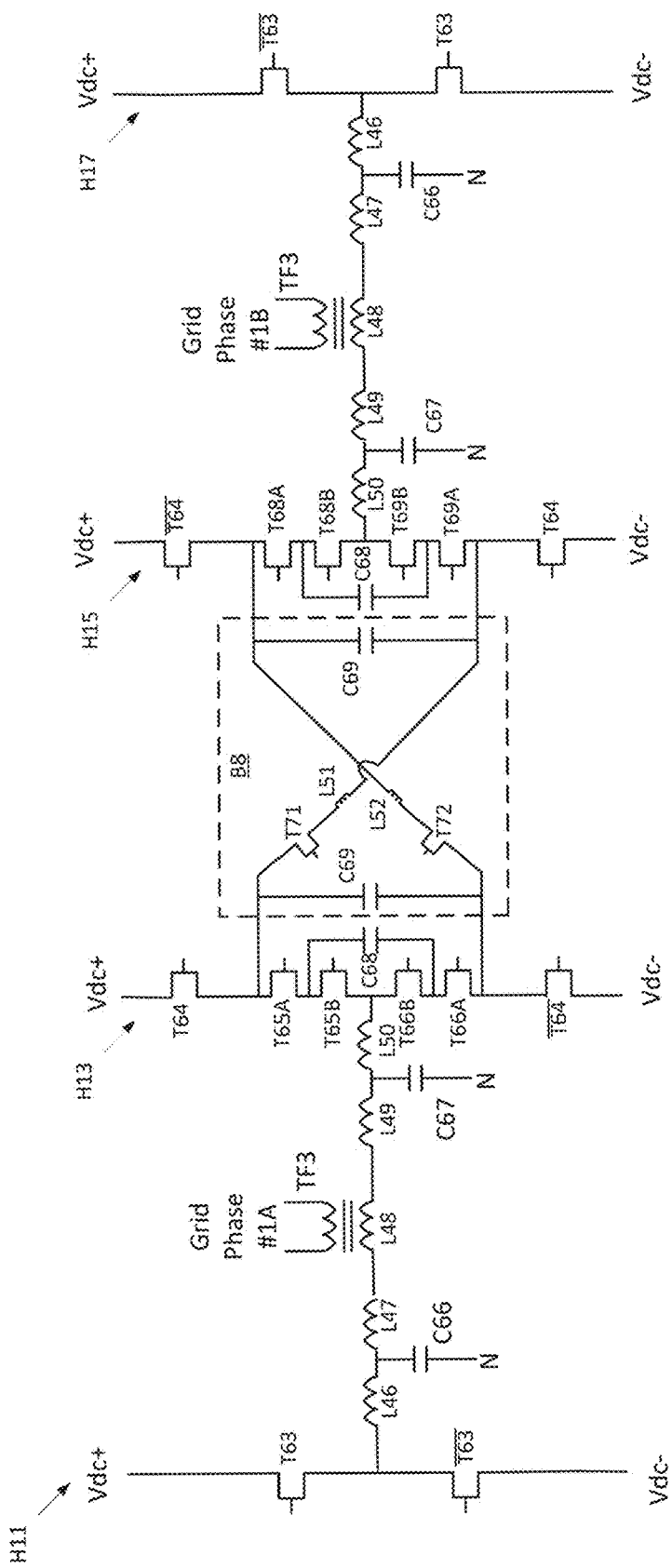
FIG. 25 illustrates another embodiment of a phase of an inverter in accordance with embodiments described herein.

FIG. 25 shows another variation of the multi-phase inverter including six phases (or in more general, any even number of phases such that each two phases are a pair of phases spaced at 180° from each other). The variation shown in FIG. 25 uses balancing between the pairs of phases similar to FIG. 24. In the variation shown in FIG. 25, there are four legs H11, H13, H15, H17 for each AC phase (which means 12 legs in the case of a three-phase inverter), and it can be extended to any 4*N phases, where N=3 is one preferable implementation. The switches T63 and T63 are present at both slow switching legs H11, H17. The switches T63 and T63 switch at 50 Hz and form either a negative or positive Vac output whereas T64 and T64 switch at 100 Hz and divide the half-sine waveform into two halves (e.g. in case of T63=1, we get Vac of 0.5-0.75 or 0.75-1 depending on T64). The middle capacitors C69 of both fast switching phase legs are balanced between the two phases by a balancing block B8 (one example of a balancing block is shown in the main circuit) without the need to connect to legs of other phases, and the balancing block B8 also removes the 150 Hz harmonics (e.g., 3*50 Hz ripple) as described herein. The advantages are that the slow switching phase legs can be formed of ultra low resistance switches regardless of their switching characteristics and that the total output AC voltage Vac is multiplied by four relative to a regular leg, thus enabling higher total power.

Figure 26:
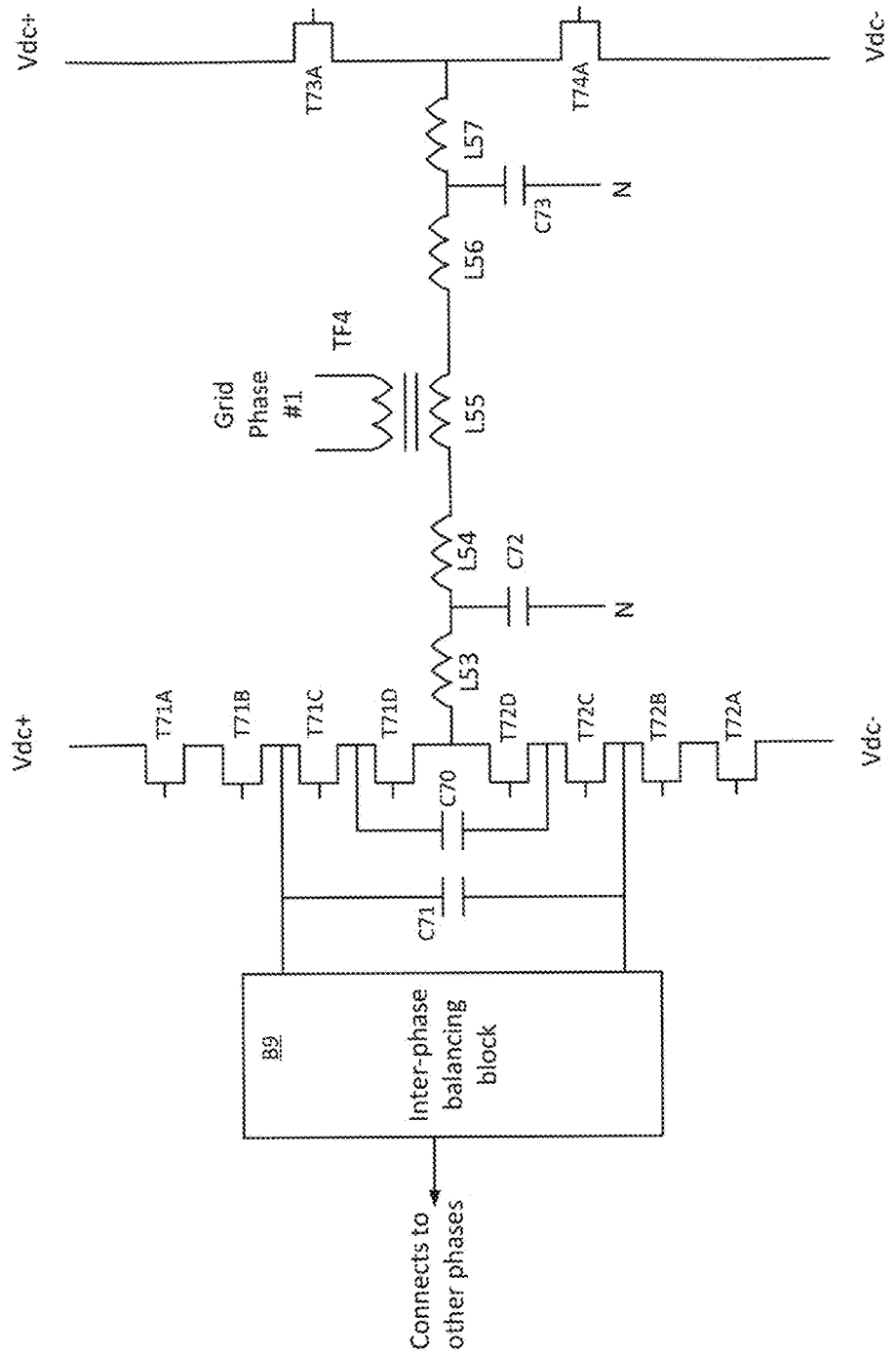
FIG. 26 illustrates yet another embodiment of a phase of an inverter in accordance with embodiments described herein.

Another variation is shown in FIG. 26. In this case, balancing cannot be achieved between the pair of fast switching phase legs. Instead, balancing blocks B9 are connected between the fast switching phase legs of all three phases (or more phases in a more generic case). The balancing blocks B9 are able to reduce the ripple on the middle capacitors C71, though not able to balance them completely.

Figure 27:
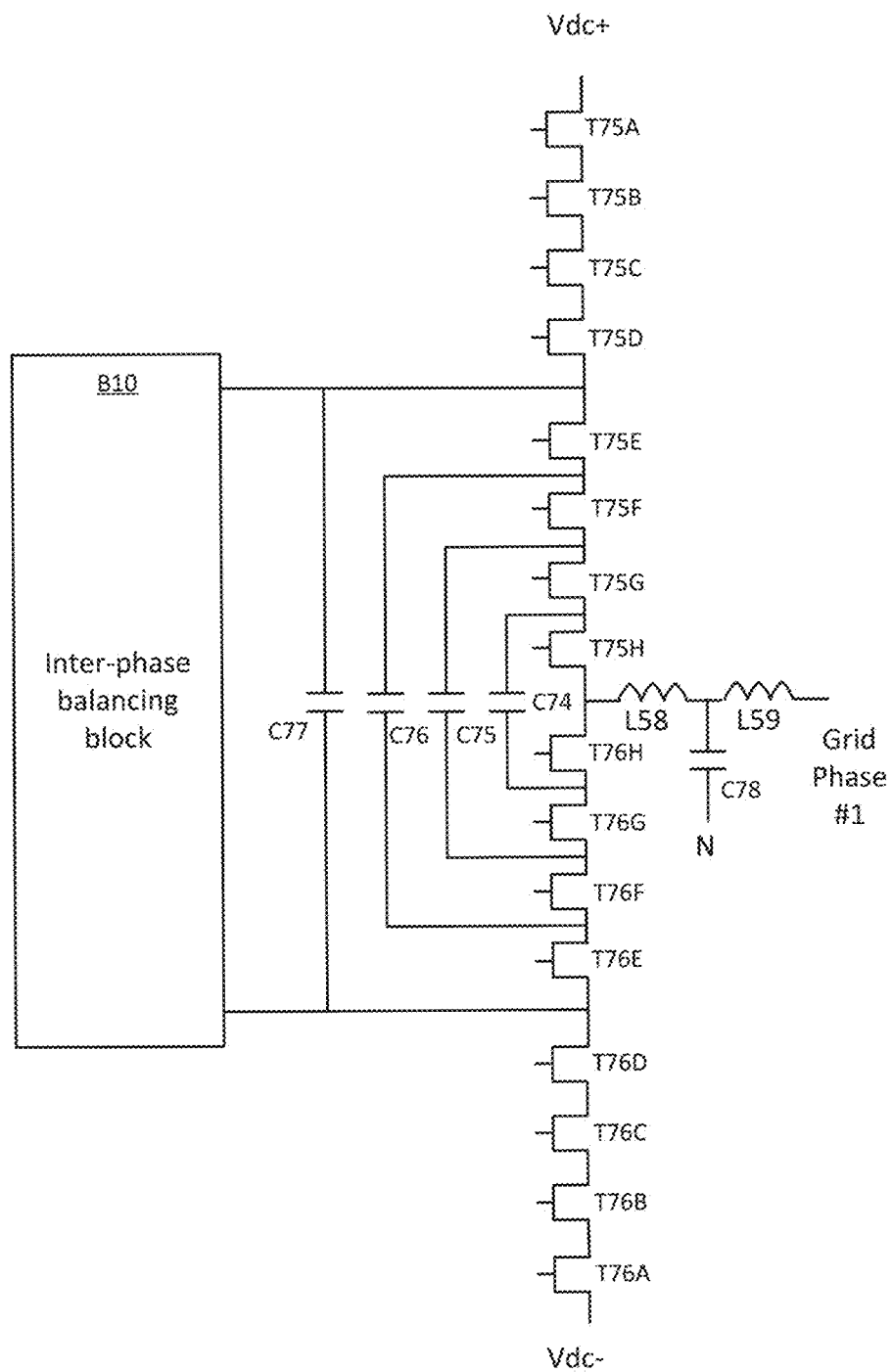
FIG. 27 illustrates another embodiment of a phase of an inverter in accordance with embodiments described herein.

Another variation of the multi-phase inverter includes six phases using a single leg or full bridge for each phase as shown in FIG. 27. Similar to other embodiments, the legs are connected to other legs via the inter-phase balancing block B10.

Figure 28:
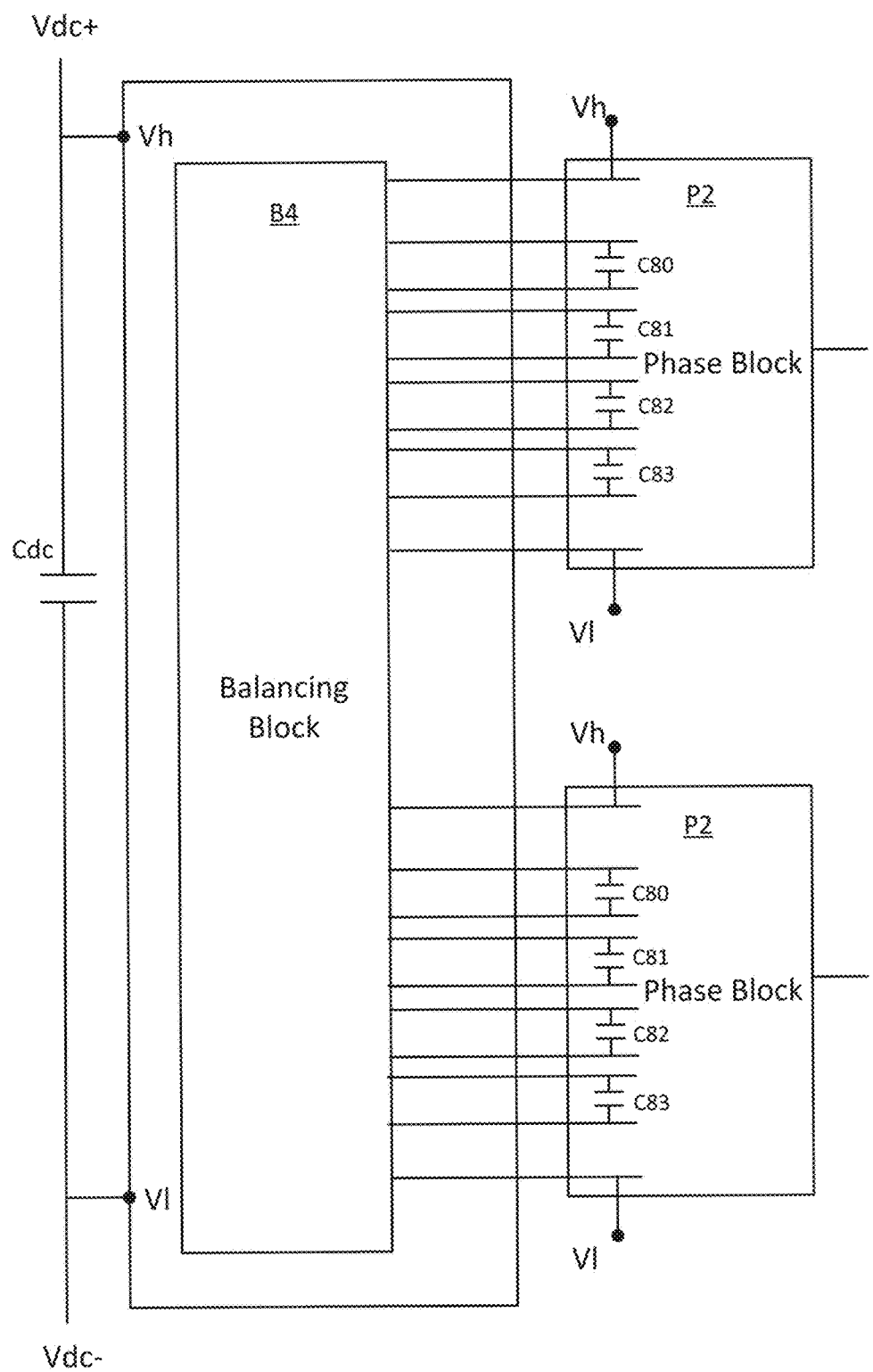
FIG. 28 illustrates an example of a general multi-phase multi-level inverter including a balancing block in accordance with embodiments described herein.

FIG. 28 shows a general multi-phase inverter including a balancing block B4 and two phase blocks P2. FIG. 28 shows an example of two phase blocks, but any number of phase blocks may be used. Each phase block may have an input DC voltage and current paths to Vh and Vl. For example, Vh may be Vdc+, and Vl may be Vdc−. Each phase block P2 may be formed by any DC/DC converter which uses multiple capacitors to form partial DC voltages. For example, the partial DC voltages may be Vdc/N where Vdc=Vdc+ minus Vdc− and N is the number of capacitors in the phase block P2 plus 1.

Figure 29:
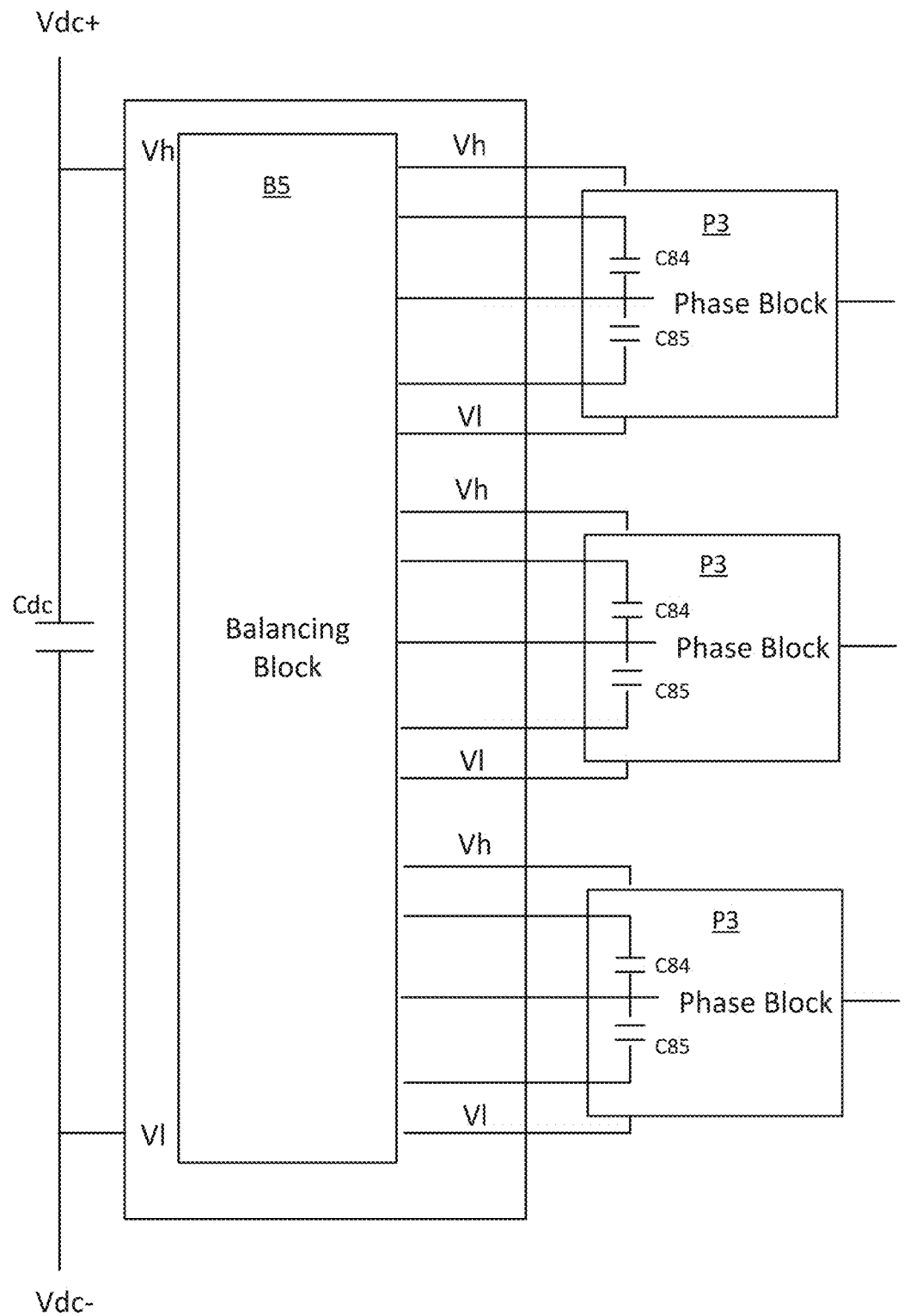
FIG. 29 illustrates another example of a general multi-phase multi-level inverter including a balancing block in accordance with embodiments described herein.

FIG. 29 shows an illustrative general multi-phase inverter including a balancing block B5 and three phase blocks P3. Each phase block P3 may have two input capacitors which each form a voltage equal to Vdc/3. When the two input capacitors are connected in series, the voltage may be 2*Vdc/3.

Figure 32:
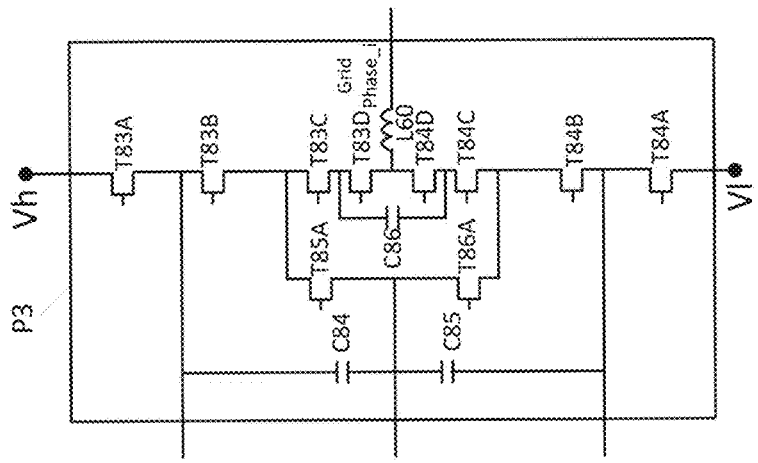
FIG. 32 illustrates an example of a phase block that may be used with the example inverter of FIG. 29 in accordance with embodiments described herein.
Figure 31:
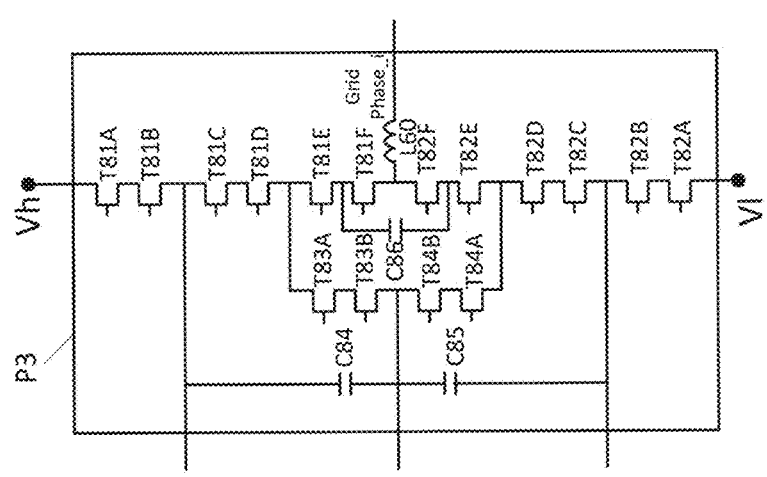
FIG. 31 illustrates an example of a phase block that may be used with the example inverter of FIG. 29 in accordance with embodiments described herein.
Figure 30:
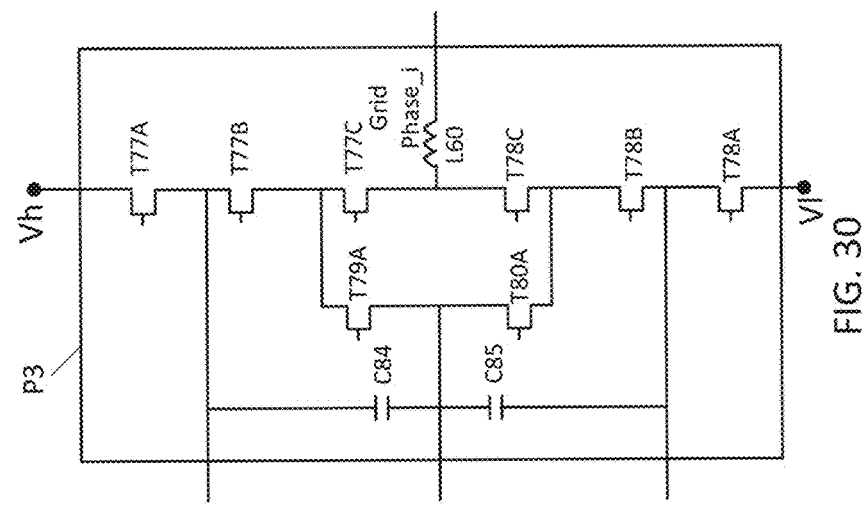
FIG. 30 illustrates an example of a phase block that may be used with the example inverter of FIG. 29 in accordance with embodiments described herein.

FIGS. 30-32 show examples of phase blocks that may be used in the general multi-phase inverter shown in FIG. 29.

The phase block illustrated in FIG. 30 enables the forming of a voltage between a high voltage Vh and low voltage Vl. The two capacitors which each have a voltage of Vdc/3 may be used to form a portion of the amplitude of the voltage. The voltage below Vdc/3 may be provided by using smoothed PWM switching.

In the phase block illustrated in FIG. 31, an additional flying capacitor C86 may be used to form a voltage of Vdc/6 by splitting the switches (e.g., MOSFET transistors) in the phase block shown in P3 into two switches (e.g., MOSFET transistors) in series. For example, switch T77A is replaced with switches T81A and T81B which are connected in series.

The phase block of FIG. 32 shows the example of using a single switch in place of two switches connected in series from the phase block illustrated in FIG. 31.

In the phase blocks P3 of FIGS. 30-32, switches (e.g., MOSFET transistors) T77A, T81A, T81B, T83A, T77C, T81E, T81F, T83C, T83D, T78A, T82A, T82B, T84A, and T78C, T82C, T82E, T82F, T84C, T84D may be fast switching while the remaining switches are switched slowly according to the polarity of a 50 Hz sine wave.

To compensate for the slow switching where two capacitors will either be charged or discharged in a low frequency, the balancing block B5 may be used to balance the current flowing between the capacitors between different legs or phases. The balancing block B5 also enables the use of lower capacitance capacitors.

Figure 33:
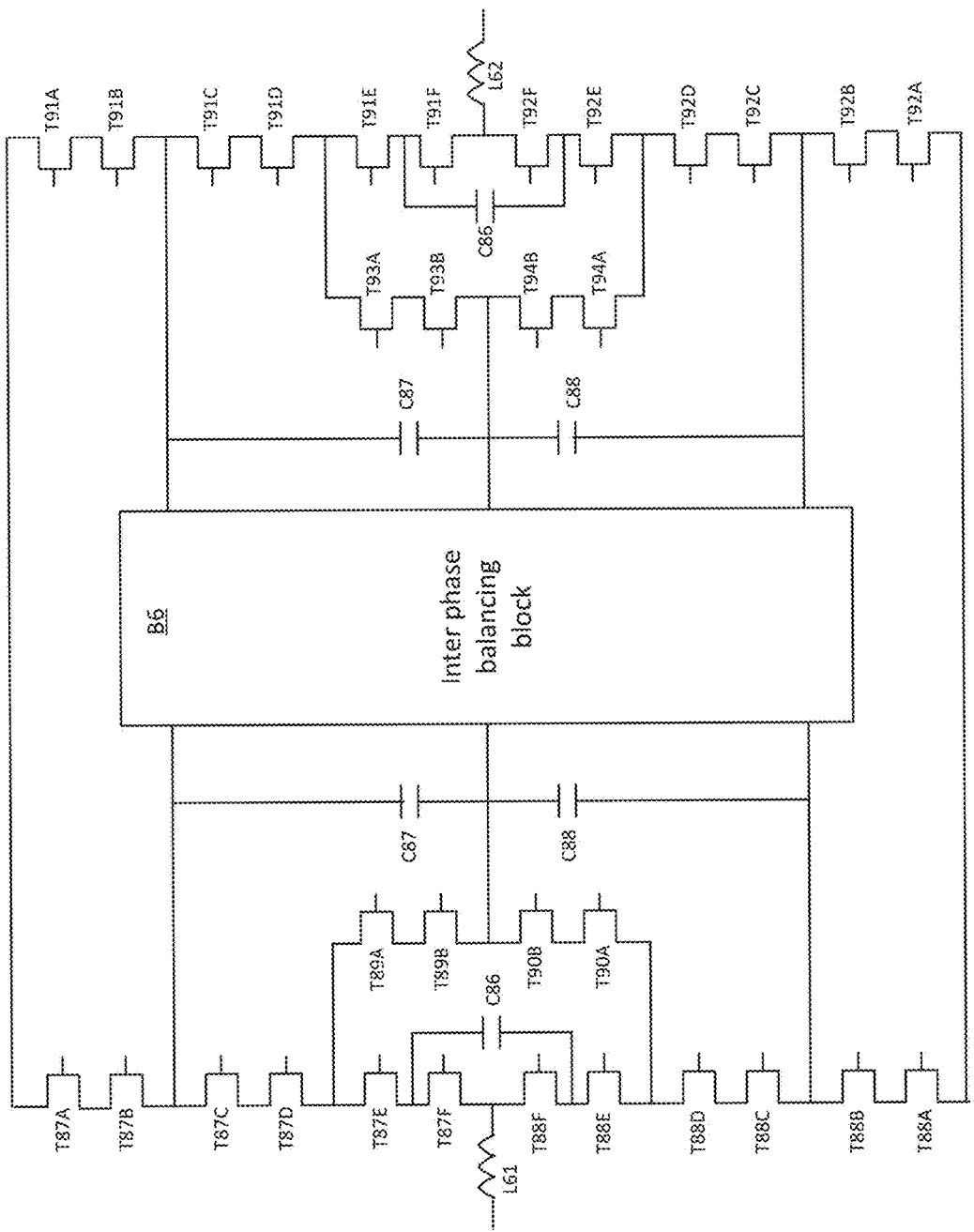
FIG. 33 illustrates an example of a single phase inverter in accordance with embodiments described herein.

FIG. 33 provides an example of a single phase inverter having two legs that require balancing between the legs. An interphase balancing block B6 located between the legs may be used to balance the two legs.

Figure 34:
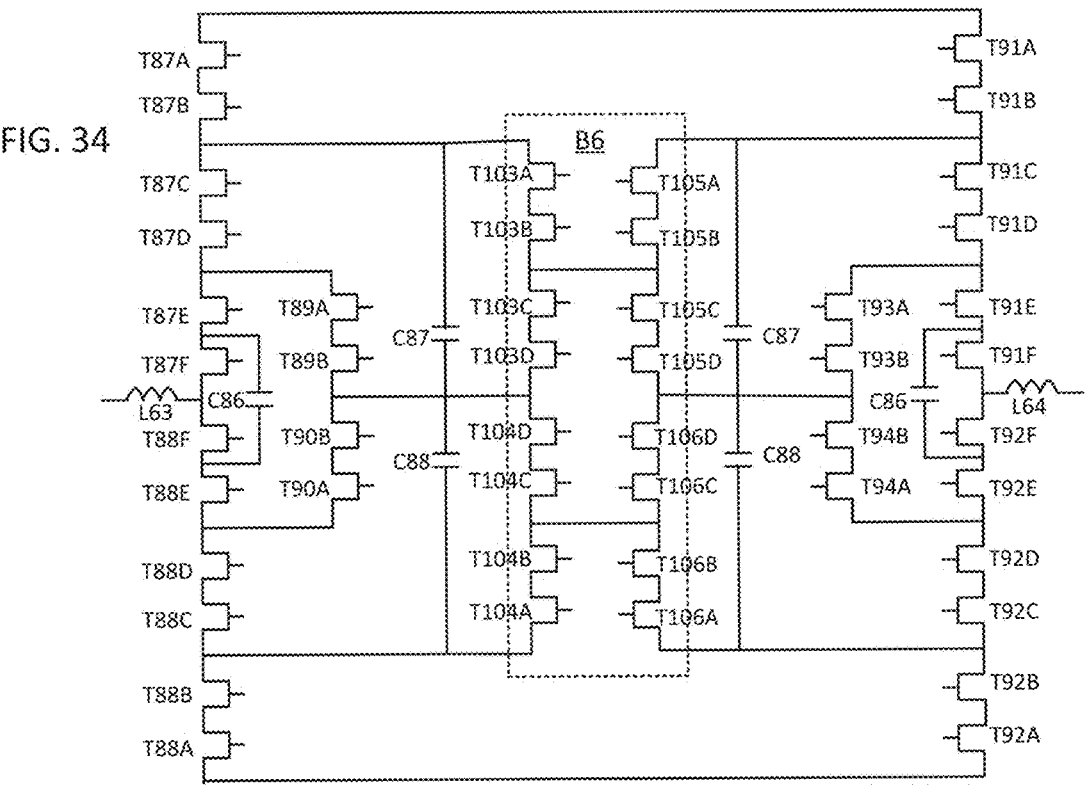
FIG. 34 illustrates another example of a single phase inverter in accordance with embodiments described herein.

FIG. 34 shows an example of an interphase balancing block B6 that can be used in the single phase inverter of FIG. 33.

Figure 35:
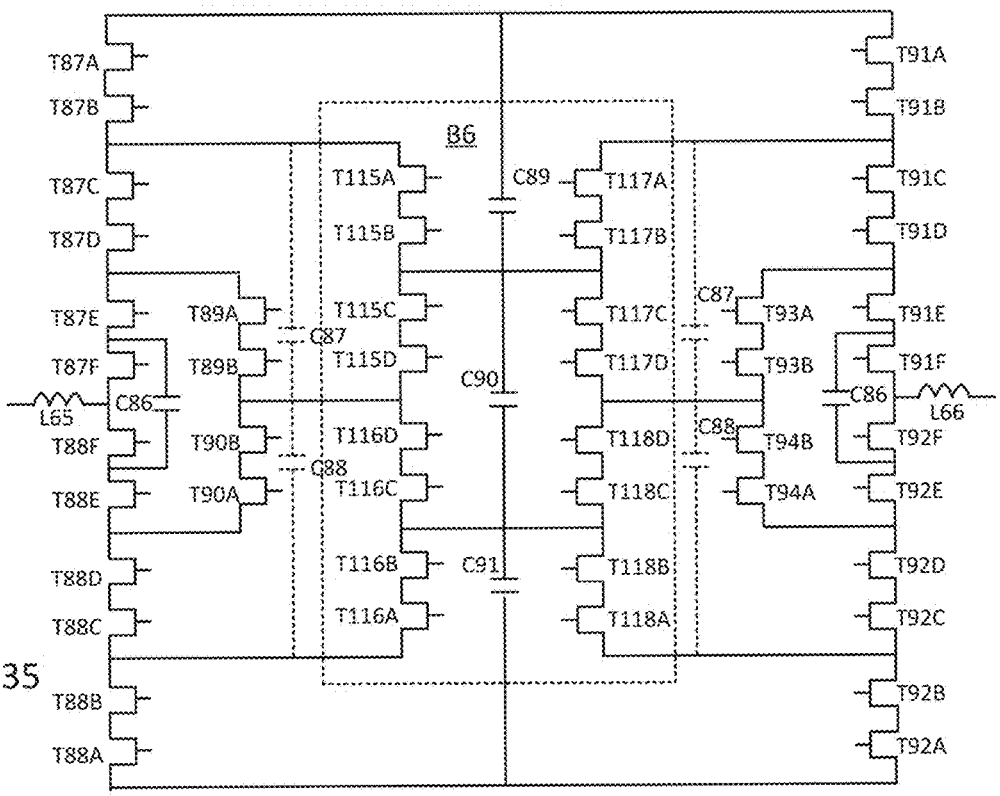
FIG. 35 illustrates another example of a single phase inverter in accordance with embodiments described herein.

FIG. 35 shows another example of an interphase balancing block B6 that may be used in the single phase inverter of FIG. 33. The three center capacitors C89-C91 may be used in addition to or in place of the two pairs of capacitors C87, C88 illustrated with dotted lines.

Figure 36:
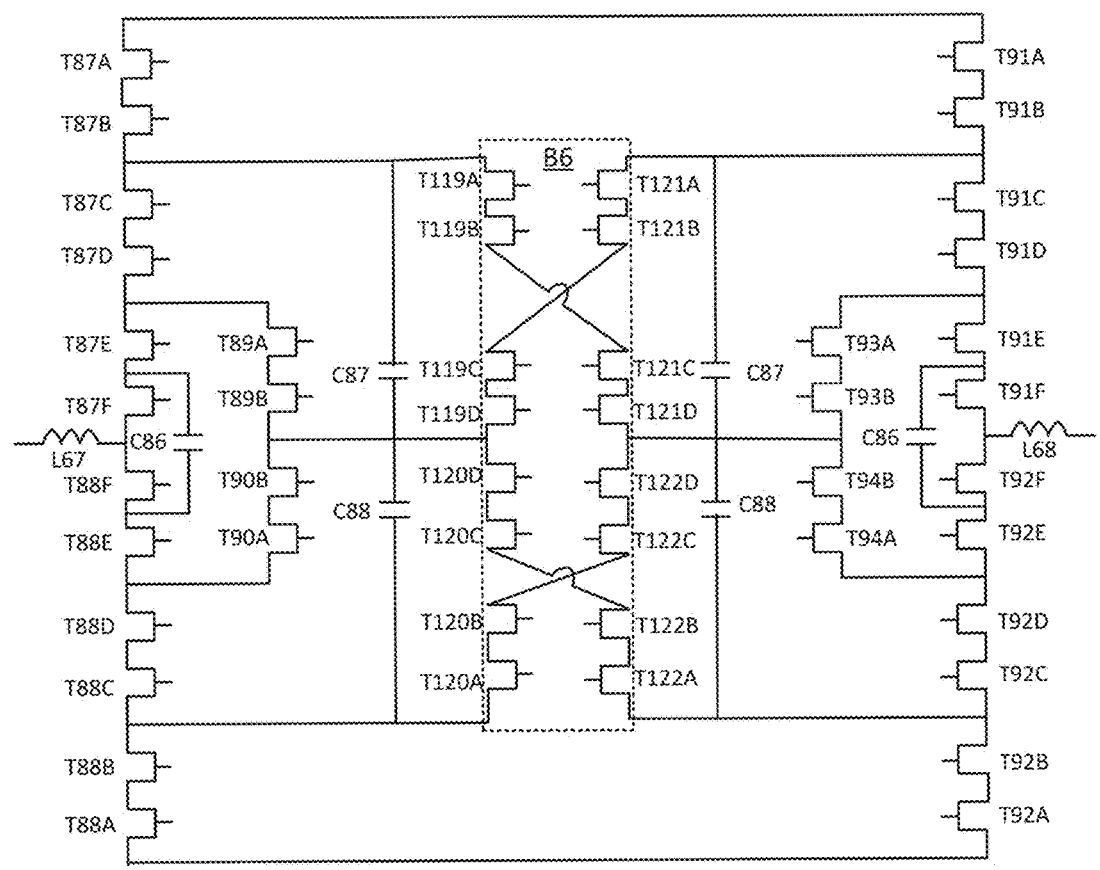
FIG. 36 illustrates another example of a single phase inverter in accordance with embodiments described herein.

FIG. 36 shows an example inter-phase balancing block B6 where there are no intersection points between the two legs. While FIG. 36 shows the use of two switches in each leg forming a series connection of four switches between the two legs, any number of switches may be used including a single switch.

Figure 37:
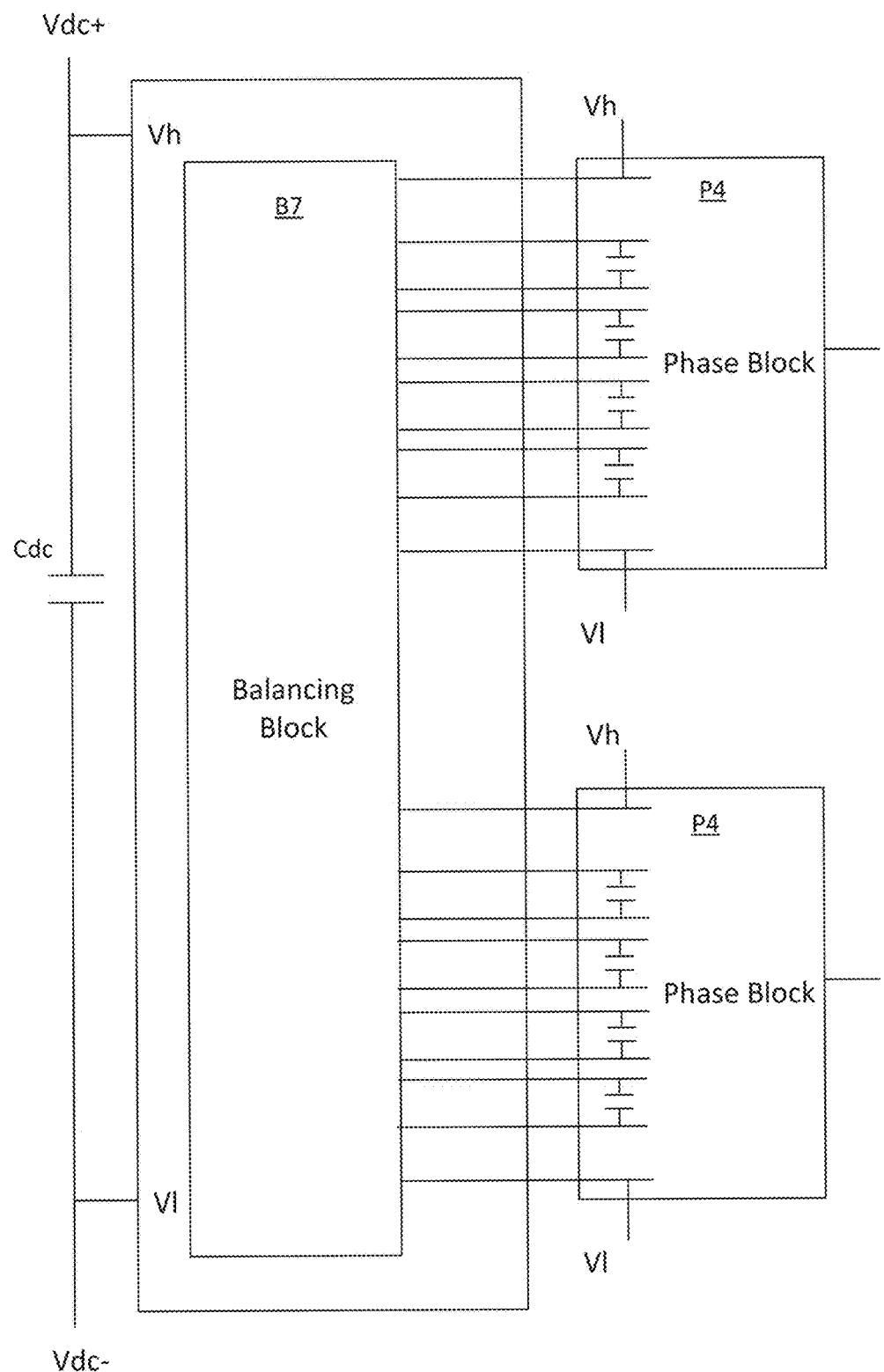
FIG. 37 illustrates another example of a general multi-phase multi-level inverter including a balancing block in accordance with embodiments described herein.

Similarly, the variations described herein may be used for phase blocks having multiple capacitors in each phase block forming partial voltage as shown in FIG. 37. Phase blocks similar to those used for the two capacitor phase blocks shown in FIGS. 30-32 may be used with the modification of including 4 capacitors. A balancing block similar to those shown in FIGS. 34-36 may also be used.

Figure 38:
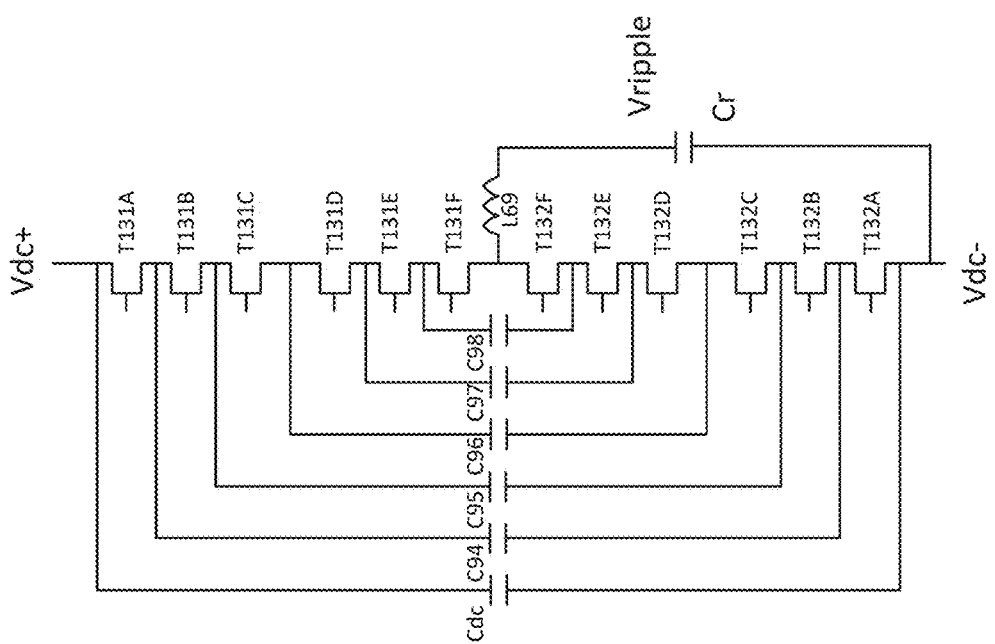
FIG. 38 illustrates an embodiment of a single phase inverter with reduced capacitance in accordance with embodiments described herein.

FIG. 38 shows another embodiment of a single phase inverter with reduced capacitance similar to FIG. 5. The reduced capacitance may be accomplished by using a DC/DC converter between the input voltage (Vdc+ to Vdc− (e.g., GND)) and a rippled voltage Vripple over a capacitor Cdc on the rippled voltage $V_{ripple}$.

Figure 39:
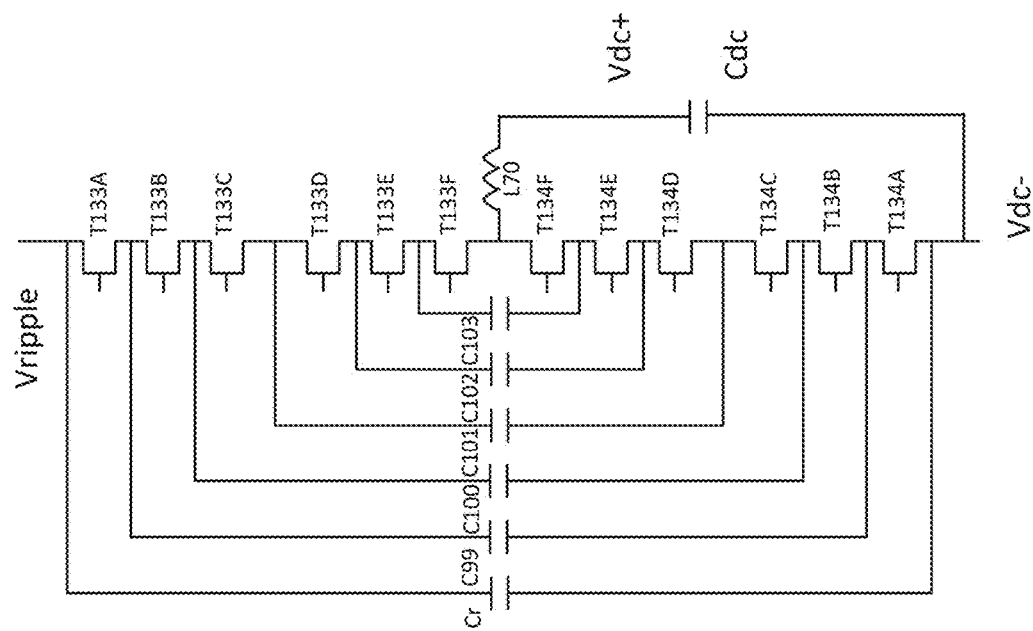
FIG. 39 illustrates another embodiment of a single phase inverter with reduced capacitance in accordance with embodiments described herein.

FIG. 39 shows a variation of the single phase inverter with reduced capacitance. A boost DC/DC− may be used. The variation shown in FIG. 39 is advantageous in that a higher voltage ripple capacitor may be used, so the size may be reduced. More switches or higher rating switches are used in this variation to reach the higher voltage. For example, to boost the ripple voltage up to twice the DC average voltage requires total withstand voltage of twice the DC voltage on each half-leg.

Figures 40, 41:
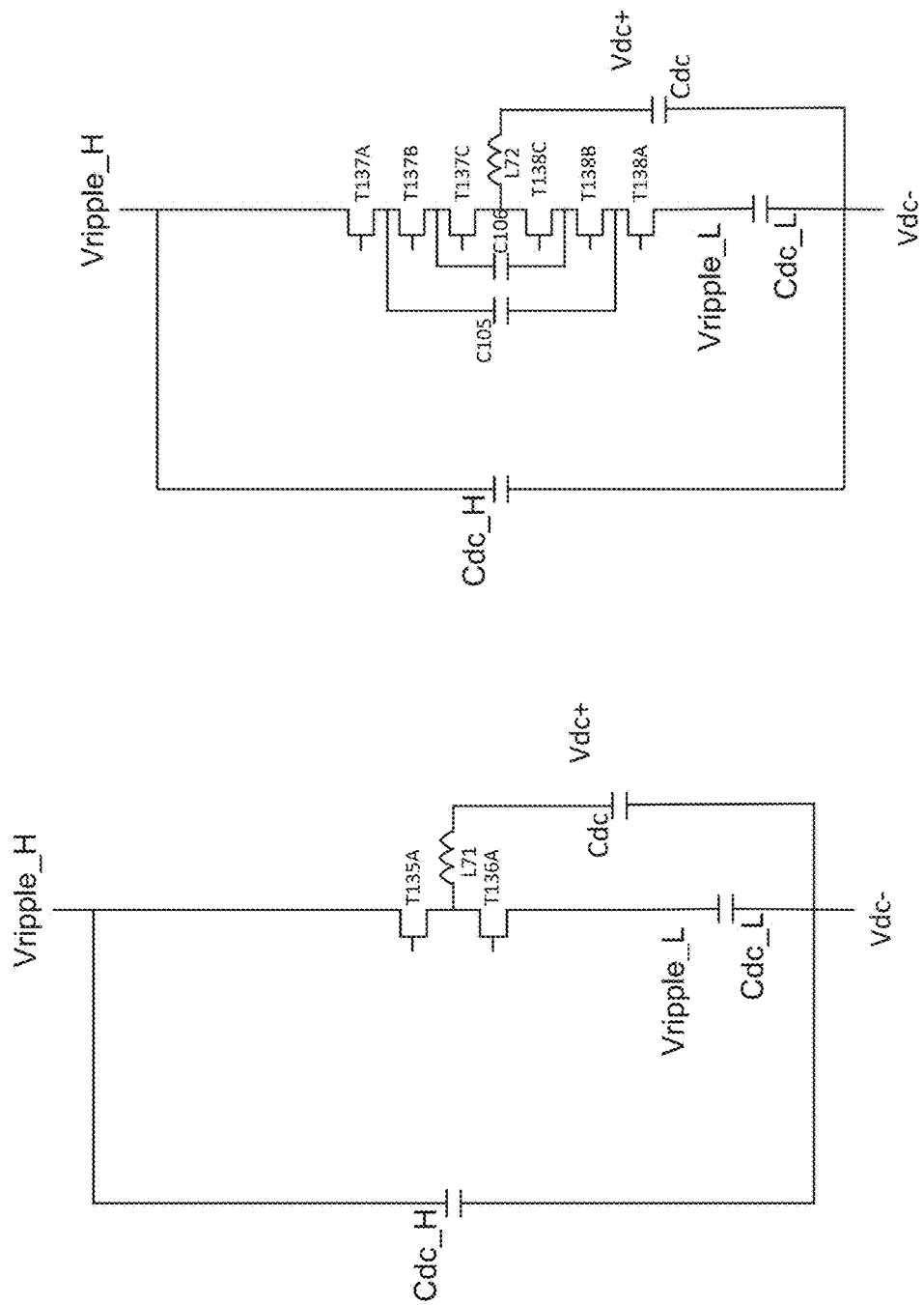
FIG. 40 illustrates an embodiment of an inverter including a buck-boost aspect in accordance with embodiments described herein.
FIG. 41 illustrates another embodiment of an inverter including a buck-boost aspect in accordance with embodiments described herein.

FIG. 40 shows a variation including a buck-boost aspect centered around the input DC voltage by two switches. The ripple capacitance is spread over two ripple capacitors Cdc_H and Cdc_L. Since this variation requires less switches than other buck or boost embodiments, this variation is cheaper and has less losses. The addition of Cdc_L enables the circuit to achieve a full voltage rating (Vdc+ to Vdc−) without placing all of the switches in series. The circuit can boost voltages to twice the DC voltage while having withstand voltage of the DC voltage in each half-leg. The gain boost of this variation may be up to twice the DC voltage.

FIG. 41 shows another variation including a buck-boost aspect with two switches implemented as flying capacitor switches. Using this variation, low-voltage MOSFET transistors may be used as the switches with a capacitance reduction. Similar to the previous variation, the addition of Cdc_L enables the circuit to achieve a full voltage rating (Vdc+ to Vdc−) without placing all of the switches in series. The circuit can boost voltages to twice the DC voltage while having withstand voltage of the DC voltage in each half-leg. In another variation, three or four switches in series may be used while using small capacitance values for Cdc_H and Cdc_L. This enables the reduction of conduction switching losses considerably while still being able to reduce the total capacitance of Cdc_H and Cdc_L lower than the DC capacitance usually required without a swing mechanism of swinging the ripple between the capacitors Cdc_H and Cdc_L.

Figure 42:
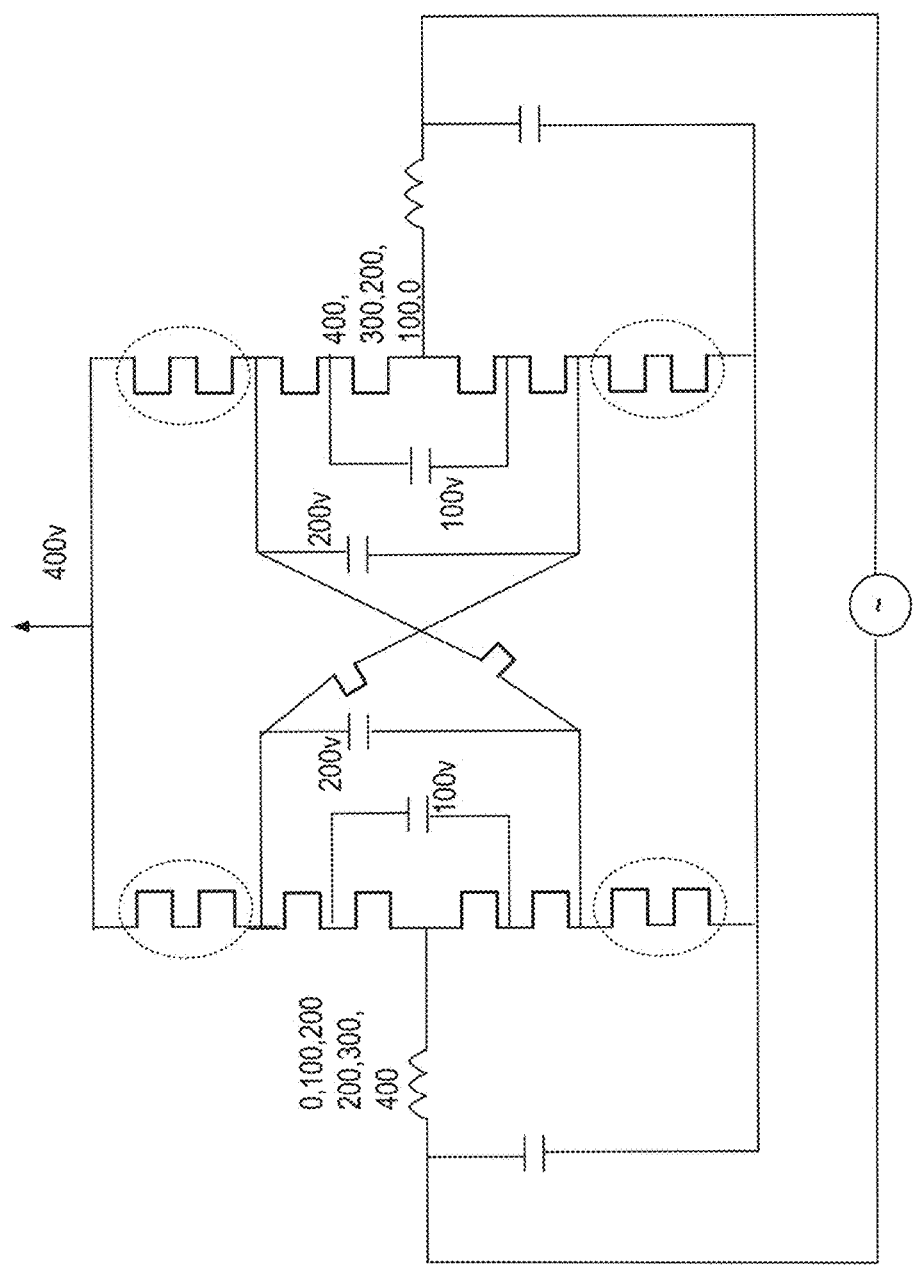
FIG. 42 illustrates another embodiment of an inverter topology in accordance with embodiments described herein.

FIG. 42 illustrates a further embodiment including, for example, a DC voltage (400V in the diagram) divided into 200V capacitors and 100V flying capacitors. The balancing block concept previously presented (e.g., FIGS. 11-14) is implemented by the two cross MOSFETs to balance the 200V capacitor between the two phases. The output voltages at any of the two phase outputs can be 0, 100, 200, 300, 400V utilizing all the states of the flying capacitor structure. The 100V capacitor is a flying capacitor that is balanced by a proper timing diagram as described previously (e.g., by an adjustment of each of the 01 and 10 states relative timing (while keeping the average duty cycle fixed). In certain variations, 150V low-voltage MOSFETs are used for the switches (e.g., BSB165N15 from Infineon with very low Rds on of 13 mohm).

The switching frequency for the circuit in FIG. 42 may include as one example, 50 KHz for each MOSFET, such that the switching losses are still low enough and yet the total output inductor ripple is at 2*50 KHz=100 KHz, thereby allowing a very small inductor (e.g., a PQ40 core). At 100 KHz total inductor frequency is 6 times higher than prior inverter switching frequencies, and the utilization of low-voltage MOSFETs at this high frequency enables several inverter benefits, including:
1. Much smaller passive components (reduced by 6 due to frequency and by 4 due to the use of 150V rated parts instead of 600V rated parts required for typical inverters). This is a gain of ×24 of the passive components size and cost (which is mostly magnetics).
2. Much lower power losses and therefore superb efficiency (above 99%) which allows passive cooling (without fans) even for high power levels (such as 15 KW, 20 KW, 50 KW, 80 KW, 100 KW, etc.).

3. Much smaller inverter size due to the above mentioned benefits, including reduced passives size and reduced cooling requirements.

Figure 43:
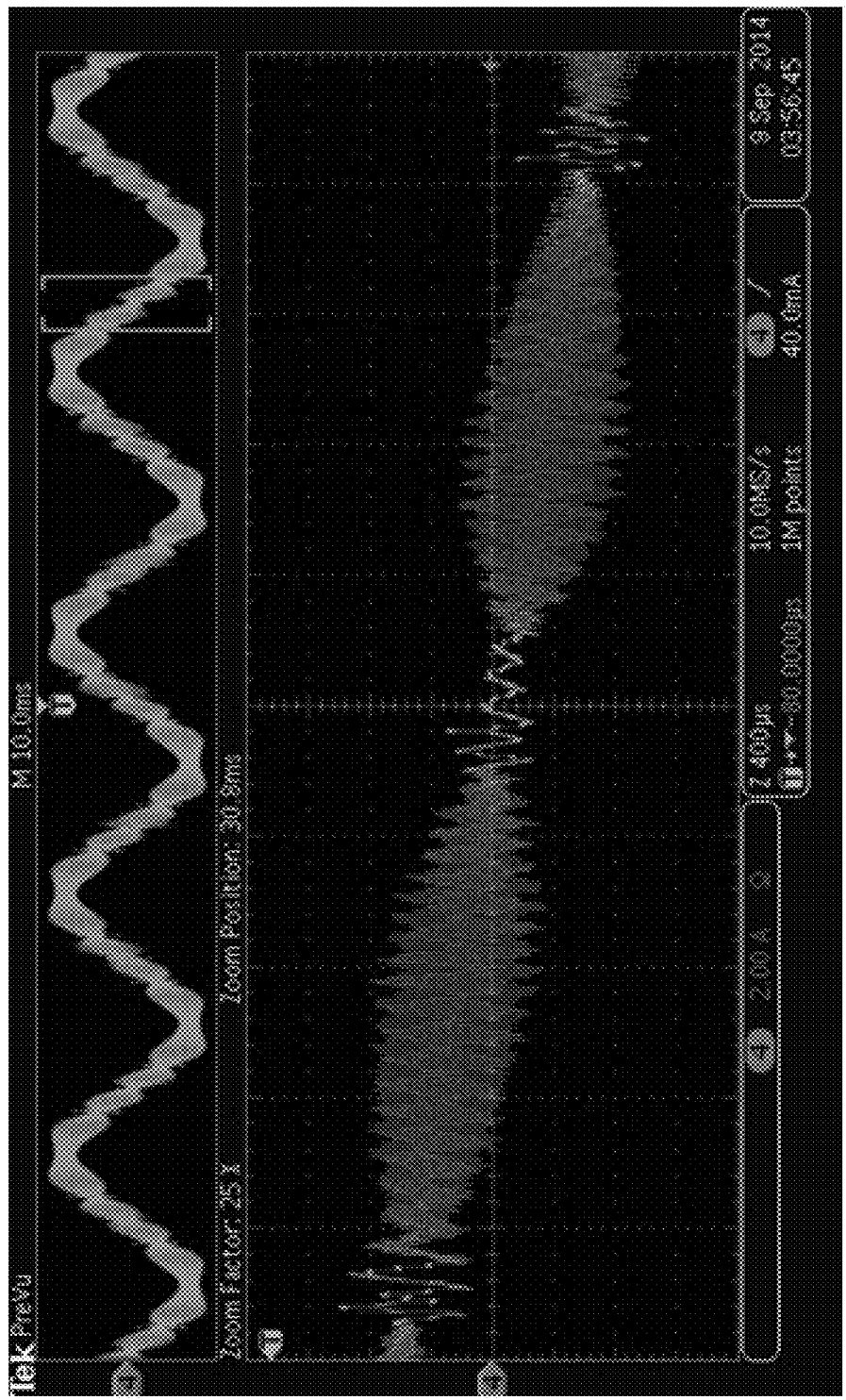
FIG. 43 illustrates operational results of the inverter topology shown in FIG. 42 in accordance with embodiments described herein.

For the circuit in FIG. 42, the current through the inductor is shown in the test results illustrated in FIG. 43. It can be seen that throughout the 50 Hz sine wave current, there are four stages where each one of them is composed of fluctuating current from zero current to a maximum peak-to-peak ripple current. These four stages relate to the levels of the multi-level implementation (according to 0 v, 100 v, 200 v, 300 v) as was previously described with respect to the circuit in FIG. 42.

Figure 44:
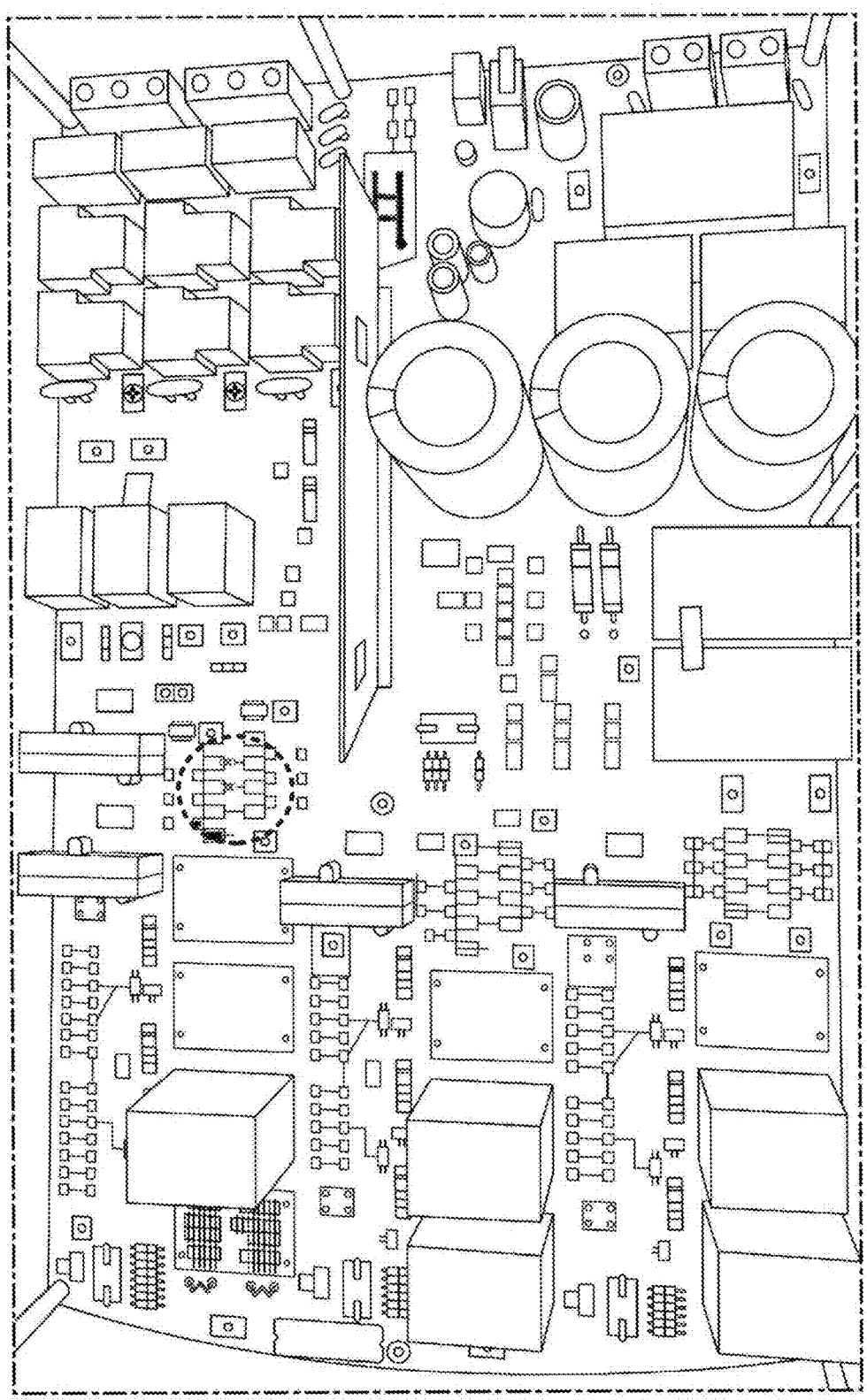
FIG. 44 illustrates an example circuit board in accordance with embodiments described herein.

FIG. 44 shows a picture of an electronic circuit board of the circuit in FIG. 42. The board includes various options (number of MOSFETs in series), several types of capacitors etc. to implement the circuit configuration of the FIG. 42 circuit and other circuits described herein. The image is annotated with a dotted circle that identifies the MOSFETS in the FIG. 42 circuit.

Figure 45:
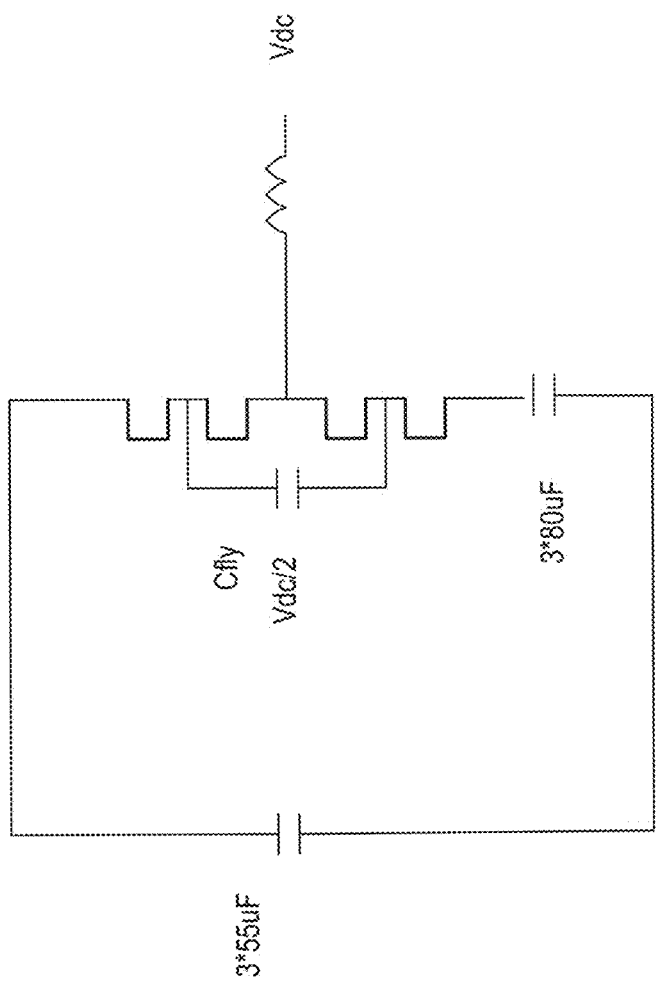
FIG. 45 illustrates aspects of a multi-level inverter in accordance with embodiments described herein.

In various embodiments, the FIG. 42 circuit includes the active capacitor concept that was described with respect to FIG. 5. According to these embodiments, instead of having the line frequency (50/60 Hz) ripple on the input capacitor (not shown in FIG. 42) of Vdc (labeled 400V), which previously limited its ripple to about 10%, the circuit of FIG. 45 is connected to Vdc of FIG. 42. In this case, the Vdc ripple is redirected to other capacitors that may have a very high ripple (e.g. between 0 to their rated voltage), and therefore, can use much smaller capacitance (about 1/10 of the original capacitance).

In one embodiment 150V BSB165N15 MOSFETS from Infineon are used and the previously described flying capacitor topology is utilized such that Cfly is balanced to Vdc/2. In an embodiment, 575V capacitors (3*80 uF) and 700V capacitors (3*55 uF) are used, with a total of about 400 uF at 575-700V range instead of having about 4000-5000 uF rated for 500V, as is conventional prior systems. With this embodiment, up to 200V of ripple voltage is possible on the capacitors, which allows for a considerable reduction of the required capacitance.

Figure 46:
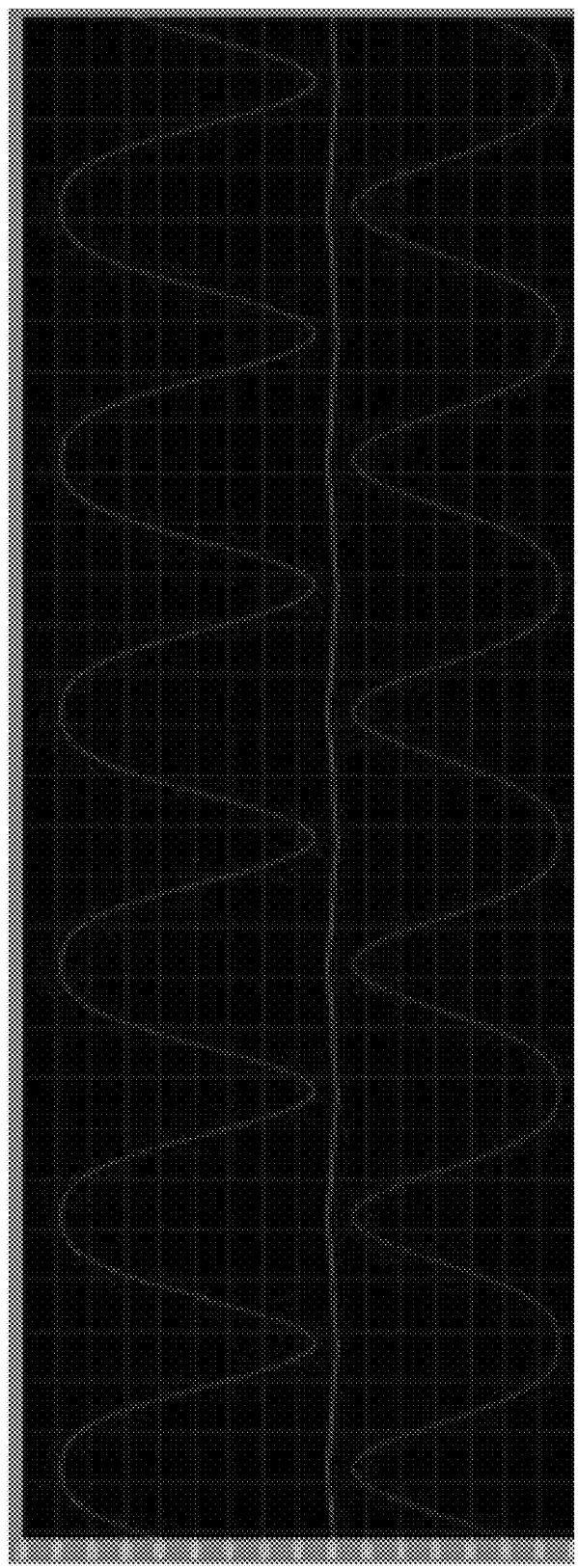
FIG. 46 illustrates operational results of the inverter topology shown in FIG. 45 in accordance with embodiments described herein.

In the signal plot illustrated in FIG. 46, the capacitor voltages are shown for the active capacitor input circuit of FIG. 45. The middle line is the average Vdc input, the top line is the voltage of the capacitor that fluctuates above Vdc (3*55 uF), and the bottom line is the voltage of the capacitor that fluctuates below Vdc (3*80 uF).

This reduced capacitance of the various embodiments disclosed herein allows for the use film capacitors instead of aluminum electrolytic capacitors. Film capacitors are less dense and less cost effective for the same capacitance level, but due to the reduction in capacitance, the same level of cost and volume is obtained while gaining much higher reliability and lifetime due to the properties of film capacitors (typically 20-25 years lifetime instead of 5-12 years for an electrolytic capacitor).

Further, by leverage the flying capacitor topology with low-voltage MOSFETs at high frequency, very low losses, high efficiency and much smaller converters with passive cooling can be achieved, which is not possible with current standard solutions. Prior solutions required the use of high-voltage IGBTs/IGCTs operating at very low frequencies, resulting in high losses that necessitated the use of fans or other active cooling resources that reduced efficiency further.

Although example embodiments are described above, the various features and steps may be combined, divided, omitted, and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:

1. An apparatus comprising a first ripple storage capacitor, a second ripple storage capacitor, a first switch, a second switch, an inductor, a central node, an input terminal, and a reference terminal, wherein:
   the first ripple storage capacitor is connected between the central node and the reference terminal through the first switch;
   the second ripple storage capacitor is connected between the central node and the reference terminal through the second switch; and
   the inductor is connected between the central node and the input terminal.

2. The apparatus of claim 1, further comprising a control circuit including control signals output to the first switch and the second switch, wherein the control circuit is configured to operate the first switch and the second switch to:
   convert an input ripple voltage at the input terminal to a first ripple voltage across the first ripple storage capacitor and a second ripple voltage across the second ripple storage capacitor.

3. The apparatus of claim 2, wherein the first ripple voltage is higher than an average direct-current voltage at the input terminal and the second ripple voltage is lower than the average direct-current voltage at the input terminal.

4. The apparatus of claim 3, wherein a gain boost of the apparatus is up to twice the average direct-current voltage.

5. The apparatus of claim 2, wherein the control circuit is configured to:
   fluctuate the first ripple voltage above an average direct-current voltage at the input terminal; and
   fluctuate the second ripple voltage below the average direct-current voltage.

6. The apparatus of claim 5, wherein the control circuit is configured to:
   fluctuate the first ripple voltage between the average direct-current voltage at the input terminal and twice the average direct-current voltage; and
   fluctuate the second ripple voltage between the average direct-current voltage and zero voltage.

7. The apparatus of claim 1, wherein the first ripple storage capacitor and the second ripple storage capacitor are directly connected to the reference terminal.

8. The apparatus of claim 1, further comprising a third switch, a fourth switch and a flying capacitor, wherein:
   the first ripple storage capacitor and the first switch are connected to the central node through the third switch;
   the second ripple storage capacitor and the second switch are connected to the central node through the fourth switch; and
   the flying capacitor is connected between terminals of the third switch and the fourth switch that are distal from the central node.

9. The apparatus of claim 8, further comprising a control circuit including control signals output to the first switch, the second switch, the third switch, and the fourth switch, wherein the control circuit is configured to operate the first switch, the second switch, the third switch, and the fourth switch, to:
  convert an input ripple voltage at the input terminal to a first ripple voltage across the first ripple storage capacitor and a second ripple voltage across the second ripple storage capacitor; and
  balance a voltage across the flying capacitor to half an average direct-current voltage between the input terminal and the reference terminal.

10. The apparatus of claim 1, further comprising an inverter, wherein the input terminal and reference terminal are connected across inputs of the inverter.

11. The apparatus of claim 1, wherein the first switch and the second switch are MOSFETs.

12. The apparatus of claim 1, wherein the first ripple storage capacitor and the second ripple storage capacitor are film capacitors.

13. A method comprising converting an input ripple voltage between an input terminal and the reference terminal to a first ripple voltage across a first ripple storage capacitor and a second ripple voltage across a second ripple storage capacitor by:
  switching the first ripple storage capacitor between a central node and the reference terminal through a first switch; and
  switching the second ripple storage capacitor between the central node and the reference terminal through a second switch, wherein the central node is connected to the input terminal through an inductor.

14. The method of claim 13, wherein the first ripple voltage is higher than an average direct-current voltage at the input terminal and the second ripple voltage is lower than the average direct-current voltage at the input terminal.

15. The method of claim 13, further comprising:
  fluctuating the first ripple voltage above an average direct-current voltage at the input terminal; and
  fluctuating the second ripple voltage below the average direct-current voltage at the input terminal.

16. The method of claim 15, further comprising:
  fluctuating the first ripple voltage between the average direct-current voltage at the input terminal and twice the average direct-current voltage at the input terminal; and
  fluctuating the second ripple voltage between the average direct-current voltage at the input terminal and zero voltage.

17. The method of claim 15, wherein the first ripple storage capacitor and the second ripple storage capacitor are directly connected to the reference terminal.

18. The method of claim 13, further comprising:
  connecting the first ripple storage capacitor and the first switch to the central node through a third switch;
  connecting the second ripple storage capacitor and the second switch to the central node through a fourth switch; and
  connecting a flying capacitor between terminals of the third switch and the fourth switch that are distal from the central node.

19. An apparatus comprising:
  an inverter configured to convert direct-current power at input terminals of the inverter to alternating-current power at output terminals of the inverter;
  a first capacitor connected across the input terminals of the inverter,
  a buck-boost circuit comprising:
    a pair of ripple storage capacitors; and
    input terminals connected in parallel with the input terminals of the inverter and with the first capacitor.

20. The apparatus of claim 19, wherein the buck-boost circuit is configured to transfer a ripple voltage across the first capacitor to the pair of ripple storage capacitors.

21. The apparatus of claim 20, wherein the buck-boost circuit is configured to swing the ripple voltage between a first voltage across a first ripple storage capacitor of the pair of ripple storage capacitors and a second voltage across a second ripple storage capacitor of the pair of ripple storage capacitors.

22. The apparatus of claim 20, wherein the buck-boost circuit is configured to:
  control a first voltage across a first ripple storage capacitor of the pair of ripple storage capacitors to be greater than an average voltage at the input terminals of the buck-boost circuit; and
  control a second voltage across a second ripple storage capacitor of the pair of ripple storage capacitors to be less than the average voltage at the input terminals of the buck-boost circuit.

23. The apparatus of claim 19, wherein the buck-boost circuit is configured to transfer a ripple voltage across the first capacitor to:
  a first ripple voltage, across a first ripple storage capacitor of the pair of ripple storage capacitors, fluctuated between an average direct-current voltage at the input terminals of the inverter and twice the average direct-current voltage at the input terminals of the inverter; and
  a second ripple voltage, across a second ripple storage capacitor of the pair of ripple storage capacitors, fluctuated between the average direct-current voltage at the input terminals of the inverter and zero voltage.

24. The apparatus of claim 19, wherein the buck-boost circuit comprises two half-legs, each comprising a respective switch connecting a respective one of the pair of ripple storage capacitors across the input terminals of the buck-boost circuit.

25. The apparatus of claim 24, further comprising an inductor, wherein the two half-legs are connected across the input terminals of the buck-boost circuit through the inductor.

26. A method comprising:
  converting, with an inverter, direct-current power at an input of the inverter to alternating-current power at an output of the inverter; and
  filtering a ripple voltage at the input of the inverter by transferring the ripple voltage through a buck-boost circuit, connected across the input of the inverter, to a pair of ripple storage capacitors.

27. The method of claim 26, further comprising:
  swinging, with the buck-boost circuit, the transferred ripple voltage between a first voltage across a first ripple storage capacitor of the pair of ripple storage capacitors and a second voltage across a second ripple storage capacitor of the pair of ripple storage capacitors.

28. The method of claim 26, further comprising:
  controlling, with the buck-boost circuit, a first voltage across a first ripple storage capacitor of the pair of ripple storage capacitors to be greater than an average voltage of the direct-current power; and
  controlling, with the buck-boost circuit, a second voltage across a second ripple storage capacitor of the pair of ripple storage capacitors to be less than the average voltage of the direct-current power.

29. The method of claim 26, further comprising:
- switching, in the buck-boost circuit, a first ripple storage capacitor of the pair of ripple storage capacitors across the input of the inverter through a first switch and an inductor;
- switching, in the buck-boost circuit, a second ripple storage capacitor of the pair of ripple storage capacitors across the input of the inverter through a second switch and the inductor.

30. The method of claim 26, further comprising:
- fluctuating, across a first ripple storage capacitor of the pair of ripple storage capacitors, a first voltage between an average direct-current voltage at the input of the inverter and twice the average direct-current voltage; and
- fluctuating, across a second ripple storage capacitor of the pair of ripple storage capacitors, a second voltage between the average direct-current voltage and zero voltage.

\* \* \* \* \*